(12) United States Patent
Yasuda et al.

(10) Patent No.: US 12,552,493 B2
(45) Date of Patent: Feb. 17, 2026

(54) DERAILLEUR HANGER

(71) Applicant: Shimano Inc., Osaka (JP)

(72) Inventors: Yuu Yasuda, Osaka (JP); Toshio Tetsuka, Osaka (JP)

(73) Assignee: Shimano Inc., Osaka (JP)

( * ) Notice: Subject to any disclaimer, the term of this patent is extended or adjusted under 35 U.S.C. 154(b) by 8 days.

(21) Appl. No.: 18/653,358

(22) Filed: May 2, 2024

(65) Prior Publication Data

US 2025/0340268 A1    Nov. 6, 2025

(51) Int. Cl.
*B62M 9/125* (2010.01)

(52) U.S. Cl.
CPC ................... *B62M 9/125* (2013.01)

(58) Field of Classification Search
CPC ...................................................... B62M 9/125
USPC ...................................................... 474/80, 82
See application file for complete search history.

(56) References Cited

U.S. PATENT DOCUMENTS

| | | | | |
|---|---|---|---|---|
| 4,061,048 A * | 12/1977 | Huret | ...................... | B62M 9/126 474/82 |
| 4,573,951 A * | 3/1986 | Nagano | ................... | B62M 9/127 474/82 |
| 6,287,228 B1 * | 9/2001 | Ichida | .................... | B62M 25/02 474/82 |
| 8,075,010 B2 * | 12/2011 | Talavasek | ................ | B62K 3/02 301/124.2 |
| 8,899,606 B2 * | 12/2014 | Cocalis | .................. | B62K 19/24 280/281.1 |
| 9,010,792 B2 * | 4/2015 | Talavasek | ............. | B62M 9/125 280/288.4 |
| 9,227,465 B2 * | 1/2016 | Nakajima | ............. | B60B 27/026 |
| 9,308,961 B2 * | 4/2016 | McDonald | ............ | B62K 25/02 |
| 9,545,971 B2 * | 1/2017 | Beutner | ................. | B62K 19/16 |
| 10,472,019 B2 * | 11/2019 | Pfeiffer | ................... | B62K 25/02 |
| 11,230,350 B2 * | 1/2022 | Braedt | .................... | B62M 9/125 |
| 11,713,096 B2 * | 8/2023 | Braedt | .................... | B62M 9/126 474/82 |
| 11,820,462 B2 * | 11/2023 | Liao | ....................... | B62M 9/126 |
| 11,858,588 B2 * | 1/2024 | Fujita | ...................... | B62M 9/10 |
| 11,939,029 B2 * | 3/2024 | Braedt | .................... | B62M 9/125 |
| 12,037,080 B2 * | 7/2024 | Braedt | .................... | B62M 9/125 |
| 12,037,081 B2 * | 7/2024 | Shahana | ................ | B62M 9/124 |
| 12,122,479 B2 * | 10/2024 | Braedt | .................... | B62M 9/122 |

(Continued)

FOREIGN PATENT DOCUMENTS

EP    3 095 684 B1    1/2018

*Primary Examiner* — Henry Y Liu

(74) *Attorney, Agent, or Firm* — Spencer Fane, LLP

(57) ABSTRACT

A derailleur hanger includes a first portion and a second portion. The first portion includes a first part and a second part extending from the first part. The second part includes an axle receiving bore configured to receive a hub axle. The second portion is configured to support a derailleur. The first part includes a frame contact surface disposed in a reference plane extending perpendicular to a center axis of the hub axle in an installed state where the derailleur hanger is mounted to the hub axle. The second portion includes a first surface disposed on a first side of the reference plane. A vehicle center plane is positioned at a second side of the reference plane in the installed state. The second part is disposed on the first side in the installed state, and is disposed at least partially farther from the reference plane than the first surface.

20 Claims, 33 Drawing Sheets

(56) References Cited

U.S. PATENT DOCUMENTS

| | | | | |
|---|---|---|---|---|
| 12,227,264 B2* | 2/2025 | Komatsu | ............... | B62M 25/08 |
| 12,337,935 B2* | 6/2025 | Braedt | ................... | B62M 9/121 |
| 2004/0110586 A1* | 6/2004 | Shahana | ............... | B62J 23/00 |
| | | | | 474/80 |
| 2004/0116222 A1* | 6/2004 | Shahana | ............... | B62M 9/125 |
| | | | | 474/82 |
| 2004/0254038 A1* | 12/2004 | Chamberlain | ......... | B62M 9/128 |
| | | | | 474/82 |
| 2007/0021246 A1* | 1/2007 | Shahana | ............... | B62M 9/126 |
| | | | | 474/82 |
| 2007/0026985 A1* | 2/2007 | Yamaguchi | ............ | B62M 9/127 |
| | | | | 474/82 |
| 2008/0272253 A1* | 11/2008 | Tseng | ..................... | B62K 19/16 |
| | | | | 248/200 |
| 2010/0137082 A1* | 6/2010 | Gratz | ........................ | B60B 5/02 |
| | | | | 474/78 |
| 2010/0201097 A1* | 8/2010 | Schaffer | ................ | B62M 9/125 |
| | | | | 280/283 |
| 2013/0241175 A1* | 9/2013 | Talavasek | ................ | B62M 6/60 |
| | | | | 280/288.4 |
| 2016/0039494 A1* | 2/2016 | Mikesell | .................. | B62K 3/02 |
| | | | | 474/82 |
| 2018/0265169 A1* | 9/2018 | Braedt | ................... | B62M 9/125 |
| 2019/0291818 A1* | 9/2019 | Braedt | ..................... | B62M 9/12 |
| 2019/0322333 A1* | 10/2019 | Braedt | ................... | B62K 25/02 |
| 2020/0062343 A1* | 2/2020 | Braedt | ................... | B62M 9/124 |
| 2020/0198728 A1* | 6/2020 | Braedt | ................... | B62K 25/02 |
| 2020/0298933 A1* | 9/2020 | Braedt | ................. | B62M 9/1242 |
| 2021/0188396 A1* | 6/2021 | Braedt | ................... | B62M 9/125 |
| 2022/0363339 A1* | 11/2022 | Braedt | ................... | B62M 9/125 |
| 2022/0411017 A1* | 12/2022 | Braedt | ................... | B62M 9/122 |
| 2024/0034433 A1* | 2/2024 | Braedt | ................... | B62K 25/02 |
| 2025/0010943 A1* | 1/2025 | Braedt | ................. | B62M 9/1248 |

* cited by examiner

DERAILLEUR HANGER

BACKGROUND

Technical Field

This disclosure generally relates to a derailleur hanger. More specifically, the present disclosure relates to a derailleur hanger for mounting a derailleur to a frame of a human-powered vehicle such as a bicycle.

Background Information

Some human-powered vehicles have a multi-gear transmission in which a gear ratio of the transmission can be changed to enable a rider to go faster or climb hills more easily. For example, some human-powered vehicles have a derailleur that is configured to shift a chain from one sprocket to an adjacent sprocket. In some human-powered vehicles, the frame of the human-powered vehicle is provided with a derailleur hanger for attaching the derailleur to the frame of the human-powered vehicle. The derailleur hanger is separate from the frame of the human-powered vehicle. The derailleur hanger generally has one end fixed to the frame of the human-powered vehicle and the other end connected to the derailleur. One example of a derailleur hanger is disclosed in U.S. Pat. No. 9,227,465 B2 (assigned to Shimano Inc.).

SUMMARY

Generally, the present disclosure is directed to various features of a derailleur hanger for a human-powered vehicle. The term "human-powered vehicle" as used herein refers to a vehicle that can be propelled by at least human driving force to produce propulsion, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a derailleur hanger is provided that basically comprises a first portion and a second portion. The first portion is configured to be mounted to a hub axle. The first portion includes a first part and a second part. The second part extends from the first part. The second part includes an axle receiving bore configured to receive the hub axle. The second portion is coupled to the first portion, and configured to support a derailleur. The first part includes a frame contact surface disposed in a reference plane extending perpendicular to a center axis of the hub axle in an installed state where the derailleur hanger is mounted to the hub axle. The second portion includes a first surface disposed on a first side of the reference plane. The first side is opposite to a second side with respect to the reference plane. A vehicle center plane is positioned at the second side in the installed state. The second part is disposed on the first side in the installed state. The second part is disposed at least partially farther from the reference plane than the first surface.

With the derailleur hanger according to the first aspect, a derailleur can be installed farther from the vehicle center plane as compared to conventional derailleur hanger. In this way, a number of sprockets can be increased without the chain interfering with other components while still using a conventional chain and a conventional frame.

In accordance with a second aspect of the present disclosure, the derailleur hanger according to the first aspect is configured so that the second portion includes a second surface disposed on the second side.

With the derailleur hanger according to the second aspect, the position of the second surface can be located closer to the vehicle center plane than the reference plane.

In accordance with a third aspect of the present disclosure, a derailleur hanger is provided that basically comprises a first portion and a second portion. The first portion is configured to be mounted to a hub axle. The first portion includes a first part and a second part. The second part extends from the first part. The second part includes an axle receiving bore configured to receive the hub axle. The second portion is coupled to the first portion, and configured to support a derailleur. The first part includes a frame contact surface disposed in a reference plane extending perpendicular to a center axis of the hub axle in an installed state where the derailleur hanger is mounted to the hub axle. The second portion includes a first surface disposed on a first side of the reference plane and a second surface disposed on a second side of the reference plane. The first side is opposite to the second side with respect to the reference plane. The second part is disposed on the first side in the installed state. The second part is disposed at least partially farther from the reference plane than the first surface.

With the derailleur hanger according to the third aspect, a derailleur can be installed farther from the vehicle center plane as compared to conventional derailleur hanger. In this way, a number of sprockets can be increased without the chain interfering with other components while still using a conventional chain and a conventional frame.

In accordance with a fourth aspect of the present disclosure, the derailleur hanger according to the second aspect or the third aspect is configured so that the second surface faces in an inward direction with respect to the vehicle center plane in the installed state.

With the derailleur hanger according to the fourth aspect, the second portion of the derailleur hanger can have a relatively simple configuration.

In accordance with a fifth aspect of the present disclosure, the derailleur hanger according to any one of the second aspect to the fourth aspect is configured so that the first surface and the second surface are parallel.

With the derailleur hanger according to the fifth aspect, it is possible to mount a derailleur such that a base member of the derailleur straddles the second portion of the derailleur hanger in the installed state.

In accordance with a sixth aspect of the present disclosure, the derailleur hanger according to any one of the first aspect to the fifth aspect is configured so that the first surface faces in an outward direction with respect to the vehicle center plane in the installed state.

With the derailleur hanger according to the sixth aspect, a derailleur can be easily mounted to the derailleur hanger such that a base member of the derailleur contacts the first surface of the second portion in the installed state.

In accordance with a seventh aspect of the present disclosure, the derailleur hanger according to any one of the first aspect to the fourth aspect is configured so that the derailleur hanger is configured to be secured in a frictionally locking manner on a frame.

With the derailleur hanger according to the seventh aspect, the derailleur hanger can rotate relative to the frame in the case where a rotational force exceeding the frictionally holding force is applied to the derailleur.

In accordance with an eighth aspect of the present disclosure, the derailleur hanger according to any one of the first aspect to the seventh aspect is configured so that the first portion and the second portion are a one-piece member.

With the derailleur hanger according to the eighth aspect, the derailleur hanger can be relatively simple in construction and easy to manufacture.

In accordance with a ninth aspect of the present disclosure, the derailleur hanger according to any one of the first aspect to the eighth aspect is configured so that the first portion includes a non-metallic portion, and the second portion includes a metallic portion.

With the derailleur hanger according to the ninth aspect, the weight of the derailleur hanger can be reduced while still maintaining sufficient strength and stiffness.

In accordance with a tenth aspect of the present disclosure, the derailleur hanger according to any one of the first aspect to the ninth aspect is configured so that the second portion includes a restricting surface at least partially disposed at the first side. The restricting surface is configured to contact with a frame to restrict rotation of the derailleur hanger about a center axis of the hub axle in the installed state.

With the derailleur hanger according to the tenth aspect, rotation of the derailleur hanger with respect to the frame can be reliably prevented by the restricting surface contacting the frame.

In accordance with an eleventh aspect of the present disclosure, the derailleur hanger according to any one of the first aspect to the tenth aspect further comprises a third portion coupled to the first portion. The third portion is configured to have a restricting member attached to the third portion. The restricting member is configured to restrict rotation of the derailleur hanger about a center axis of the hub axle in the installed state.

With the derailleur hanger according to the eleventh aspect, rotation of the derailleur hanger with respect to the frame can be reliably prevented using a restricting member attached to the third portion.

In accordance with a twelfth aspect of the present disclosure, the derailleur hanger according to the eleventh aspect is configured so that the restricting member is detachably provided to the third portion.

With the derailleur hanger according to the twelfth aspect, the derailleur hanger can be selectively set to a restricted state in which rotation of the derailleur hanger with respect to the frame is restricted and an unrestricted state in which rotation of the derailleur hanger with respect to the frame can occur upon application of a predetermined rotational force.

In accordance with a thirteenth aspect of the present disclosure, the derailleur hanger according to the eleventh aspect or the twelfth aspect further comprises the restricting member.

With the derailleur hanger according to the thirteenth aspect, rotation of the derailleur hanger with respect to the frame can be reliably prevented using the restricting member.

In accordance with a fourteenth aspect of the present disclosure, the derailleur hanger according to any one of the eleventh aspect to the thirteenth aspect is configured so that the third portion includes a first hole. The restricting member includes a bolt having a head portion and a shaft portion. The shaft portion is disposed in the first hole of the third portion and a second hole of a frame. The head portion is configured to contact one of the third portion and the frame.

With the derailleur hanger according to the fourteenth aspect, the restricting member can be easily fixed to one of the derailleur hanger and the frame.

In accordance with a fifteenth aspect of the present disclosure, the derailleur hanger according to the fourteenth aspect is configured so that the shaft portion includes an external thread that engages an internal thread of the first hole of the third portion.

With the derailleur hanger according to the fifteenth aspect, the restricting member can be reliably fixed to the derailleur hanger.

In accordance with a sixteenth aspect of the present disclosure, the derailleur hanger according to the fourteenth aspect is configured so that the shaft portion includes an external thread that engages an internal thread of the second hole of the frame.

With the derailleur hanger according to the sixteenth aspect, the restricting member can be reliably fixed to the frame.

In accordance with a seventeenth aspect of the present disclosure, the derailleur hanger according to any one of the eleventh aspect to the thirteenth aspect is configured so that the third portion includes a first hole. The restricting member includes a pin having a first shaft section and a second shaft section. The first shaft section is disposed in the first hole of the third portion. The second shaft section is disposed in a second hole of a frame.

With the derailleur hanger according to the seventeenth aspect, rotation of the derailleur hanger with respect to the frame can be reliably prevented using a pin as the restricting member.

In accordance with an eighteenth aspect of the present disclosure, the derailleur hanger according to the seventeenth aspect is configured so that the pin is fixed in the first hole of the third portion.

With the derailleur hanger according to the eighteenth aspect, the derailleur hanger can be provided with the pin as the restricting member such that the frame does not need to include the pin.

In accordance with a nineteenth aspect of the present disclosure, the derailleur hanger according to the seventeenth aspect is configured so that the pin is fixed in the second hole of the frame.

With the derailleur hanger according to the nineteenth aspect, the frame can be provided with the pin as the restricting member such that the derailleur hanger does not need to include the pin.

In accordance with a twentieth aspect of the present disclosure, a derailleur hanger is provided that basically comprises a first portion, a second portion and a third portion. The first portion is configured to be mounted to a hub axle. The second portion is coupled to the first portion, and configured to support a derailleur. The third portion is coupled to the first portion, and configured to be contact a restricting portion of a vehicle frame to prevent rotation of the derailleur hanger about a center axis of the hub axle in an installed state where the derailleur hanger is mounted to the hub axle. The restricting portion of the vehicle frame stops rotation of another derailleur hanger in a first rotational direction and permits rotation of the other derailleur hanger in a second rotational direction about the center axis in a state where the other derailleur hanger is mounted to the hub axle.

With the derailleur hanger according to the twentieth aspect, the third portion fixes the derailleur hanger to the frame such that rotation of the derailleur hanger with respect to the frame can be reliably prevented.

In accordance with a twenty-first aspect of the present disclosure, the derailleur hanger according to the twentieth aspect is configured so that the third portion includes an opening that receives the restricting portion of the vehicle frame in the installed state.

With the derailleur hanger according to the twenty-first aspect, rotation of the derailleur hanger with respect to the frame can be easily and reliably prevented using by the restricting portion of the vehicle frame being received in the opening of the derailleur hanger.

In accordance with a twenty-second aspect of the present disclosure, the derailleur hanger according to the twentieth aspect or the twenty-first aspect is configured so that the first portion, the second portion and the third portion are a one-piece member.

With the derailleur hanger according to the twenty-second aspect, the derailleur hanger can be relatively simple in construction and easy to manufacture.

In accordance with a twenty-third aspect of the present disclosure, the derailleur hanger according to any one of the first aspect to the twenty-second aspect is configured so that the second portion includes a fixing bolt receiving bore.

With the derailleur hanger according to the twenty-third aspect, a derailleur can be easily attached to the second portion of the derailleur hanger with a fixing bolt using the fixing bolt receiving bore of the second portion.

Also, other objects, features, aspects and advantages of the disclosed derailleur hanger will become apparent to those skilled in the art from the following detailed description, which, taken in conjunction with the annexed drawings, discloses preferred embodiments of the derailleur hanger.

BRIEF DESCRIPTION OF THE DRAWINGS

Referring now to the attached drawings which form a part of this original disclosure, an illustrative embodiment is shown.

DETAILED DESCRIPTION

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
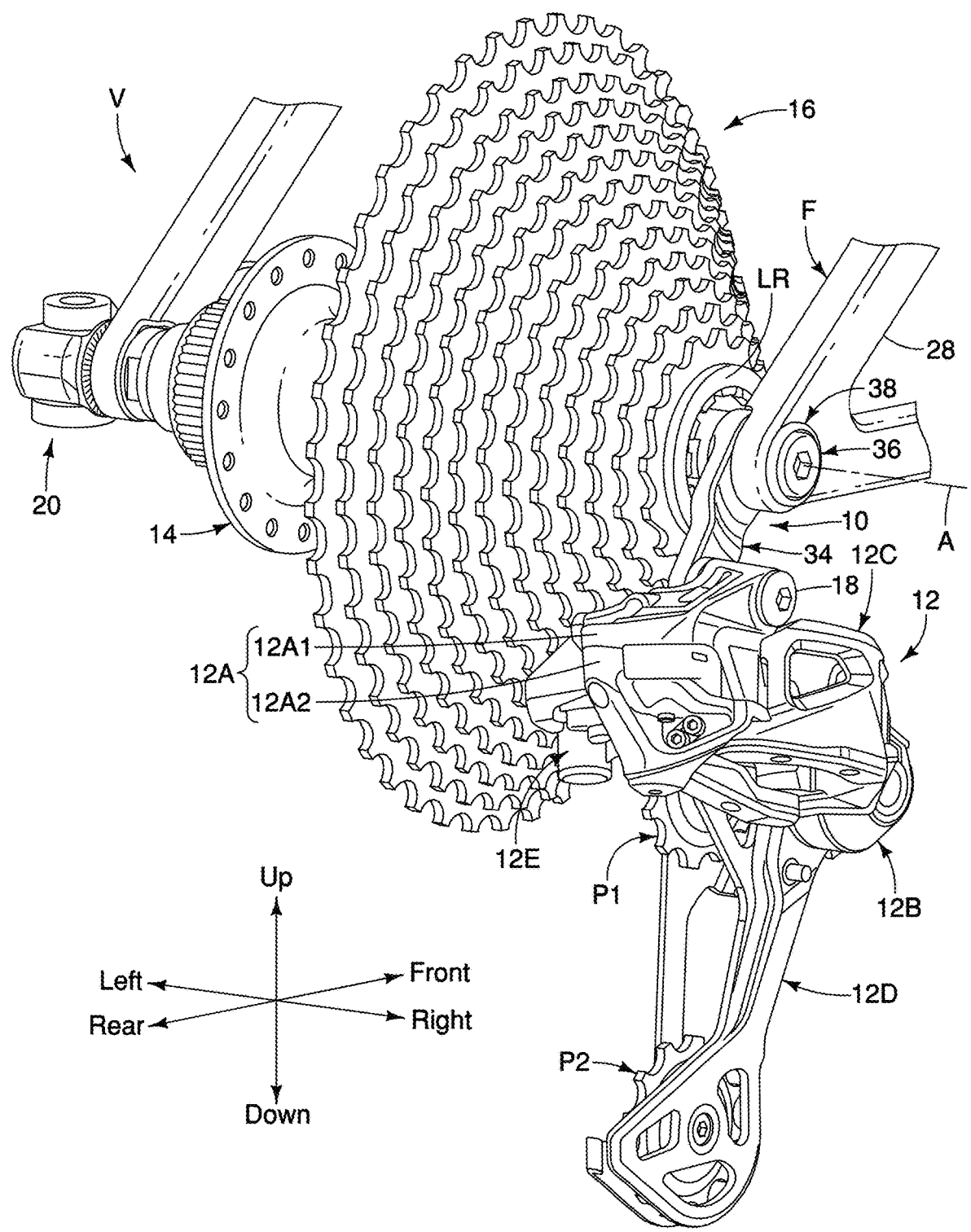
FIG. 1 is a rear perspective view of a rear portion of a vehicle frame having a rear hub mounted to the vehicle frame, a sprocket assembly mounted to the rear hub, and a rear derailleur mounted to the vehicle frame by a derailleur hanger assembly in accordance with a first embodiment.
Figure 2:
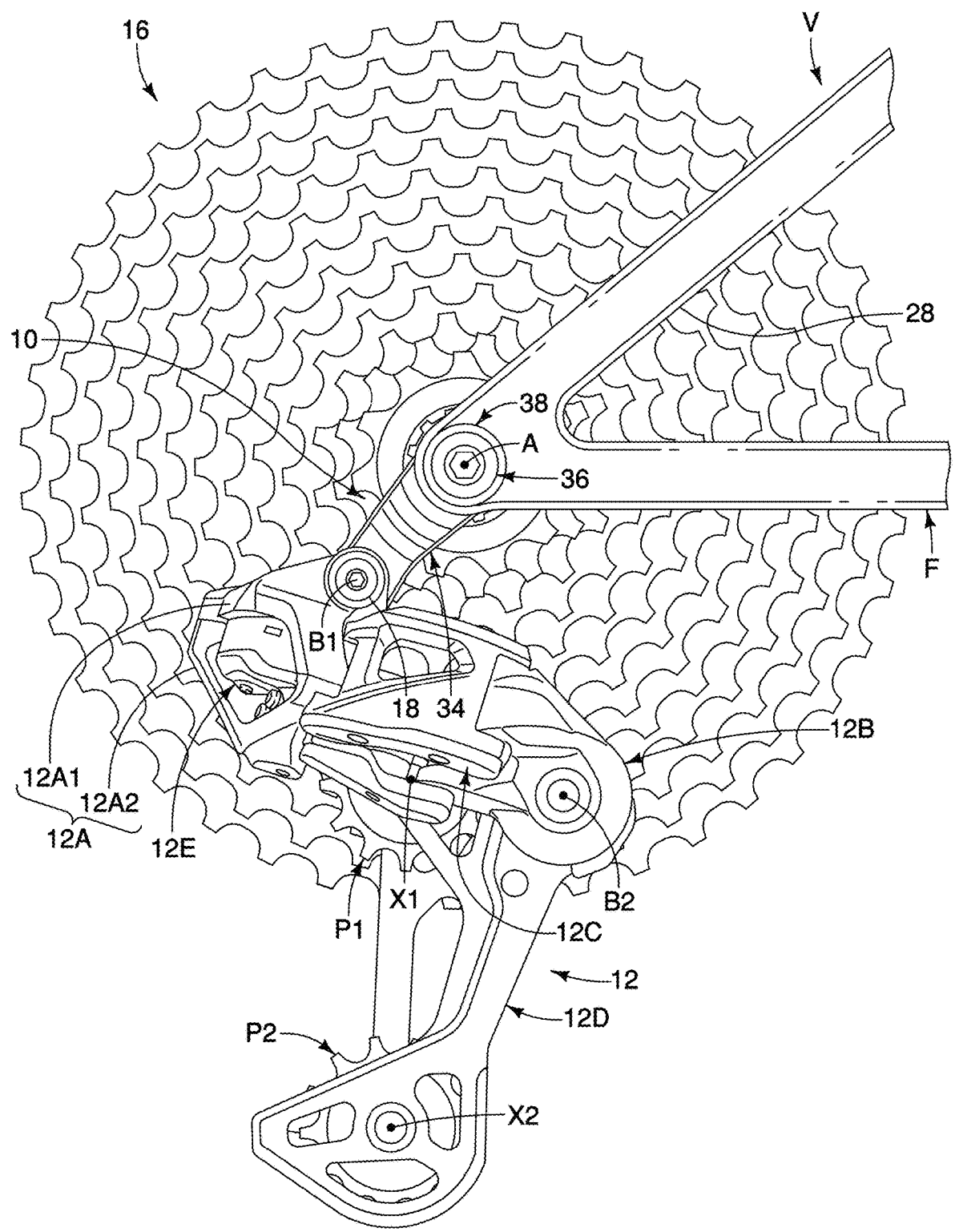
FIG. 2 is a right side elevational view of the rear portion of the vehicle frame, the rear hub, the rear derailleur and the derailleur hanger assembly illustrated in FIG. 1.
Figure 3:
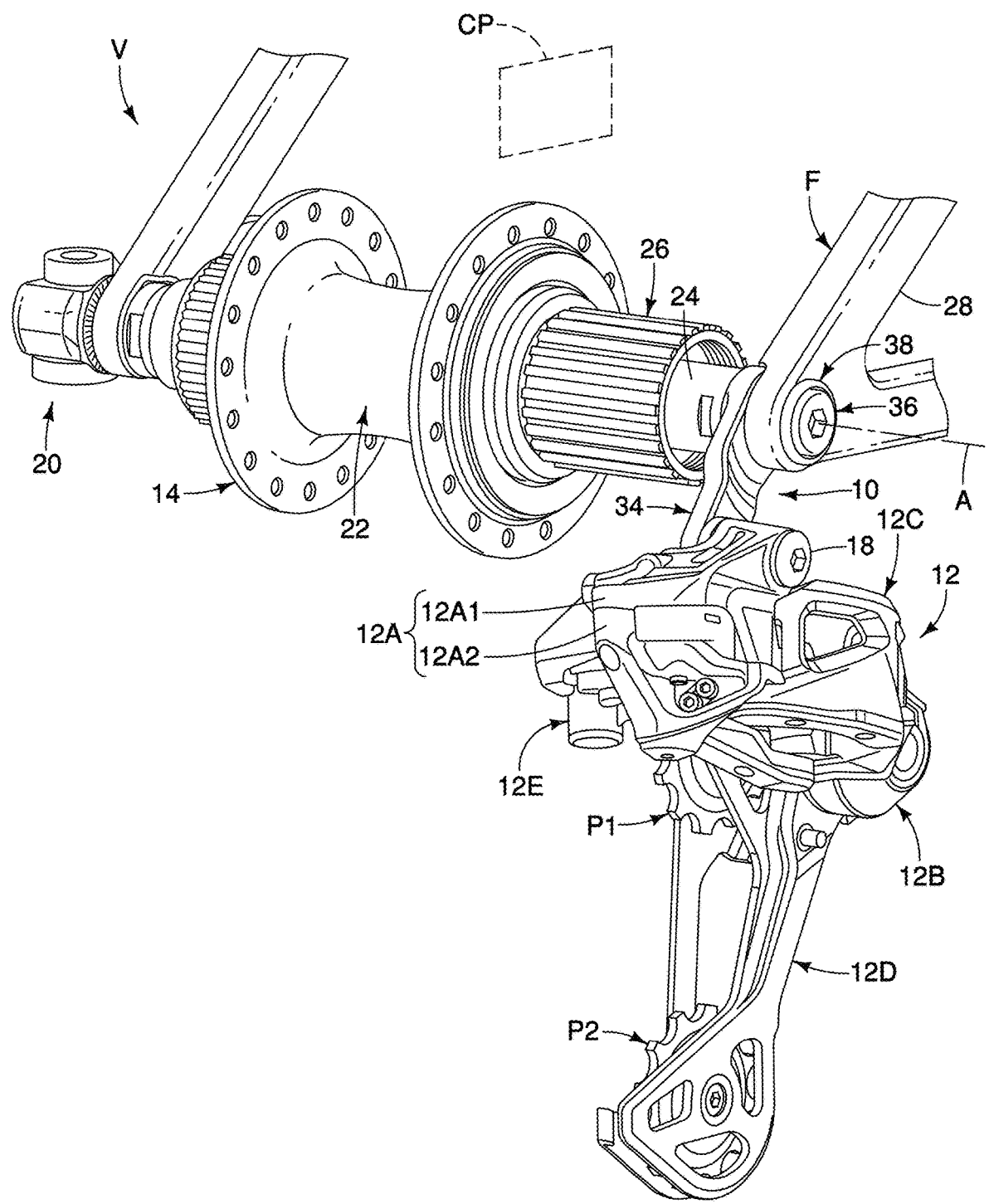
FIG. 3 is a rear perspective view of the rear portion of the vehicle frame, the rear hub, the rear derailleur and the derailleur hanger assembly illustrated in FIGS. 1 and 2 but wherein the sprocket assembly as been removed.
Figure 4:
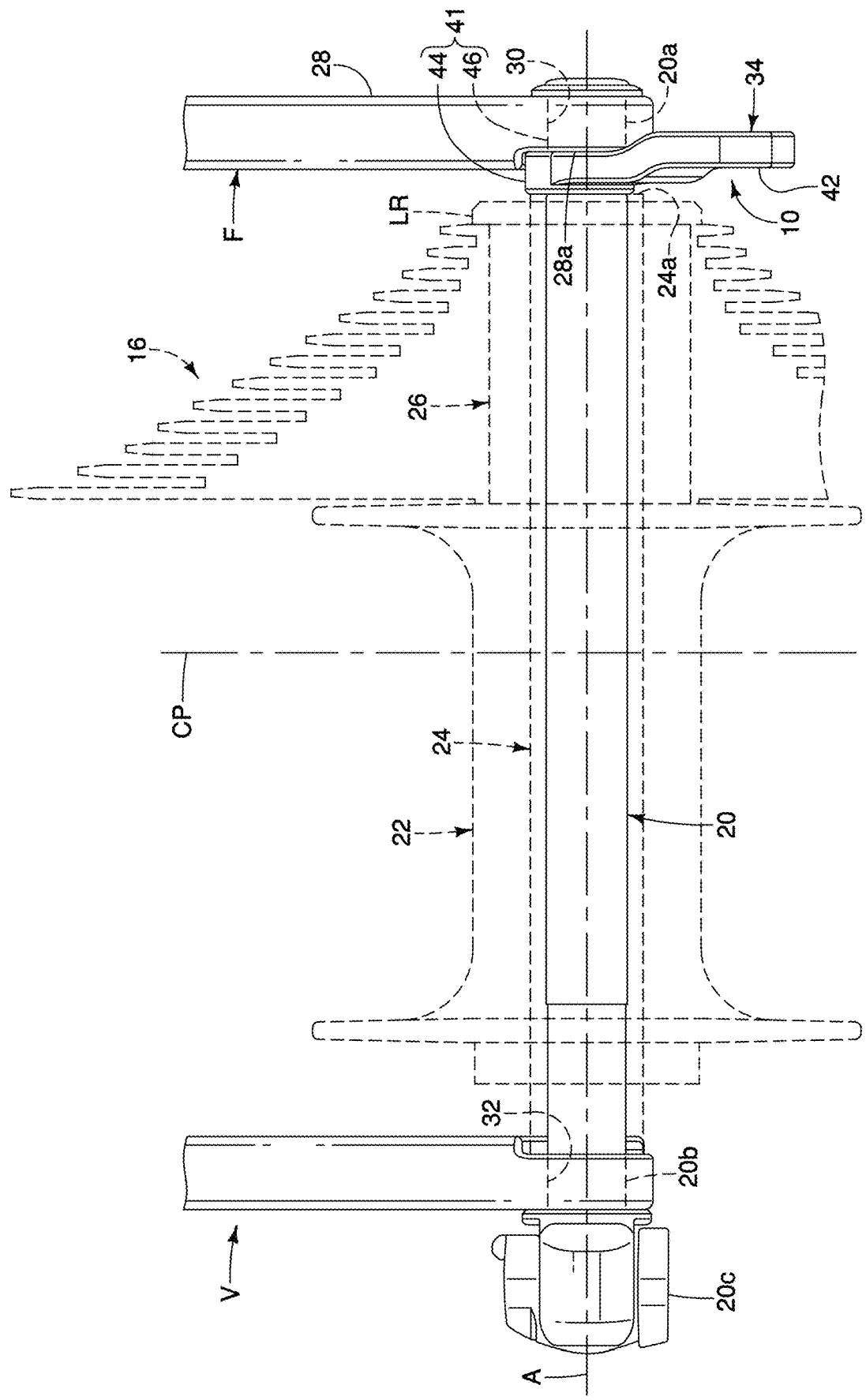
FIG. 4 is a rear elevational view of the rear portion of the vehicle frame, a rear hub axle of the rear hub and the derailleur hanger assembly illustrated in FIGS. 1 to 3.
Figure 5:
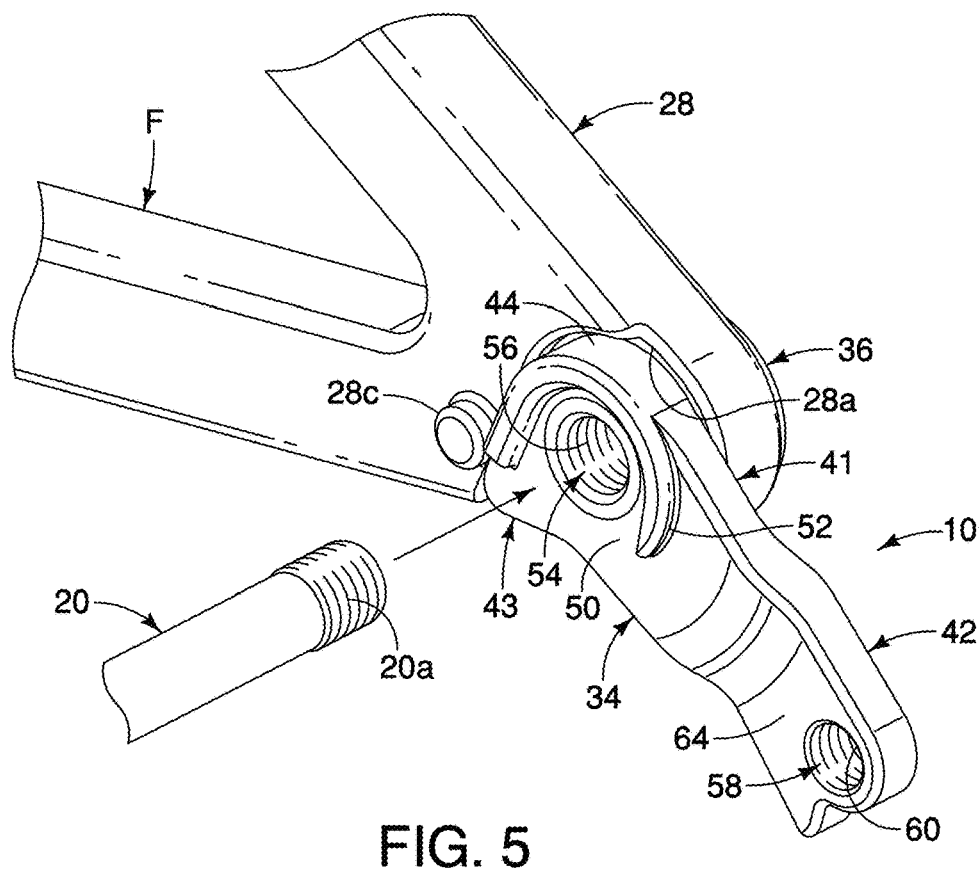
FIG. 5 is an inside (first side) perspective view of a right rear frame portion and the derailleur hanger assembly illustrated in FIGS. 1 to 4.
Figure 6:
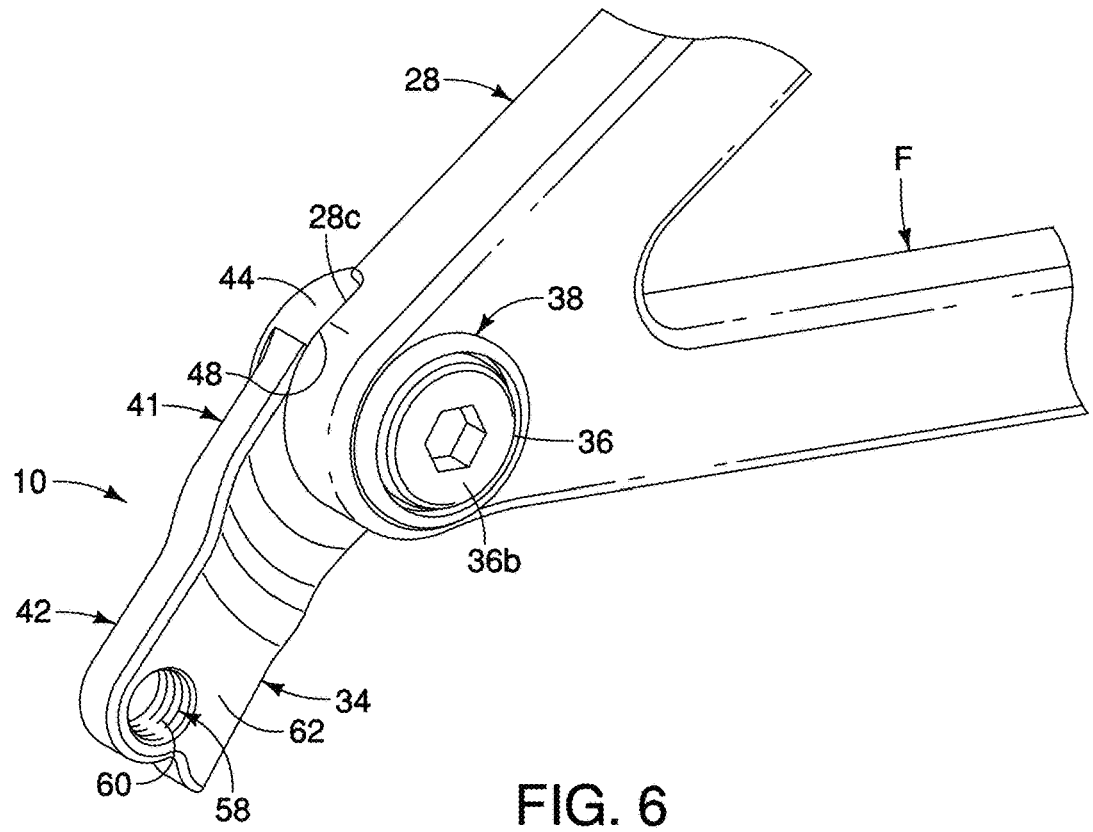
FIG. 6 is an outside (second side) perspective view of a right rear frame portion and the derailleur hanger assembly illustrated in FIGS. 1 to 5.

Referring initially to FIGS. 1 to 3, a rear portion of a human-powered vehicle V is illustrated that is equipped with a derailleur hanger assembly 10 in accordance with a first embodiment. The human-powered vehicle V includes, among other things, a derailleur 12, a rear hub 14 and a rear sprocket assembly 16. In particular, the rear derailleur 12 is mounted to a vehicle frame F of the human-powered vehicle V by a derailleur hanger assembly 10 in accordance with a first embodiment. In the first embodiment, the human-powered vehicle V is a bicycle. Since bicycles are well known in the human-powered vehicle field (e.g., the bicycle field), the human-powered vehicle V will not be discussed or illustrated in detail herein, except for the portions of the vehicle frame F that relate to the derailleur hanger assembly 10.

As seen in FIG. 1, the human-powered vehicle V has a vehicle center plane CP vertically bisecting the vehicle frame F of the human-powered vehicle V in a longitudinal direction (a front to rear direction). The vehicle center plane CP passes through a center of the frame F in a width direction (a left to right direction) of the vehicle frame F. Thus, the vehicle center plane CP separates a left side of the human-powered vehicle V from a right side of the human-powered vehicle V. The following directional terms "front," "rear," "forward," "rearward," "left," "right," "lateral," "longitudinal", "upward," and "downward," as well as any other similar directional terms, refer to those directions which are determined on the basis of a rider sitting upright on a seat of the human-powered vehicle V while facing a handlebar of the human-powered vehicle V.

In the first embodiment, the human-powered vehicle V is a bicycle, the derailleur 12 is a bicycle rear derailleur that is typically used with a mountain bike. Of course, it will be apparent from this disclosure that the derailleur hanger assembly 10 can be used with other types of derailleurs. Since derailleurs are well known in the human-powered vehicle field (e.g., the bicycle field), the derailleur 12 will not be discussed or illustrated in detail herein, except for as the derailleur 12 relates to the derailleur hanger assembly 10.

The derailleur 12 basically comprises a base member 12A, a movable member 12B, a linkage 12C and a chain guide 12D. Here, the derailleur 12 is an electric derailleur having a motor unit 12E. The base member 12A is mounted to the derailleur hanger assembly 10 by a fixing bolt 18. In this way, the base member 12A is configured to be attached to the frame F of the human-powered vehicle V by the derailleur hanger assembly 10. Preferably, the base member 12A is configured to pivot relative to the frame F about a pivot axis B1, which is defined by the fixing bolt 18. The linkage 12C movably couples the movable member 12B to the base member 12A. The movable member 12B is movably coupled to the base member 12A by the linkage 12C. The chain guide 12D is pivotally coupled to the movable member 12B about a pivot axis B2. Preferably, the chain guide 12D includes at least one pulley. The at least one pulley has a rotational axis spaced from the first pivot axis A1 of the chain guide 12D. Here, the chain guide 12D includes a first pulley P1 and a second pulley P2. The first pulley P1 has a first pulley center axis X1 that is spaced from the pivot axis B2. The second pulley P2 has a second pulley center axis X2 that is spaced from the pivot axis B2. Thus, the first pulley center axis X1 and the second pulley center axis X2 are offset from the pivot axis B2. The motor unit 12E is mounted to the base member 12A. The motor unit 12E has a reversible electric motor that is operatively coupled to the linkage 12C for moving the linkage 12C such that the movable member 12B is moved relative to the base member 12A. The electric motor of the motor unit 12E is disposed inside a housing that is mounted to the base member 12A. Here, the base member 12A has a first based portion 12A1 and a second base portion 12A2. The motor unit 12E is disposed between the first based portion 12A1 and the second base portion 12A2.

Basically, the derailleur 12 is configured to move a chain from one sprocket of the rear sprocket assembly 16 to an adjacent sprocket of the rear sprocket assembly 16 in response to either an automatic shift signal from a cycle computer, or a shift signal inputted by a user from an operating device. Here, the derailleur 12 is mounted to the right side of the rear portion of the vehicle frame F by the derailleur hanger assembly 10. The derailleur hanger assembly 10 is configured to support the derailleur 12 to the rear portion of the vehicle frame F such that the derailleur 12 is positioned farther to the right of the center plane CP as compared to a derailleur mounted to a vehicle frame using a conventional derailleur hanger. Thus, the derailleur hanger assembly 10 is particularly useful for supporting a derailleur when a rear sprocket assembly is provided with a large number of sprockets such as thirteen sprockets in the case of the rear sprocket assembly 16.

As seen in FIG. 3, the rear hub 14 is mounted to the vehicle frame F of the human-powered vehicle V by a thru-axle 20. The rear hub 14 includes a hub body 22, a hub axle 24 and a freewheel body 26. The hub axle 24 has a center axis A. The center axis A corresponds a center axis of the thru-axle 20. The center axis A also corresponds to an axis of rotation of the hub body 22 and the freewheel body 26. The hub body 22 and the freewheel body 26 are rotatably mounted on the hub axle 24 by bearings in a conventional manner to rotate about the center axis A. The hub axle 24 is a hollow tube for receiving the thru-axle 20. The thru-axle 20 extends through hub axle 24, and is coupled to a rear portion 28 of the vehicle frame F. In particular, the rear portion 28 of the vehicle frame F has a right mounting opening 30 and a left mounting opening 32 for receiving the thru-axle 20. When the thru-axle 20 is installed to the rear portion 28 of the vehicle frame F, the hub axle 24 and the thru-axle 20 are non-rotatable secured to the rear portion 28 of the vehicle frame F. Thus, the hub axle 24 and the thru-axle 20 can also be jointly referred to as the hub axle of the rear hub 14.

The rear sprocket assembly 16 is retained on the freewheel body 26 by a locking ring LR. The rear sprocket assembly 16 is non-rotatably mounted to the freewheel body 26 so that the rear sprocket assembly 16 and the freewheel body 26 rotate together. The freewheel body 26 is connected to the hub body 22 via one-way clutch. In this way, a torque is transmitted from the rear sprocket assembly 16 to the hub body 22, in a state where the rear sprocket assembly 16 is rotated by a pedaling action or a drive unit in a forward driving direction. On the other hand, the hub body 22 can rotate in a forward driving direction relative to the freewheel body 26 and the rear sprocket assembly 16 in a state where the rear sprocket assembly 16 is stopped or rotated in a non-driving direction (i.e., opposite the forward driving direction). In the first embodiment, the rear hub 14 is a bicycle rear hub. Rear hubs such as the rear hub 14 are well known in the human-powered vehicle field, and thus, the rear hub 14 will not be discussed in further detail herein.

Referring now to FIGS. 4 to 13, the derailleur hanger assembly 10 will now be discussed in more detail. Basically, the derailleur hanger assembly 10 includes a derailleur hanger 34 and a hanger bolt 36. The derailleur hanger 34 is configured to be axially spaced from the locking ring LR with respect to the center axis A. In the words, a gap exists between the locking ring LR and the derailleur hanger 34 so that the locking ring LR does not contact the derailleur hanger 34. Here, the derailleur hanger assembly 10 further includes a hanger washer 38. The derailleur hanger 34 is a separate part from the derailleur hanger 34. Specifically, in the first embodiment, the derailleur hanger 34 is fixed to the rear portion 28 of the vehicle frame F by the hanger bolt 36. The derailleur hanger 34 is in an installed state where the derailleur hanger 34 is mounted to the rear portion 28 of the vehicle frame F.

The derailleur hanger 34 basically comprises a first portion 41 and a second portion 42. The second portion 42 is coupled to the first portion 41. The first portion 41 and the second portion 42 are a one-piece member. In the first embodiment, the derailleur hanger 34 further comprises a third portion 43. The third portion 43 is coupled to the first portion 41. The first portion 41, the second portion 42 and the third portion 43 are a one-piece member. In the first embodiment, for example, the derailleur hanger 34 is formed of a hard rigid material such as a metal alloy, or a fiber reinforced plastic.

The first portion 41 is configured to be mounted to the hub axle 24. In the first embodiment, the first portion 41 is mounted to the hub axle 24 via the thru-axle 20. More specifically, the first portion 41 is mounted to the rear portion 28 of the vehicle frame F by the hanger bolt 36, which is attached to the thru-axle 20. The first portion 41 includes a first part 44 and a second part 46. The second part 46 extends from the first part 44. The first part 44 is sandwiched between an end surface 24a of the hub axle 24 and an inner facing surface 28a of the rear portion 28 of the vehicle frame F in the installed state. In other words, the first part 44 is configured to contact end surface 24a of the hub axle 24 in the installed state. Also, the first part 44 is configured to contact the inner facing surface 28a of the rear portion 28 of the vehicle frame F in the installed state. In particular, the first part 44 includes a frame contact surface 48. The frame contact surface 48 contacts the inner facing surface 28a of the rear portion 28 of the vehicle frame F in the installed state. The frame contact surface 48 is disposed in a reference plane RP extending perpendicular to the center axis A of the hub axle 24 in the installed state where the derailleur hanger 34 is mounted to the hub axle 24. In other words, the frame contact surface 48 is completely contained within the reference plane RP. The first part 44 of the first portion 41 further includes an axle contact surface 50. The axle contact surface 50 contacts the end surface 24a of the hub axle 24 in the installed state. The frame contact surface 48 and the axle contact surface 50 are parallel and face in opposite directions. The frame contact surface 48 and the axle contact surface 50 are also parallel to the vehicle center plane CP.

The first part 44 further includes a collar 52. The collar 52 protrudes from the axle contact surface 50 in a direction parallel to the center axis A toward the vehicle center plane CP. The collar 52 has a U-shape as viewed in a direction parallel to the center axis A. The collar 52 is dimensioned to partially surround the hub axle 24 in the installed state. The collar 52 aids in preventing a chain from jamming of the chain between the first portion 41 of the derailleur hanger 34 and the smallest sprocket of the rear sprocket assembly 16. In other words, the collar 52 constitutes a diverting region on which a chain can slip transversely with respect to a longitudinal direction of the chain.

The second part 46 is disposed on the first side S1 in the installed state. The second part 46 is configured to be received in the mounting opening 30 of the rear portion 28 of the vehicle frame F in the installed state. Here, the second part 46 is a tubular member that extends from the first part 44. The second part 46 including an axle receiving bore 54 configured to receive the hub axle 24. The axle receiving bore 54 includes an internal thread 56. The hanger bolt 36 includes an external thread 36a that is screwed into the internal thread 56 to secure the derailleur hanger 34 to the rear portion 28 of the vehicle frame F. The external thread 36a is a preferably a left-hand thread. Thus, the second part 46 can also be referred to as a receptacle in that the second part 46 is configured to receive the hanger bolt 36. The hanger bolt 36 further includes a head portion 36b that contacts the hanger washer 38 in the installed state.

In the installed state, the derailleur hanger 34 is configured to be secured in a frictionally locking manner on the frame F. Specifically, the frictional fastening of the derailleur hanger 34 to the frame F is accomplished by screwing the hanger bolt 36 into the axle receiving bore 54 of the first portion 41. In this way, the rear portion 28 of the vehicle frame F is clamped between the hanger washer 38 and the second part 46 of the first portion 41. Thus, the second part 46 of the derailleur hanger 34 acts as a nut for the hanger bolt 36. In this way, the hanger bolt 36 and the second part 46 of the derailleur hanger 34 provide a frictionally holding force between the vehicle frame F and the derailleur hanger 34. The derailleur hanger 34 cannot rotate relative to the vehicle frame F until the frictionally holding force has been exceeded.

The second portion 42 is configured to support the derailleur 12. In particular, the second portion 42 includes a fixing bolt receiving bore 58. Here, in the first embodiment, the fixing bolt receiving bore 58 includes an internal thread 60 that threadedly receives the fixing bolt 18 of the derailleur 12. Alternatively, the fixing bolt receiving bore 58 can be unthreaded and the derailleur 12 can be attached to the second portion 42 using a bolt and a nut.

Figure 11:
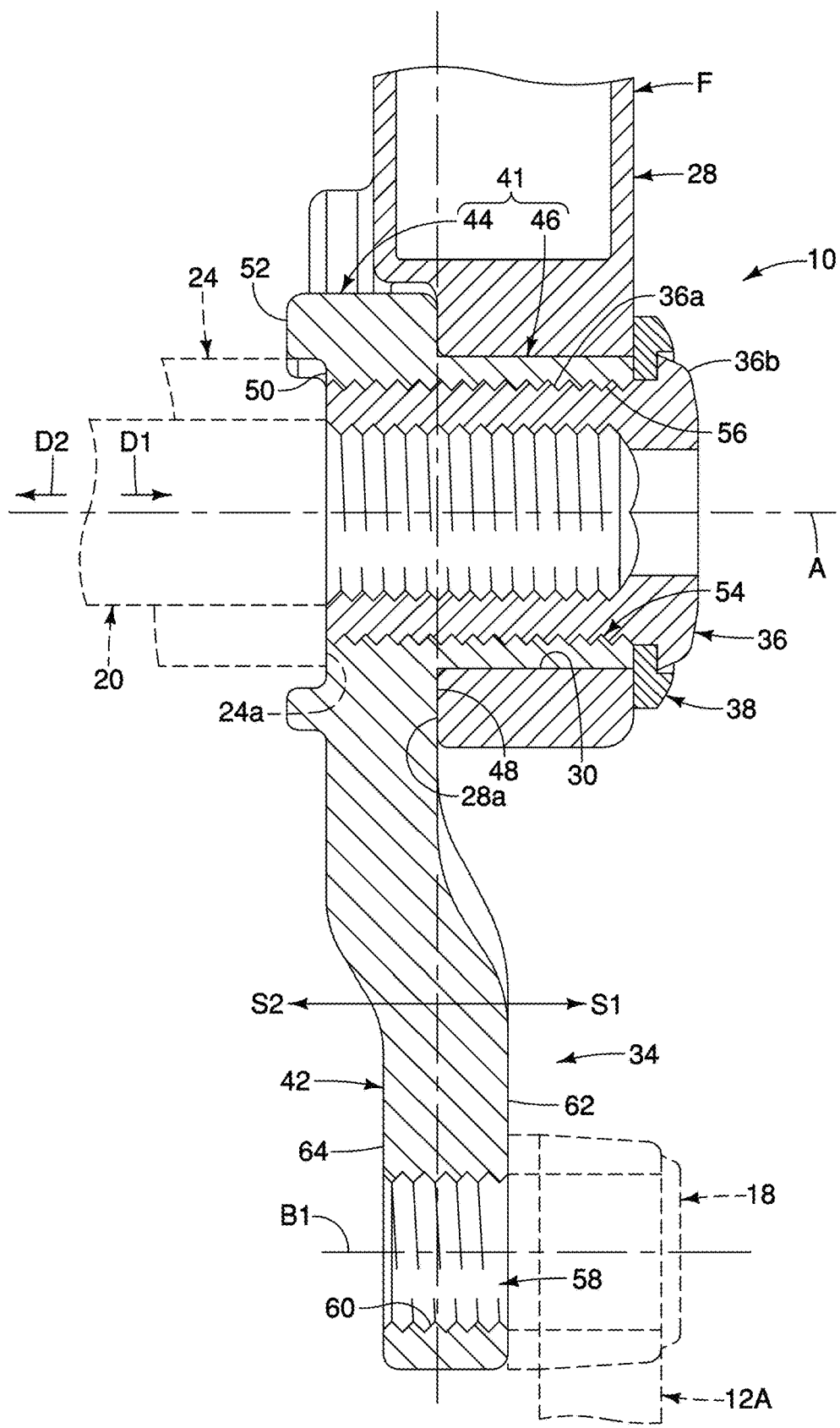
FIG. 11 is a cross sectional view of the right rear portion of the vehicle frame and the derailleur hanger assembly illustrated in FIGS. 1 to 10 as seen along section line 11-11 of FIG. 7.
Figure 12:
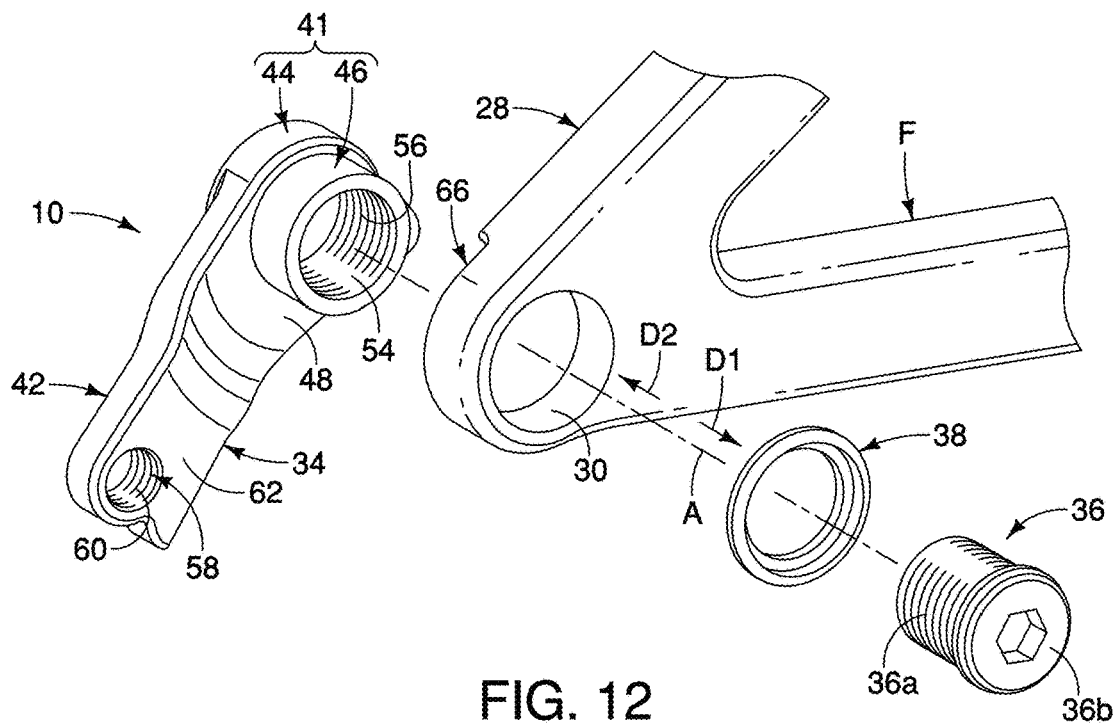
FIG. 12 is an exploded outside perspective view of the right rear frame portion and the derailleur hanger assembly illustrated in FIGS. 1 to 11.
Figure 13:
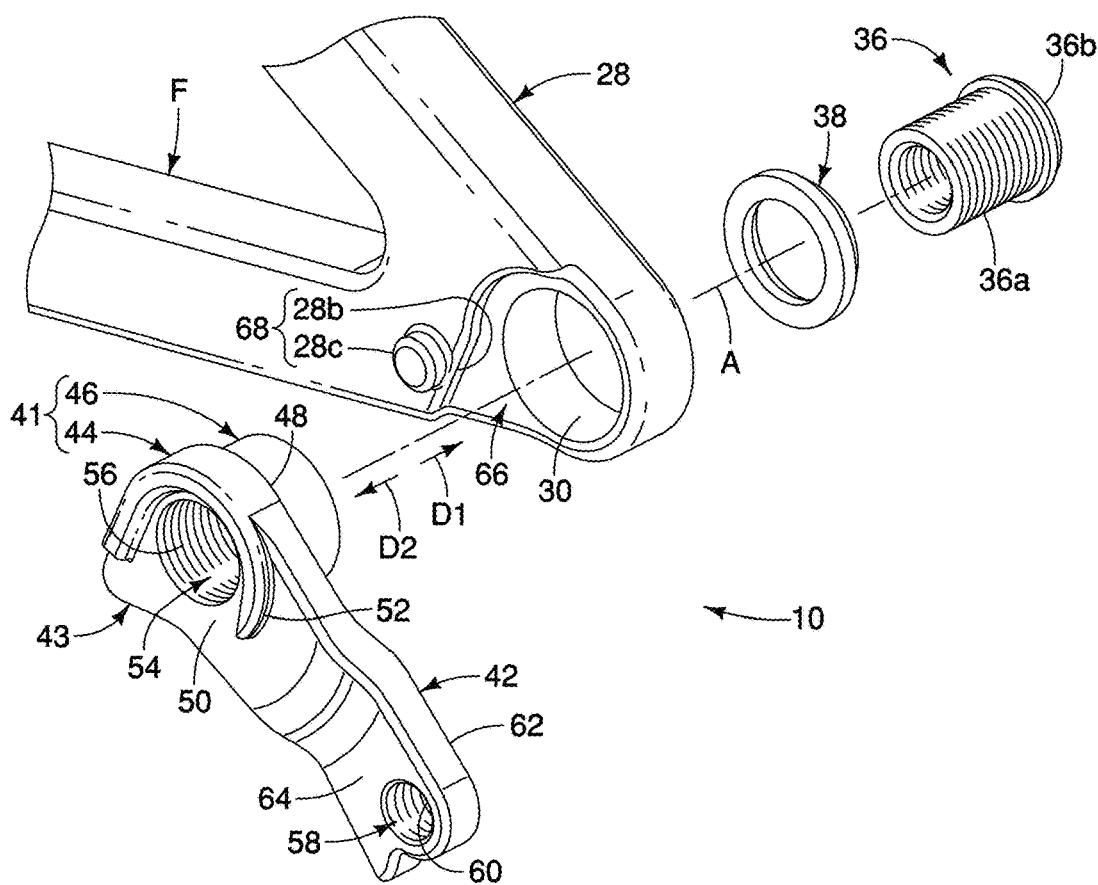
FIG. 13 is an exploded inside perspective view of the right rear frame portion and the derailleur hanger assembly illustrated in FIGS. 1 to 12.

The second portion 42 includes a first surface 62. The first surface 62 is disposed on a first side S1 of the reference plane RP. The first surface 62 contacts the base member 12A of the rear derailleur 12 in the installed state as seen in FIG. 11. The second portion 42 includes a second surface 64. The second surface 64 is disposed on a second side S2 of the reference plane RP. The first side S1 is opposite to the second side S2 with respect to the reference plane RP. In other words, in the first embodiment, the first side S1 is opposite on an opposite side of the reference plane RP from the second side S2. Also, the first embodiment, the first side S1 is aligned with the second side S2 with respect to a direction parallel to the center axis A. The first surface 62 and the second surface 64 are parallel. The first surface 62 and the second surface 64 are parallel to the vehicle center plane CP. The first surface 62 and the second surface 64 are also parallel to the frame contact surface 48 and the axle contact surface 50. The second surface 64 is positioned closer to the vehicle center plane CP than the first surface 62 in the installed state.

As seen in FIG. 11, the second part 46 is disposed at least partially farther from the reference plane RP than the first surface 62. In particular, the distal end of the second part 46 is disposed farther from the reference plane RP than the first surface 62. Also, the axle contact surface 50 is disposed on the second side S2. The axle contact surface 50 is farther from the reference plane RP than the second surface 64.

In the first embodiment, the first surface 62 faces in an outward direction D1 with respect to the vehicle center plane in the installed state. On the other hand, in the first embodiment, the second surface 64 faces in an inward direction D2 with respect to the vehicle center plane CP in the installed state. The vehicle center plane CP is positioned at the second side S2 in the installed state. Of course, in certain modified configurations of the derailleur hanger 34, it is possible for the first surface 62 to face in the inward direction D2.

Figure 7:
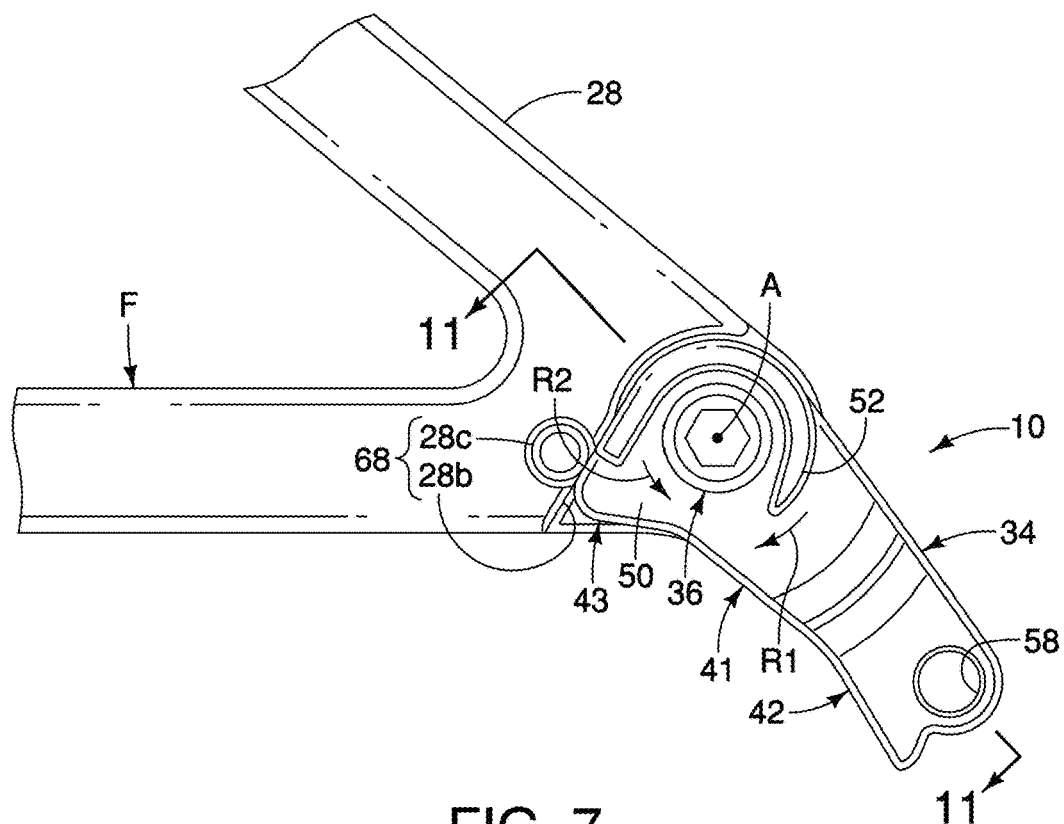
FIG. 7 is a first side elevational view of the right rear portion of the vehicle frame and the derailleur hanger assembly illustrated in FIGS. 1 to 6.
Figure 8:
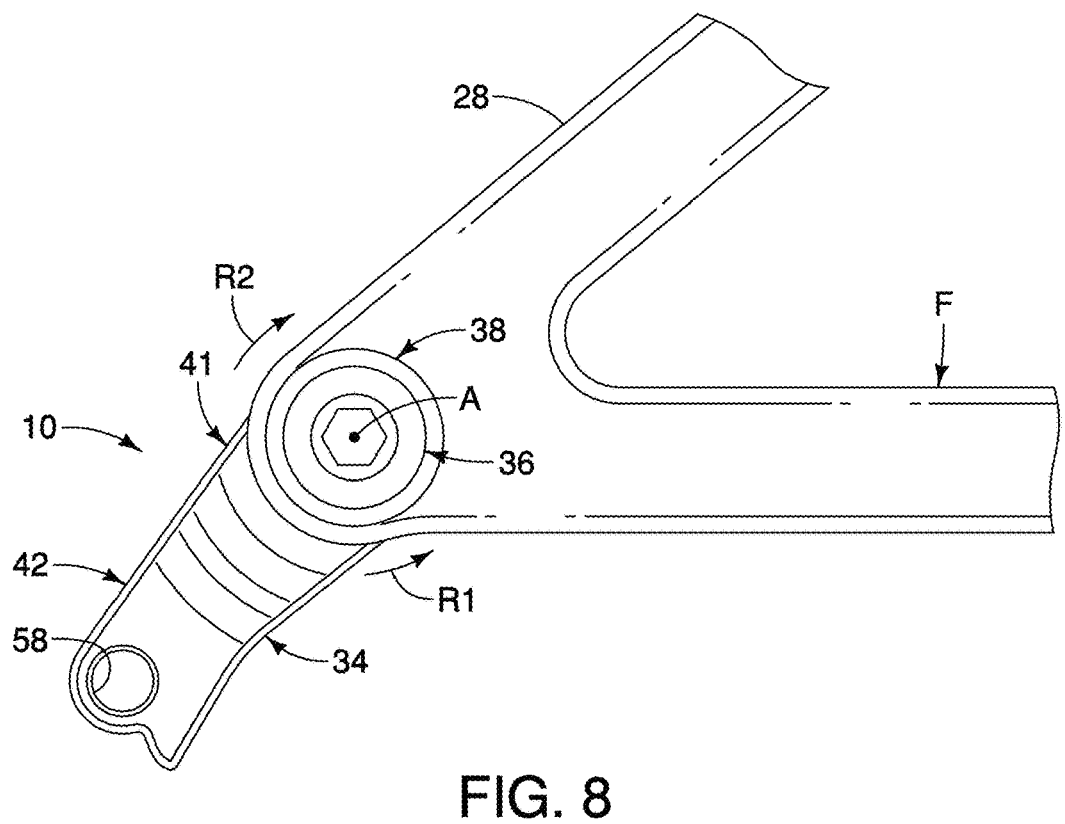
FIG. 8 is a second side elevational view of the right rear portion of the vehicle frame, and the derailleur hanger assembly illustrated in FIGS. 1 to 7.
Figure 9:
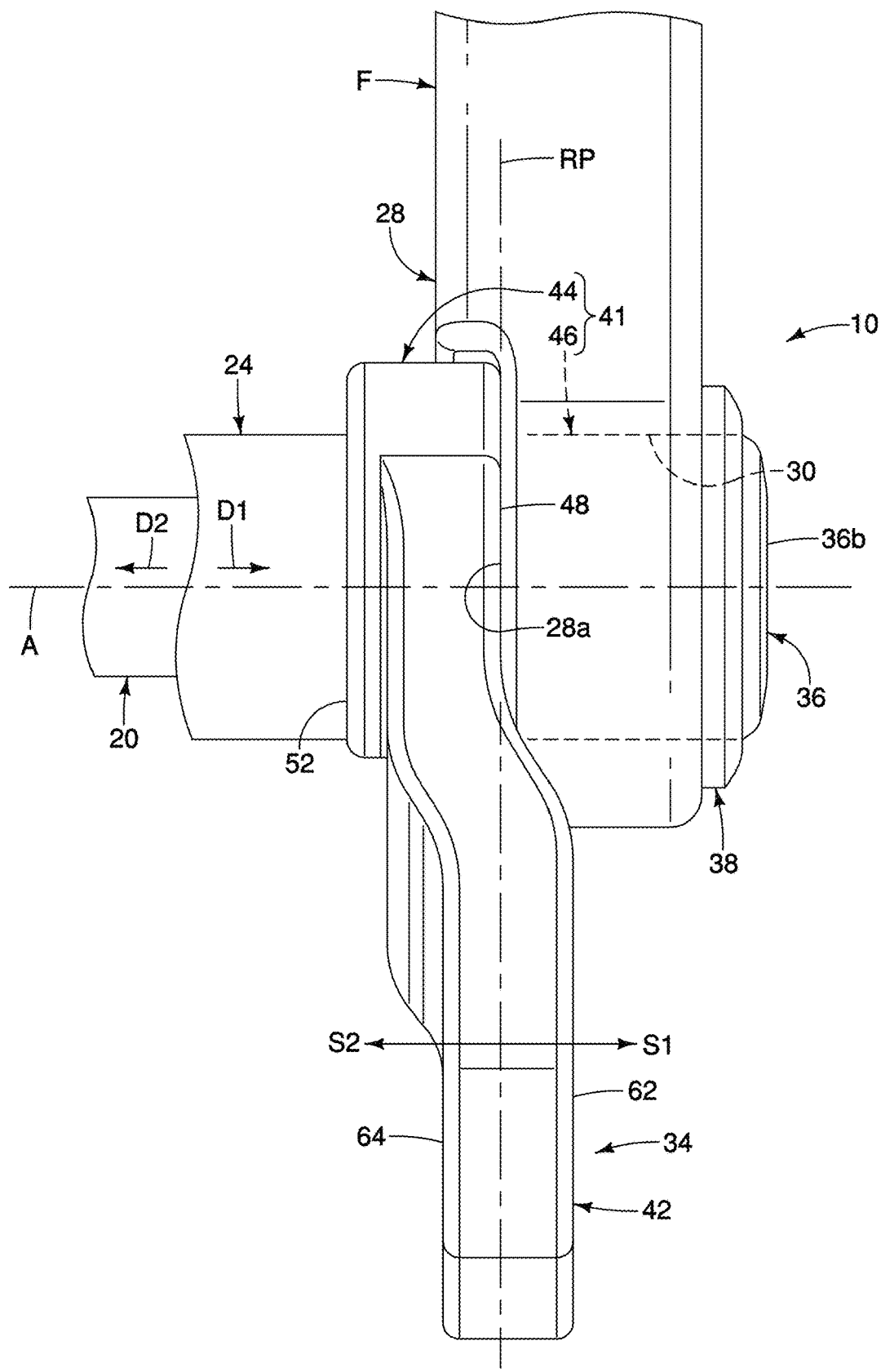
FIG. 9 is a rear elevational view of the right rear portion of the vehicle frame and the derailleur hanger assembly illustrated in FIGS. 1 to 8.
Figure 10:
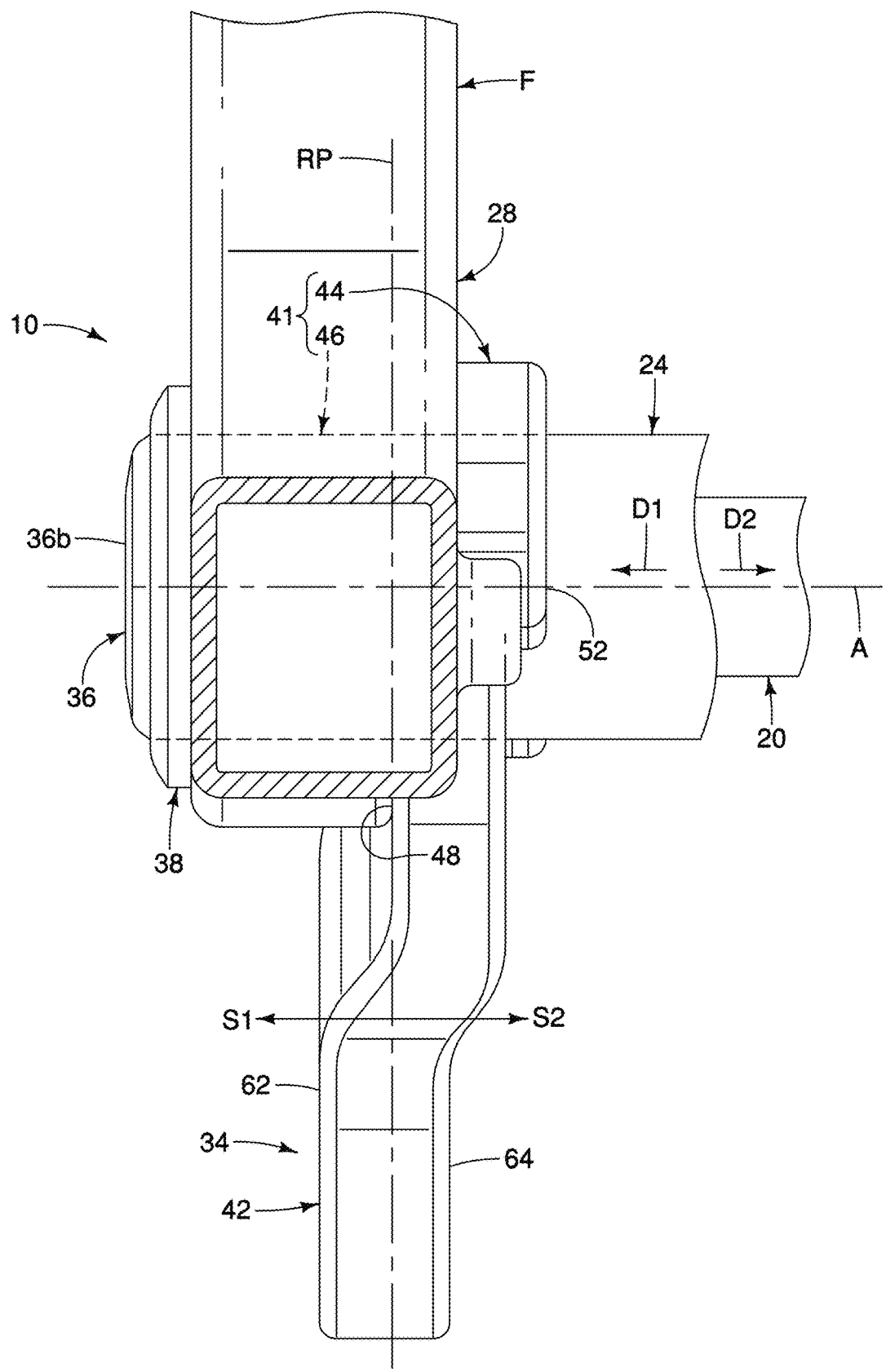
FIG. 10 is a front elevational view of the right rear portion of the vehicle frame and the derailleur hanger assembly illustrated in FIGS. 1 to 9.

In the first embodiment, as seen in FIG. 7, the third portion 43 is coupled to the first portion 41. The third portion 43 is configured to restrict rotational movement of the derailleur hanger 34 relative the frame F about the center axis A of the hub axle 24 in the installed state. The third portion 43 restrict only rotation of the derailleur hanger 34 in a first rotational direction R1 about the center axis A in the installed state. The third portion 43 permits rotation of the derailleur hanger 34 in a second rotational direction R2 about the center axis A in the installed state. The second rotational direction R2 being opposite to the first rotational direction R1. Thus, the third portion 43 can be referred to as a restricting portion of the derailleur hanger 34. Specifically, an inwardly facing side of the rear portion 28 of the vehicle frame F includes a recess 66 that surrounds the mounting opening 30. The recess 66 is configured to receive the first portion 41 and the third portion 43 of the derailleur hanger 34. The recess 66 is defined by the inner facing surface 28a (i.e., an axially facing contact surface) and a forward rotational stop surface 28b. The third portion 43 is configured to contact the forward rotational stop surface 28b to prevent forward rotation of the derailleur hanger 34 with respect to the frame F. Thus, the third portion 43 can be referred to as a stop. However, the derailleur hanger 34 can be rotated relative to the vehicle frame F in a rearward direction when the frictionally holding force of the frictional fastening has been exceeded. Also, when the derailleur hanger 34 is secured to the rear portion 28 of the vehicle frame F in a position in which the third portion 43 spaced from the forward rotational stop surface 28b, the derailleur hanger 34 can be rotated relative to the vehicle frame F in a forward direction by applying a forward force exceeding the frictionally holding force of the frictional fastening. In this way, the third portion 43 is configured to restrict rotational movement of the derailleur hanger 34 relative the frame F about the center axis A of the hub axle 24 in the installed state. The rear portion 28 of the vehicle frame F also includes a stop member 28c that is formed adjacent to the recess 66. The forward rotational stop surface 28b and the stop member 28c each form a restricting portion of the vehicle frame F. Thus, the forward rotational stop surface 28b can also be referred to as a restricting portion 28b and the stop member 28c can also be referred to as a restricting portion 28c. When the derailleur hanger 34 is installed the rear portion 28 of the vehicle frame F, the restricting portion 28c does not cooperate with the derailleur hanger 34. Rather, only the restricting portion 28b cooperate with the derailleur hanger 34.

Referring now to FIGS. 14 to 17, a derailleur hanger assembly 110 will now be explained in accordance with a second embodiment. In view of the similarity between the first embodiment and the second embodiment, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The derailleur hanger assembly 110 includes a derailleur hanger 134 and the hanger bolt 36 of the first embodiment. Here, the derailleur hanger assembly 110 further includes the hanger washer 38 of the first embodiment. The derailleur hanger 134 is configured to be secured to the rear portion 28 of the vehicle frame F using the hanger bolt 36 in the same manner as the first embodiment.

The derailleur hanger 134 basically comprises a first portion 141 and a second portion 142. The second portion 142 is coupled to the first portion 141. In the second embodiment, the derailleur hanger 134 further comprises a third portion 143. The third portion 143 is coupled to the first portion 141. The derailleur hanger 134 is identical to the derailleur hanger 34 in shape and function. The only difference between the derailleur hanger 134 and the derailleur hanger 34 is that the derailleur hanger 34 is made of a single material while the derailleur hanger 134 is made of two different materials.

In the second embodiment, the derailleur hanger 134 is constructed of a metallic portion and a non-metallic portion. Specifically, the derailleur hanger 134 includes a base member 135 and an outer member 137. The base member 135 is made of a metallic material. The base member 135 can be cast, stamped, forged or machined. The outer member 137 is made of a non-metallic material. The non-metallic material is injection molded around the metallic material of the base member 135 to form the outer member 137 on the base member 135. Here, the base member 135 includes at least one through hole 135a which is filled with the non-metallic material from the outer member 137. In this way, the outer member 137 is secured to the base member 135.

In the second embodiment, the first portion 141 is partially formed by the base member 135 and the outer member 137. Thus, the first portion 141 includes a metallic portion 141a. Also, the first portion 141 includes a non-metallic portion 141b. On the other hand, in the second embodiment, the second portion 142 is completely formed by the base member 135. The second portion 142 includes a metallic portion 142a. The metallic portion 141a of the first portion 141 and the metallic portion 142a of the second portion 142 are formed of a one-piece member of a suitable metallic material such as aluminum. The non-metallic portion 141b is formed of a suitable non-metallic material such as plastic or a fiber reinforced plastic (e.g., plastic reinforced with carbon fibers or glass fibers).

Figure 14:
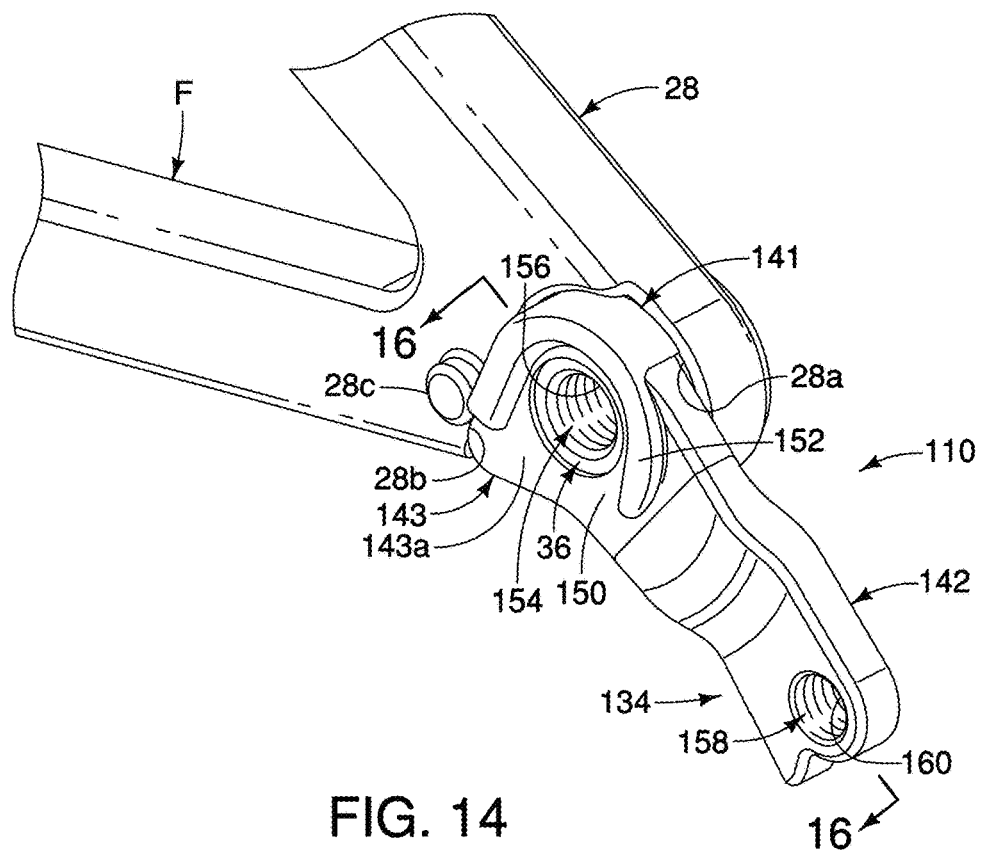
FIG. 14 is an inside (first side) perspective view of the right rear frame portion and a derailleur hanger assembly mounted to the right rear frame portion in accordance with a second embodiment.
Figure 15:
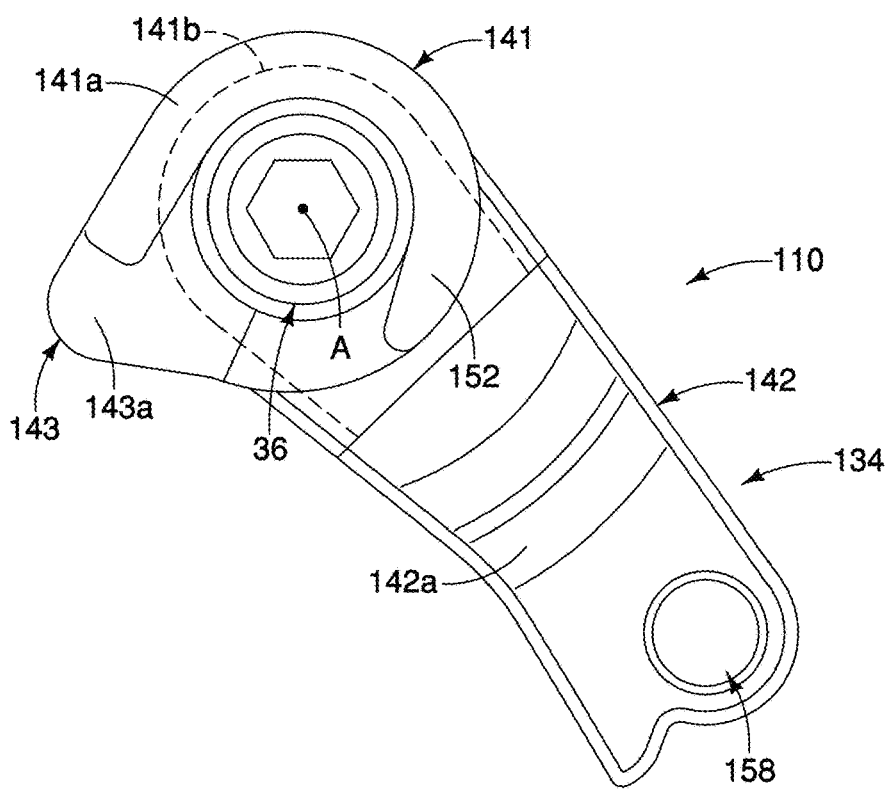
FIG. 15 is an inside (first side) elevational view of the derailleur hanger assembly illustrated in FIG. 14.
Figure 16:
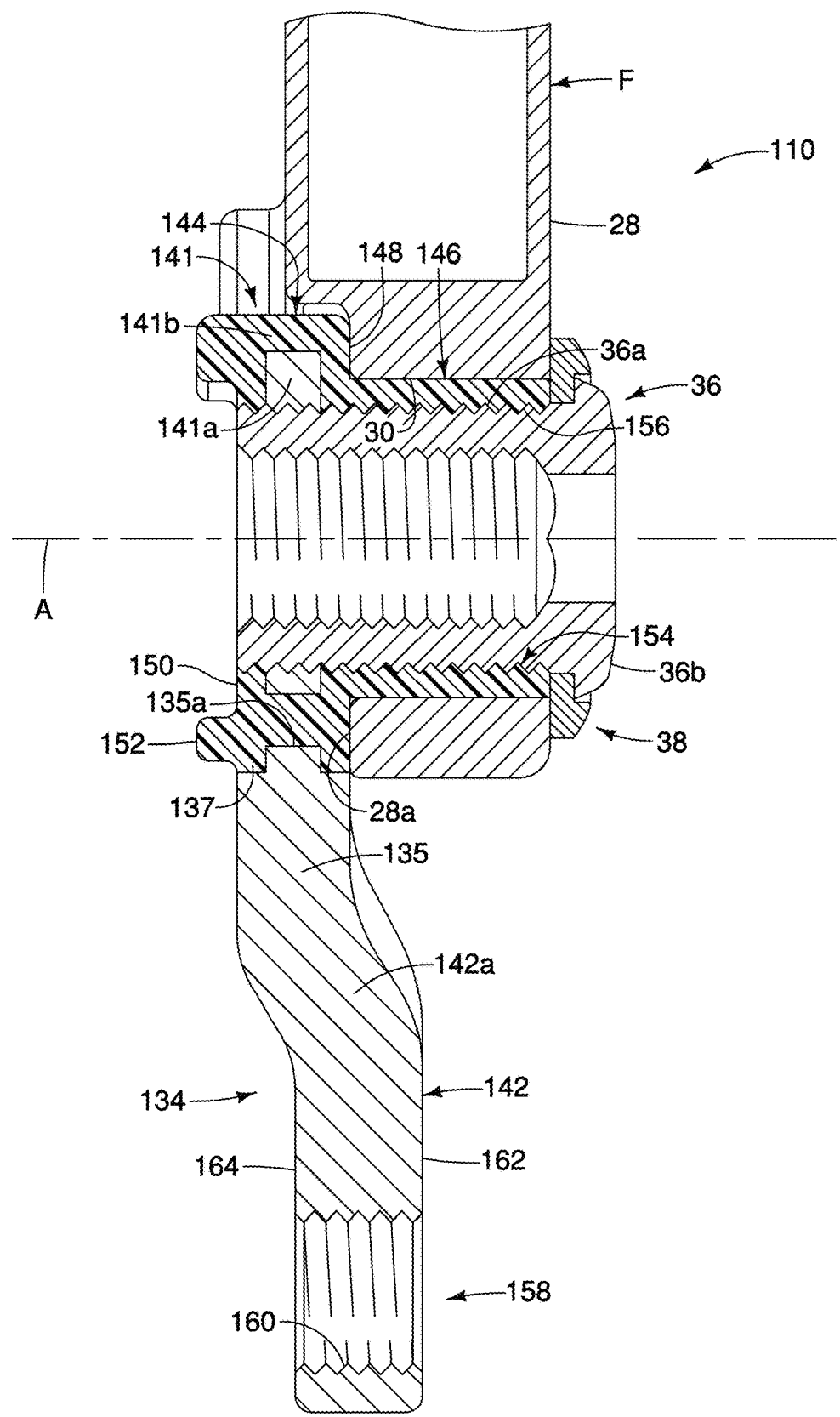
FIG. 16 is a cross sectional view of the derailleur hanger assembly illustrated in FIGS. 14 and 15 as seen along section line 16-16 of FIG. 14.
Figure 17:
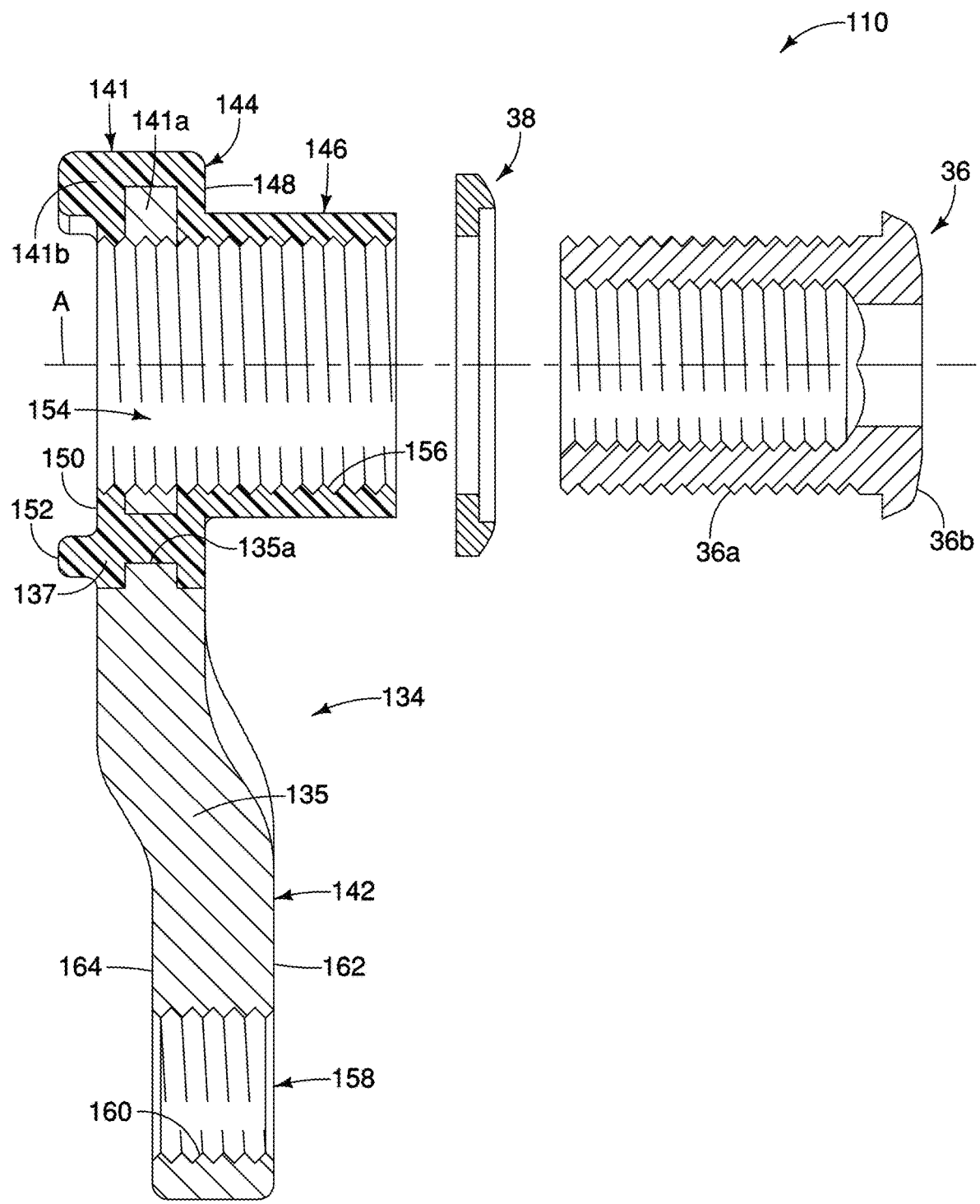
FIG. 17 is an exploded cross sectional view, similar to FIG. 16, of the derailleur hanger assembly illustrated in FIGS. 14 to 16, but where the fixing bolt and the fixing washer have be exploded from the derailleur hanger.
Figure 18:
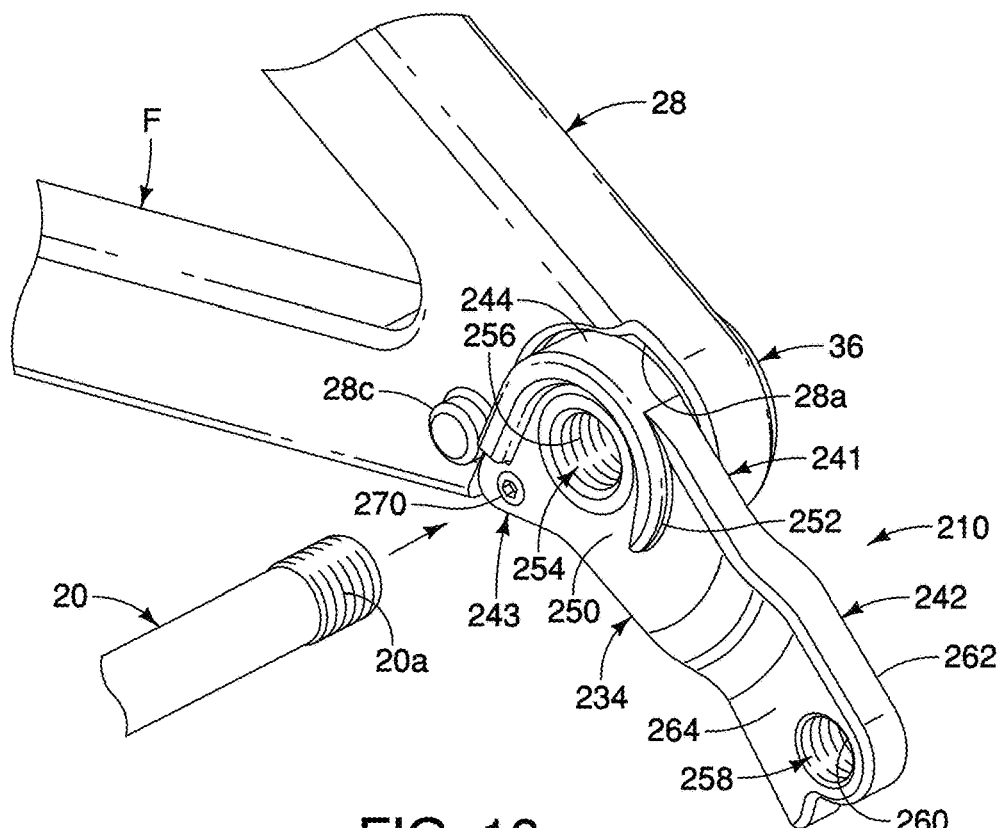
FIG. 18 is an inside (first side) perspective view of a right rear frame portion and a derailleur hanger assembly mounted to the right rear frame portion in accordance with a third embodiment.
Figure 19:
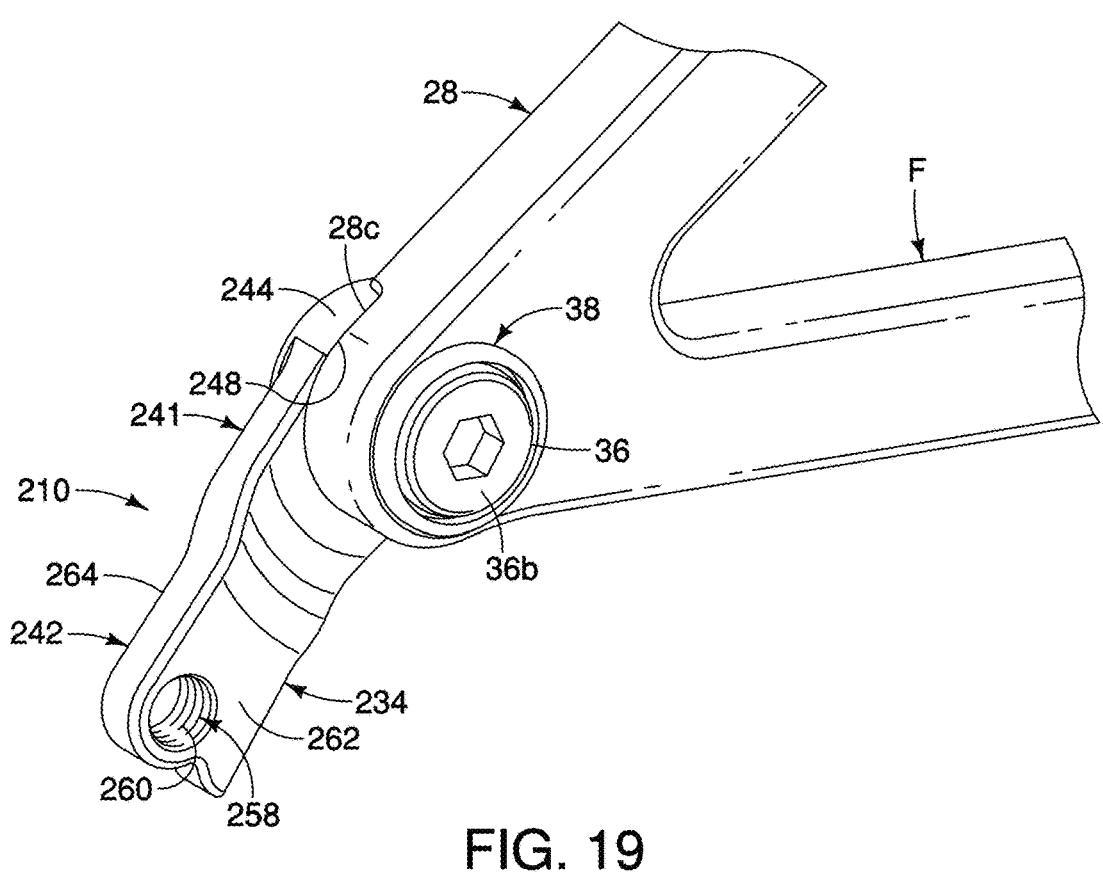
FIG. 19 is an outside (second side) perspective view of a right rear frame portion and the derailleur hanger assembly illustrated in FIG. 18.
Figure 20:
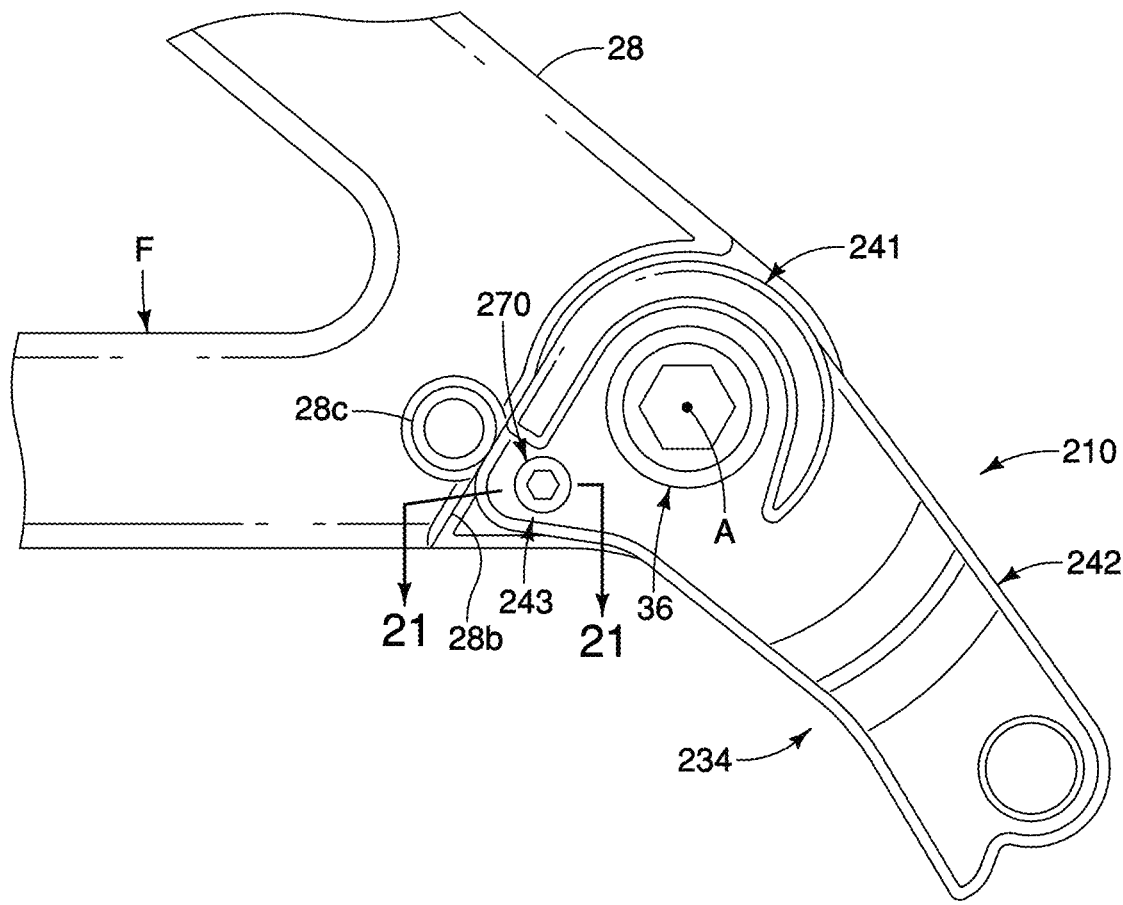
FIG. 20 is an inside (first side) elevational view of the right rear frame portion and the derailleur hanger assembly illustrated in FIGS. 18 and 19.
Figure 21:
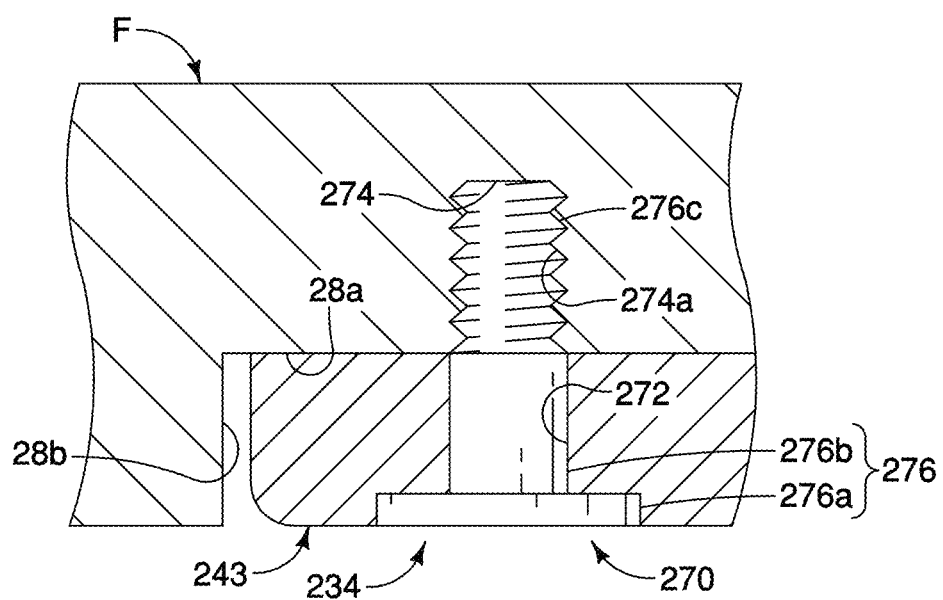
FIG. 21 is a partial cross sectional view of the right rear frame portion and the derailleur hanger assembly illustrated in FIG. 18 as seen along section line 21-21 of FIG. 20.

Here, in the second embodiment, the third portion 143 includes a non-metallic portion 143a that is formed by the non-metallic material of the outer member 137. In other words, the non-metallic portion 141b of the first portion 141 and the non-metallic portion 143a of the third portion 143 are integrally formed as a one-piece member of the outer member 137. Similar to the first embodiment, the third portion 143 is configured to restrict rotational movement of the derailleur hanger 134 relative the frame F about the center axis A of the hub axle 24 in the installed state. Specifically, as seen in FIG. 14, the third portion 143 is configured to contact the forward rotational stop surface 28b to prevent forward rotation of the derailleur hanger 134 with respect to the frame F.

The first portion 141 includes a first part 144 and a second part 146. The first part 144 includes a frame contact surface 148. The frame contact surface 148 contacts the inner facing surface 28a of the rear portion 28 of the vehicle frame F in the installed state. The first part 144 further includes an axle contact surface 150. The axle contact surface 150 contacts the end surface 24a of the hub axle 24 in the installed state. The first part 144 further includes a collar 152. The collar 152 protrudes from the axle contact surface 150. The non-metallic portion 141b of the first portion 141 includes the axle contact surface 150 and the collar 152. Thus, the axle contact surface 150 and the collar 152 are formed of a non-metallic material.

Similar to the first embodiment, the second part 146 is a tubular member having an axle receiving bore 154 that extends from the first part 144. The second part 146 is received in the mounting opening 30 of the rear portion 28 of the vehicle frame F in the installed state. The axle receiving bore 154 includes an internal thread 156 for threadedly receiving the hanger bolt 36. The non-metallic portion 141b of the first portion 141 includes the second part 146. Thus, the second part 146 is formed of a non-metallic material. The second part 146 can also be referred to as a receptacle.

The second portion 142 is configured to support the derailleur 12. In particular, the second portion 142 includes a fixing bolt receiving bore 158 having an internal thread 160 that threadedly receives the fixing bolt 18 of the derailleur 12. Alternatively, the fixing bolt receiving bore 158 can be unthreaded and the derailleur 12 can be attached to the second portion 142 using a bolt and a nut.

The second portion 142 includes a first surface 162 and a second surface 164. The first surface 162 and the second surface 164 are disposed on opposite sides of the second portion 142. In the installed state, the first surface 162 and the second surface 164 are arranged with respect to the vehicle frame F in the same manner as the first surface 62 and the second surface 64 of the derailleur hanger 34. Thus, the description of the first surface 62 and the second surface 64 also applies to the first surface 162 and the second surface 164.

Referring now to FIGS. 18 to 21, a derailleur hanger assembly 210 will now be explained in accordance with a third embodiment. In view of the similarity between the first embodiment and the third embodiment, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The derailleur hanger assembly 210 includes a derailleur hanger 234 and the hanger bolt 36 of the first embodiment. Here, the derailleur hanger assembly 210 further includes the hanger washer 38 of the first embodiment. The derailleur hanger 234 is configured to be secured to the rear portion 28 of the vehicle frame F using the hanger bolt 36 in the same manner as the first embodiment.

The derailleur hanger 234 basically comprises a first portion 241, a second portion 242 and a third portion 243. The second portion 242 is coupled to the first portion 241.

The third portion 243 is coupled to the first portion 241. The first portion 241, the second portion 242 and the third portion 243 are a one-piece member. The derailleur hanger 234 is identical to the derailleur hanger 34 in shape and function, except that the third portion 243 has been modified so that the third portion 243 can be rotationally fixed with respect to the rear portion 28 of the vehicle frame F.

In the third embodiment, the derailleur hanger 234 further comprises a restricting member 270. The restricting member 270 is configured to restrict rotation of the derailleur hanger 234 about the center axis A of the hub axle 24 in the installed state. Basically, the third portion 243 is configured to have the restricting member 270 attached to the third portion 243. The restricting member 270 is configured to be coupled between the third portion 243 and the rear portion 28 of the vehicle frame F to restrict rotation of the derailleur hanger 234 about the center axis A of the hub axle 24 in the installed state. In the third embodiment, the third portion 243 includes a first hole 272. The first hole 272 is configured to receive a first portion of the restricting member 270. In the third embodiment, the rear portion 28 of the vehicle frame F includes a second hole 274. The second hole 274 is configured to receive a second portion of the restricting member 270. Here, the second hole 274 is a blind bore. Alternatively, the second hole 274 is a through bore. In the case where the derailleur hanger 234 is fixed to the rear portion 28 of the vehicle frame F by the restricting member 270, the stop member 28c of the rear portion 28 of the vehicle frame F can be omitted.

In the third embodiment, the restricting member 270 is detachably provided to the third portion 243. For example, in the third embodiment, the restricting member 270 includes a bolt 276 having a head portion 276a and a shaft portion 276b. The shaft portion 276b is disposed in the first hole 272 of the third portion 243 and the second hole 274 of the frame F. The head portion 276a is configured to contact one of the third portion 243 and the frame F. In the third embodiment, the head portion 276a contacts the third portion 243. The shaft portion 276b includes an external thread 276c that engages an internal thread 274a of the second hole 274 of the frame F. In this way, the derailleur hanger 234 is prevented from rotating about the center axis A in the installed state.

Figure 22:
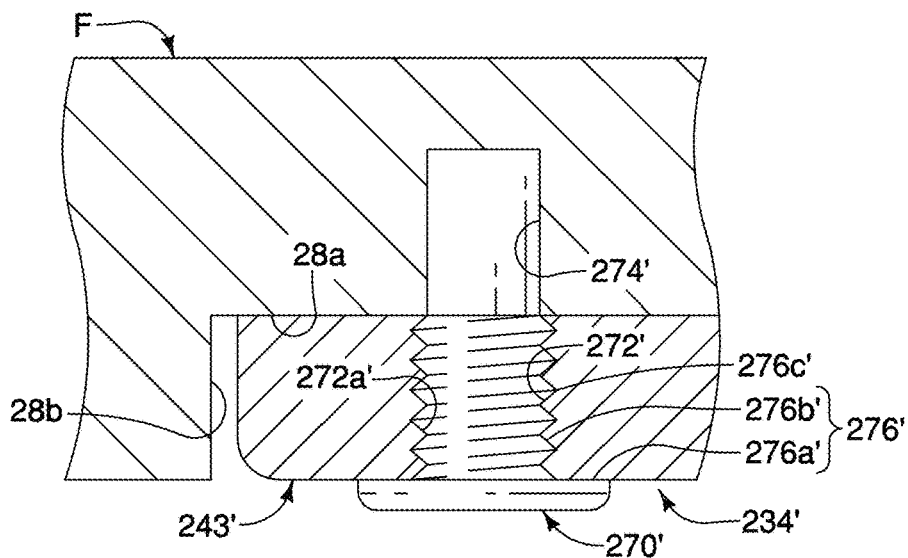
FIG. 22 is a partial cross sectional view, similar to FIG. 21, of a first modification of the right rear frame portion and the derailleur hanger assembly illustrated in FIG. 20.

Referring now to FIG. 22, a first modification of the derailleur hanger 234 will now be explained. Here, a derailleur hanger 234' is identical to the derailleur hanger 234 of FIGS. 18 to 20 except that the derailleur hanger 234' includes a third portion 243' having a first hole 272' that includes an internal thread 272a' for threadedly receiving a restricting member 270'. Thus, only the third portion 243' of the derailleur hanger 234' is illustrated.

In this first modification of the third embodiment, the restricting member 270' includes a bolt 276' having a head portion 276a' and a shaft portion 276b'. The shaft portion 276b' has a first shaft section disposed in the first hole 272' of the third portion 243' and a second shaft section disposed in the second hole 274' of the frame F. The head portion 276a' contacts the third portion 243'. The shaft portion 276b' includes an external thread 276c' that engages an internal thread 272a' of the first hole 272' of the third portion 243'. In this way, the derailleur hanger 234' is prevented from rotating about the center axis A in the installed state.

Figure 23:
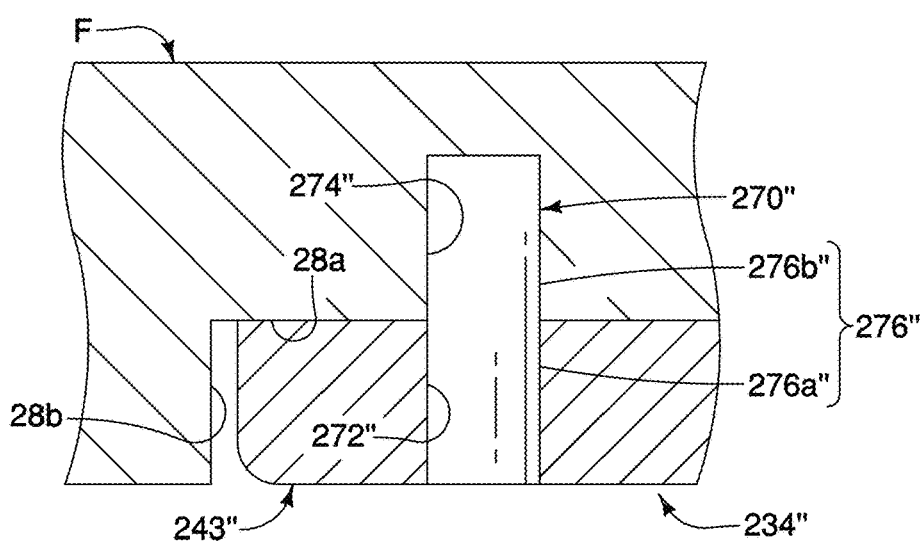
FIG. 23 is a partial cross sectional view, similar to FIG. 21, of a second modification of the right rear frame portion and the derailleur hanger assembly illustrated in FIG. 20.

Referring now to FIG. 23, a second modification of the derailleur hanger 234 will now be explained. Here, a derailleur hanger 234" is identical to the derailleur hanger 234 of FIGS. 18 to 20 except that the derailleur hanger 234" includes a third portion 243" having a first hole 272" for receiving a restricting member 270". Thus, only the third portion 243" of the derailleur hanger 234" is illustrated. In this second modification of the third embodiment, the restricting member 270" includes a pin 276" having a first shaft section 276a" and a second shaft section 276b". The first shaft section 276a" is disposed in the first hole 272" of the third portion 243". The second shaft section 276b" is disposed in a second hole 274" of the frame F. The pin 276" is fixed in the first hole 272" of the third portion 243". For example, the pin 276" is bonded and/or press-fitted in the first hole 272" of the third portion 243". In this way, the derailleur hanger 234" is prevented from rotating about the center axis A in the installed state. Alternatively, the pin 276" is bonded and/or press-fitted in the second hole 274" of the frame F.

Figure 24:
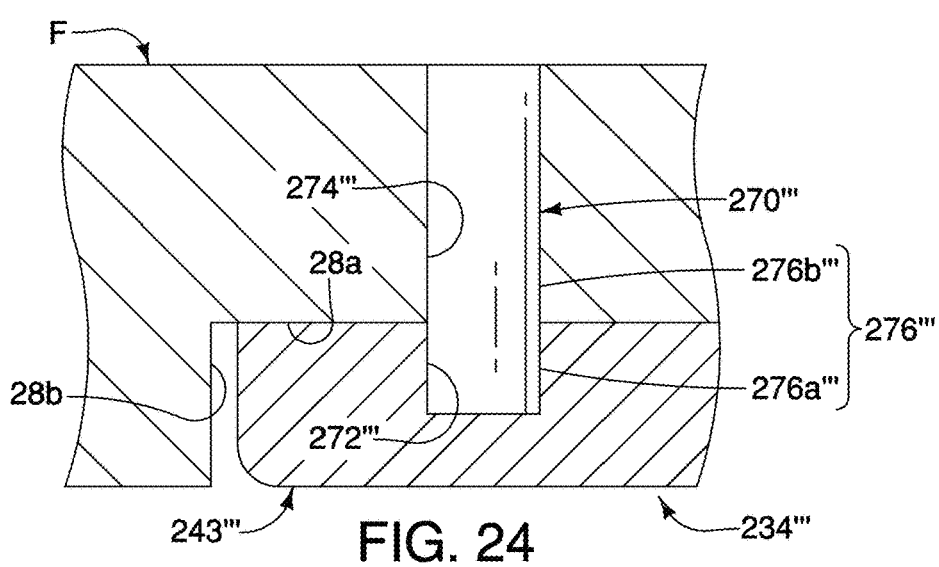
FIG. 24 is a partial cross sectional view, similar to FIG. 21, of a third modification of the right rear frame portion and the derailleur hanger assembly illustrated in FIG. 20.

Referring now to FIG. 24, a third modification of the derailleur hanger 234 will now be explained. Here, a derailleur hanger 234" is identical to the derailleur hanger 234 of FIGS. 18 to 20 except that the derailleur hanger 234'" includes a third portion 243'" having a first hole 272'" for receiving a restricting member 270". Thus, only the third portion 243' of the derailleur hanger 234" is illustrated. In this third modification of the third embodiment, the restricting member 270" includes a pin 276" having a first shaft section 276a'" and a second shaft section 276b'". The first shaft section 276a'" is disposed in the first hole 272'" of the third portion 243'". The second shaft section 276b" is disposed in a second hole 274'" of the frame F. The pin 276" is fixed in the second hole 274'" of the frame F. For example, the pin 276'" is bonded and/or press-fitted in the second hole 274" of the frame F. In this way, the derailleur hanger 234'" is prevented from rotating about the center axis A in the installed state. Alternatively, the pin 276" is bonded and/or press-fitted in the first hole 272'" of the third portion 243".

Figure 25:
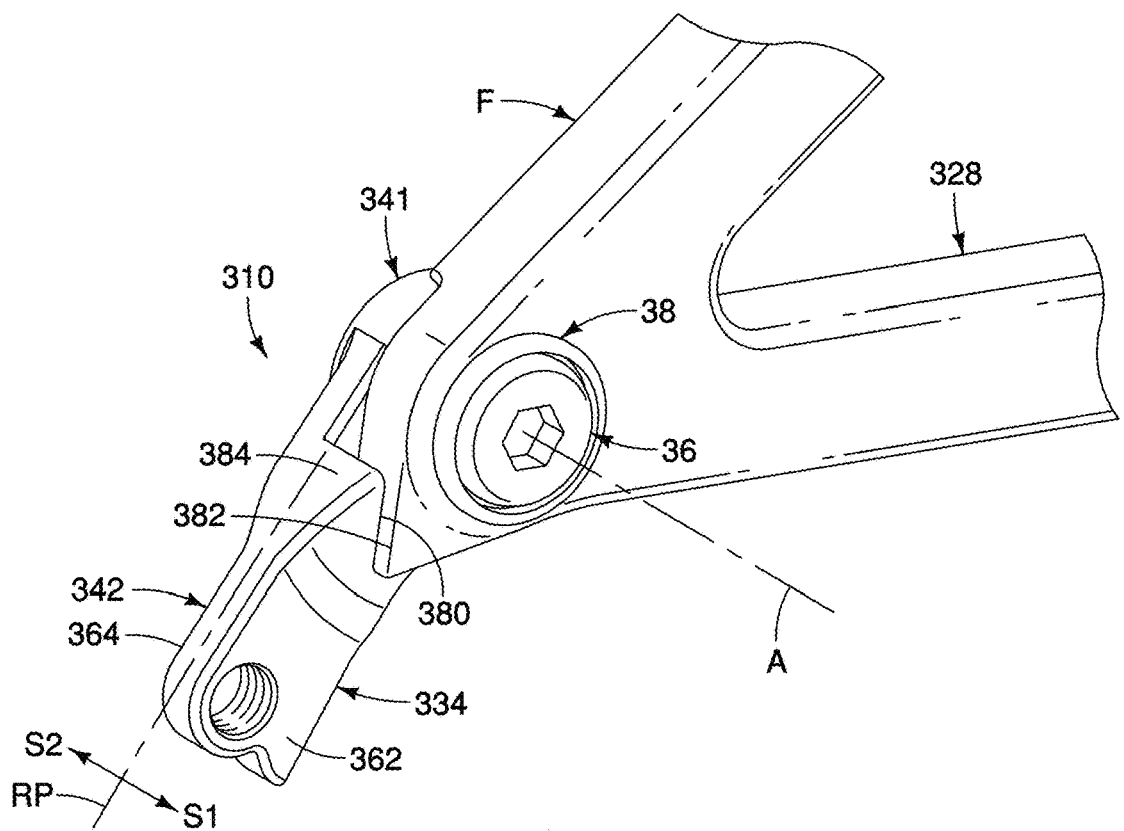
FIG. 25 is an outside (second side) perspective view of a right rear frame portion and a derailleur hanger assembly in accordance with a fourth embodiment.
Figure 26:
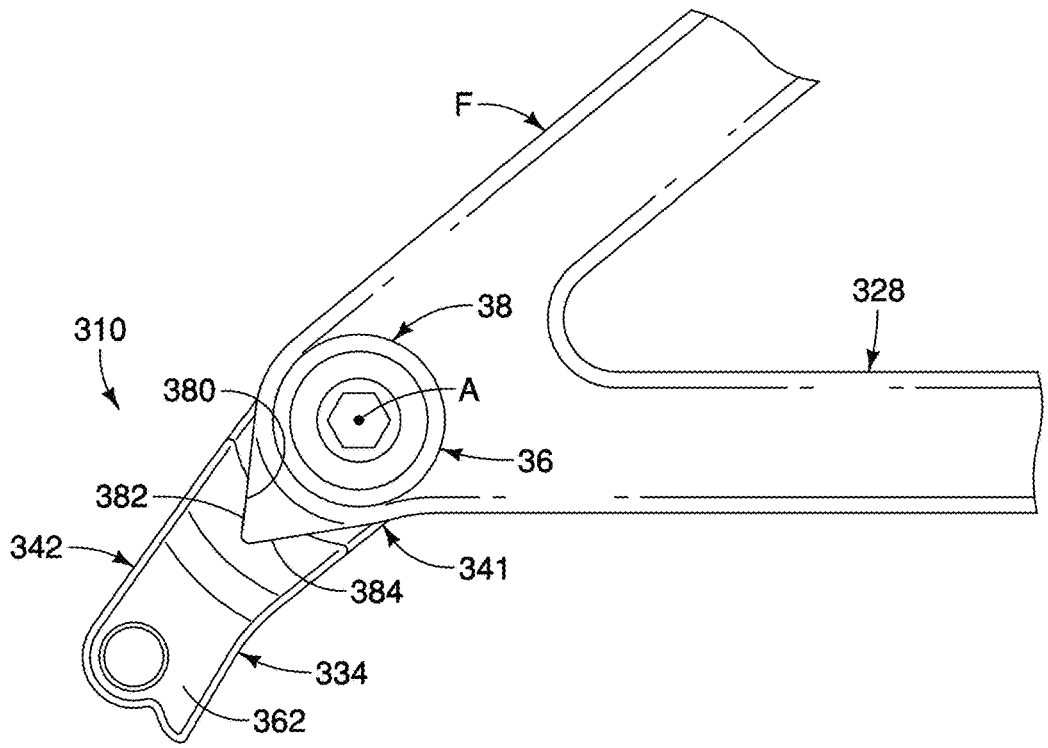
FIG. 26 is an outside (second side) elevational view of the right rear frame portion and the derailleur hanger assembly illustrated in FIG. 25.
Figure 27:
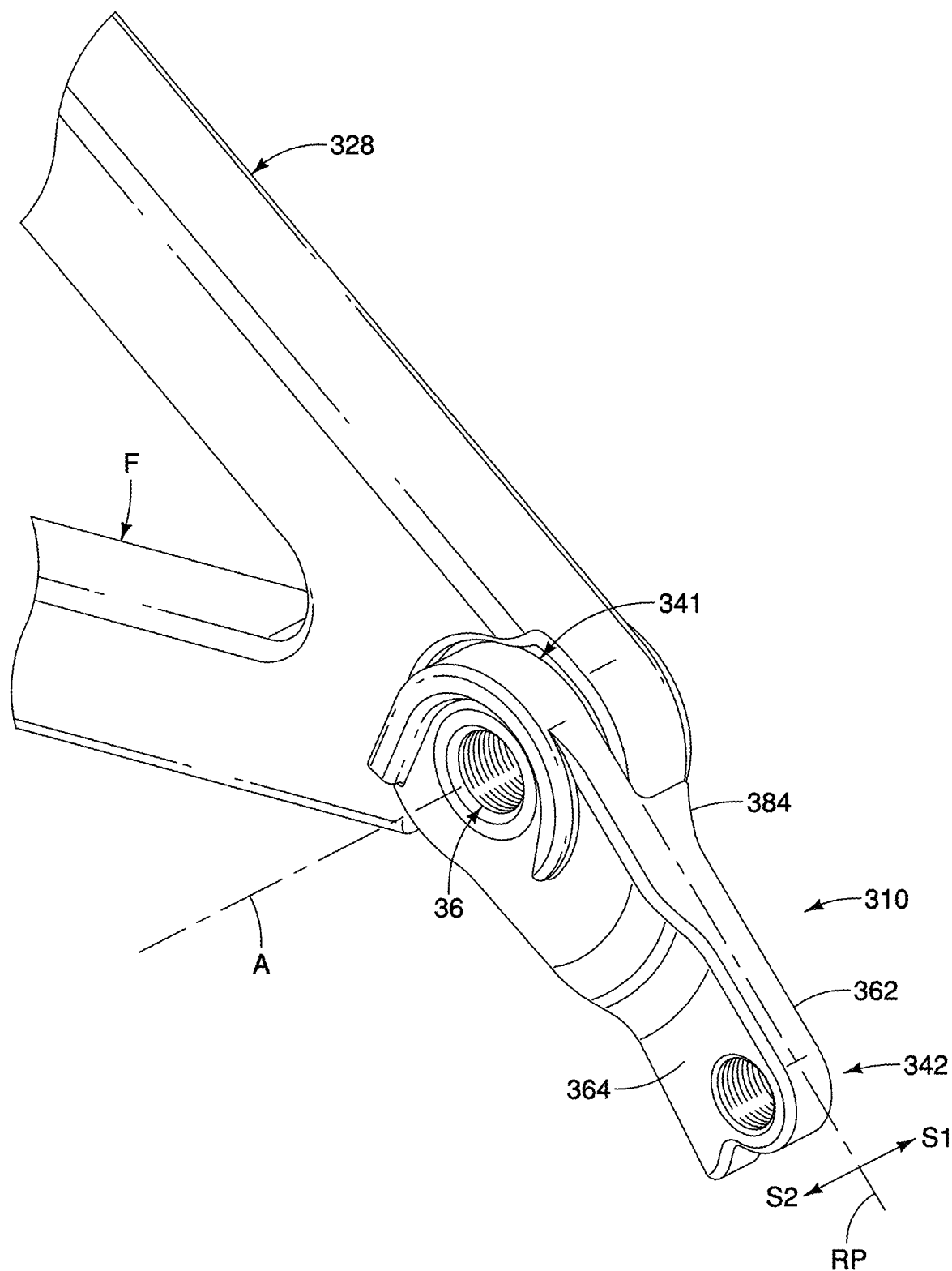
FIG. 27 is an inside (first side) elevational view of a right rear frame portion and the derailleur hanger assembly illustrated in FIGS. 25 and 26.

Referring now to FIGS. 25 to 27, a derailleur hanger assembly 310 will now be explained in accordance with a fourth embodiment. In view of the similarity between the first embodiment and the fourth embodiment, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The derailleur hanger assembly 310 includes a derailleur hanger 334 and the hanger bolt 36 of the first embodiment. Here, the derailleur hanger assembly 310 further includes the hanger washer 38 of the first embodiment. The derailleur hanger 334 is configured to be secured to a rear portion 328 of a vehicle frame F using the hanger bolt 36 in the same manner as the first embodiment.

The derailleur hanger 334 basically comprises a first portion 341 and a second portion 342. The second portion 342 is coupled to the first portion 341. The first portion 341 and the second portion 342 are a one-piece member. In the fourth embodiment, the second portion 342 includes a restricting surface 380 at least partially disposed at the first side S1. The restricting surface 380 is configured to contact with the frame F to restrict rotation of the derailleur hanger 334 about the center axis A of the hub axle 24 in the installed state. Therefore, in the fourth embodiment, the third portion 43 of the first embodiment is not needed, because the restricting surface 380 functions as the restricting portion. Here, the derailleur hanger 334 does not include the third portion 43 of the first embodiment.

Here, in the fourth embodiment, the second portion 342 includes a first surface 362 and a second surface 364. Similar to the first embodiment, the first surface 362 is disposed on the first side S1 of the reference plane RP, and the second surface 364 is disposed on the second side S2 of the reference plane RP. Similar to the first embodiment, the first surface 362 and the second surface 364 are also parallel.

In the fourth embodiment, the rear portion 328 of the vehicle frame F includes a rear surface 382 having a non-cylindrical shape. The restricting surface 380 and the rear surface 382 are positioned to be at least partly aligned with respect to a direction parallel to the center axis A in the installed state. The restricting surface 380 of the second portion 342 contacts the rear surface 382 of the rear portion 328 of the vehicle frame F to prevent rotation of the derailleur hanger 334 relative to the frame F in the installed state. Specifically, the second portion 342 includes a protruding part 384 having a recess that forms the restricting surface 380. Thus, the restricting surface 380 can be referred to as a first mating surface, and the rear surface 382 can be referred to as a second mating surface. Also, the protruding part 384 can be referred to as a first mating part, and the rear portion 328 can be referred to as a second mating part. The protruding part 384 is configured to protrude toward the first side S1 relative to the reference plane RP in the installed state. Therefore, the restricting surface 380 can be formed at the protruding part 384 of the second portion 342 which is formed in the process of forming of the first surface 362.

Referring now to FIGS. 28 to 35, a derailleur hanger assembly 410 will now be explained in accordance with a fifth embodiment. The derailleur hanger assembly 410 is configured to mount a derailleur 412 to a rear portion 428 of the vehicle frame F. Here, the derailleur 412 is a bicycle rear derailleur that is typically used with a road bike. Of course, the derailleur hanger assembly 410 can be modified to be used with other types of derailleurs. In the fifth embodiment, the derailleur hanger assembly 410 is used with a hub that is attached to the vehicle frame F using a quick release axle having a skewer 420. The skewer 420 has a center axis that corresponds to the center axis A of the hub.

The derailleur 412 basically comprises a base member 412A, a movable member 412B, a linkage 412C and a chain guide 142D. Here, the derailleur 412 is an electric derailleur having a motor unit 412E. In this way, the base member 412A is configured to be attached to the frame F of the human-powered vehicle V by the derailleur hanger assembly 410. Preferably, the base member 412A is configured to pivot relative to the frame F about a pivot axis B1. The linkage 412C movably couples the movable member 412B to the base member 412A. The movable member 412B is movably coupled to the base member 12A by the linkage 412C. The chain guide 412D is pivotally coupled to the movable member 412B about a pivot axis B2. Preferably, the chain guide 412D includes at least one pulley. The at least one pulley has a rotational axis spaced from the first pivot axis A1 of the chain guide 412D. Here, the chain guide 412D includes a first pulley P1 and a second pulley P2. The first pulley P1 has a first pulley center axis X1 that is coincident with the pivot axis B2. Thus, the first pulley P1 rotates about the pivot axis B2. The second pulley P2 has a second pulley center axis X2 that is spaced from the pivot axis B2. Thus, the second pulley center axis X2 are offset from the pivot axis B2. The motor unit 412E is mounted to the base member 412A. The motor unit 12E has a reversible electric motor that is operatively coupled to the linkage 412C for moving the linkage 412C such that the movable member 412B is moved relative to the base member 412A. The electric motor of the motor unit 412E is disposed inside a housing that is mounted to the base member 412A. The base member 412A can have a first based portion and a second base portion, where the motor unit 12E is disposed between the first based portion and the second base portion.

Figure 28:
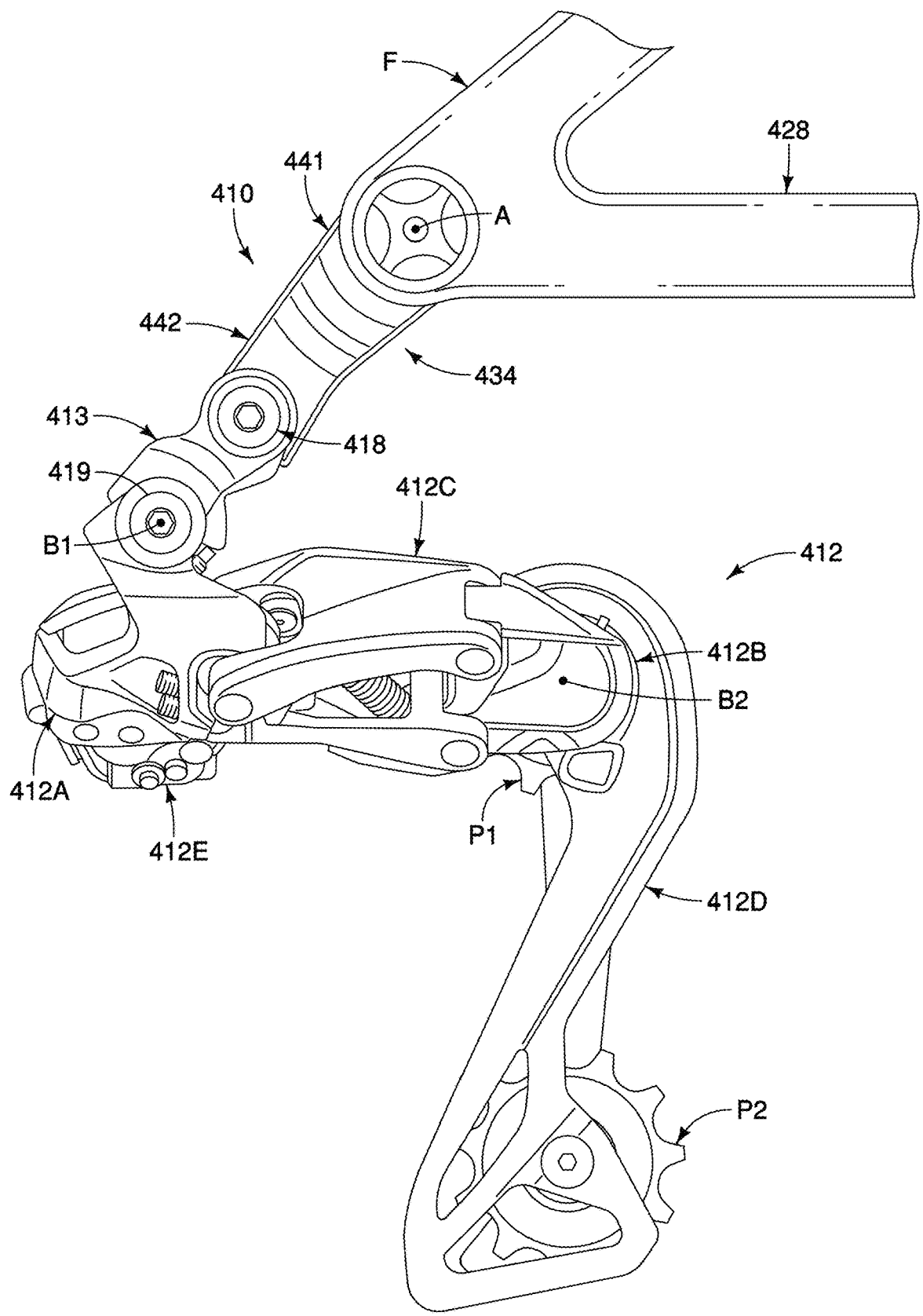
FIG. 28 is a right side elevational view of a rear portion of a vehicle frame having a rear derailleur mounted to the vehicle frame by a derailleur hanger assembly in accordance with a fifth embodiment.
Figure 29:
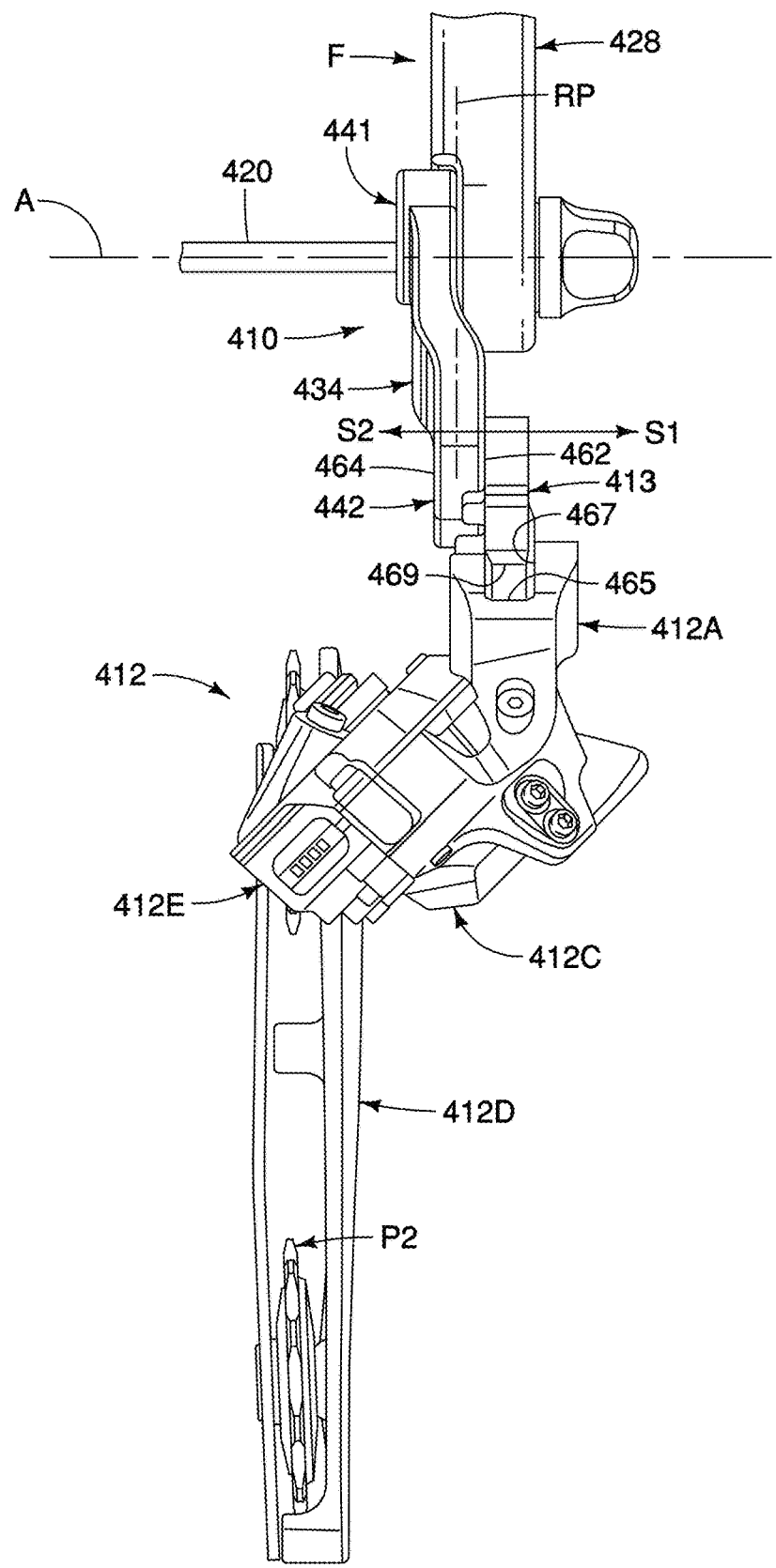
FIG. 29 is a rear elevational view of the rear portion of the vehicle frame, the rear derailleur and the derailleur hanger assembly illustrated in FIG. 28.
Figure 30:
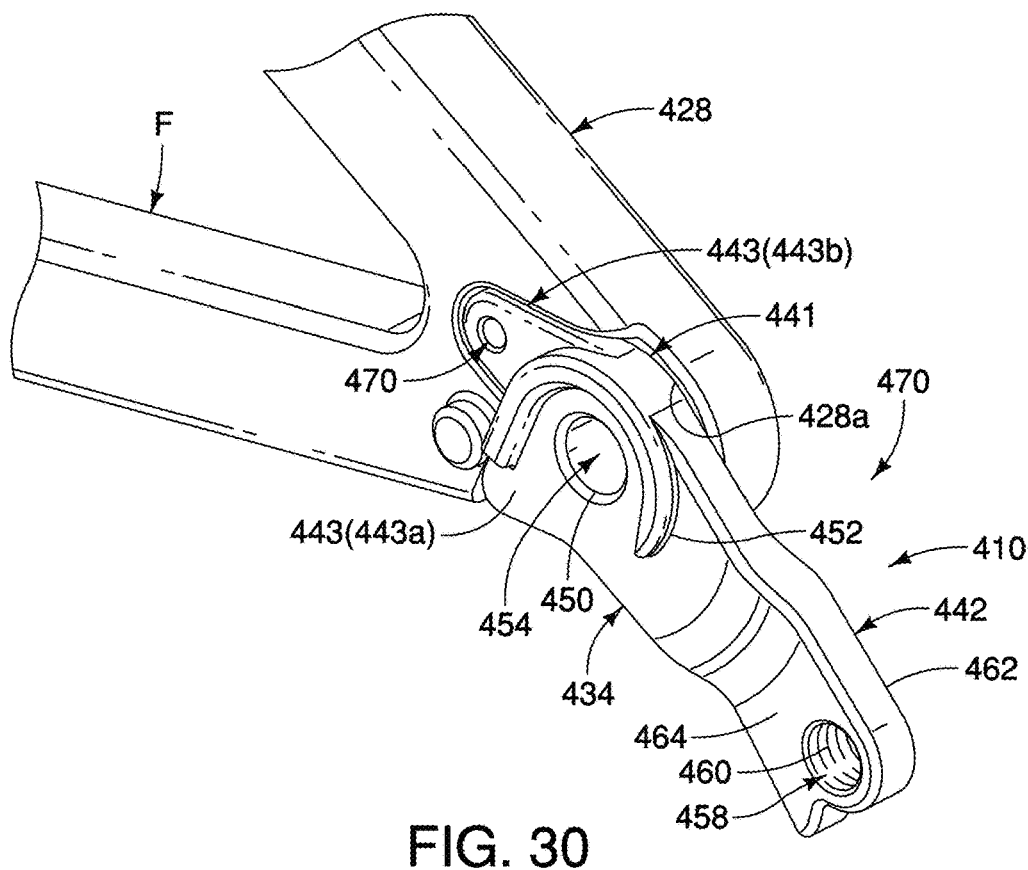
FIG. 30 is an inside (first side) perspective view of the right rear frame portion and the derailleur hanger assembly illustrated in FIGS. 28 and 29.
Figure 31:
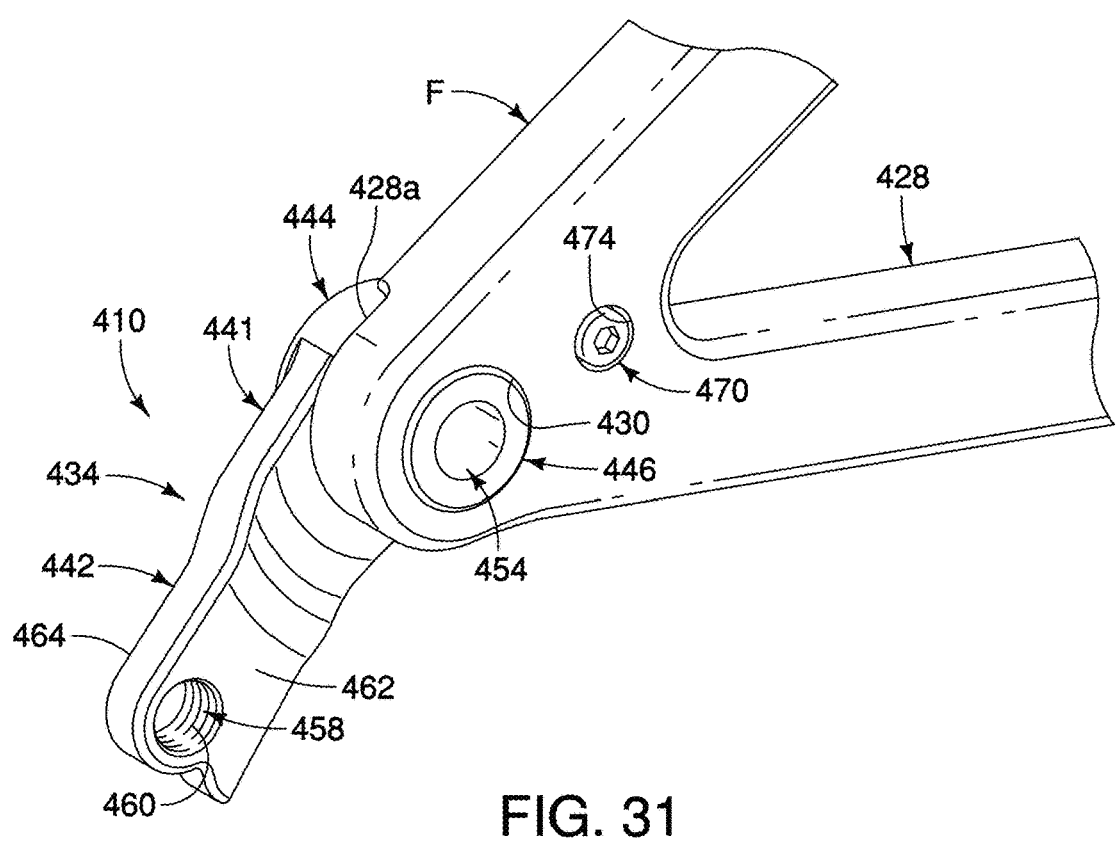
FIG. 31 is an outside (second side) perspective view of the right rear frame portion and the derailleur hanger assembly illustrated in FIGS. 28 to 30.
Figure 32:
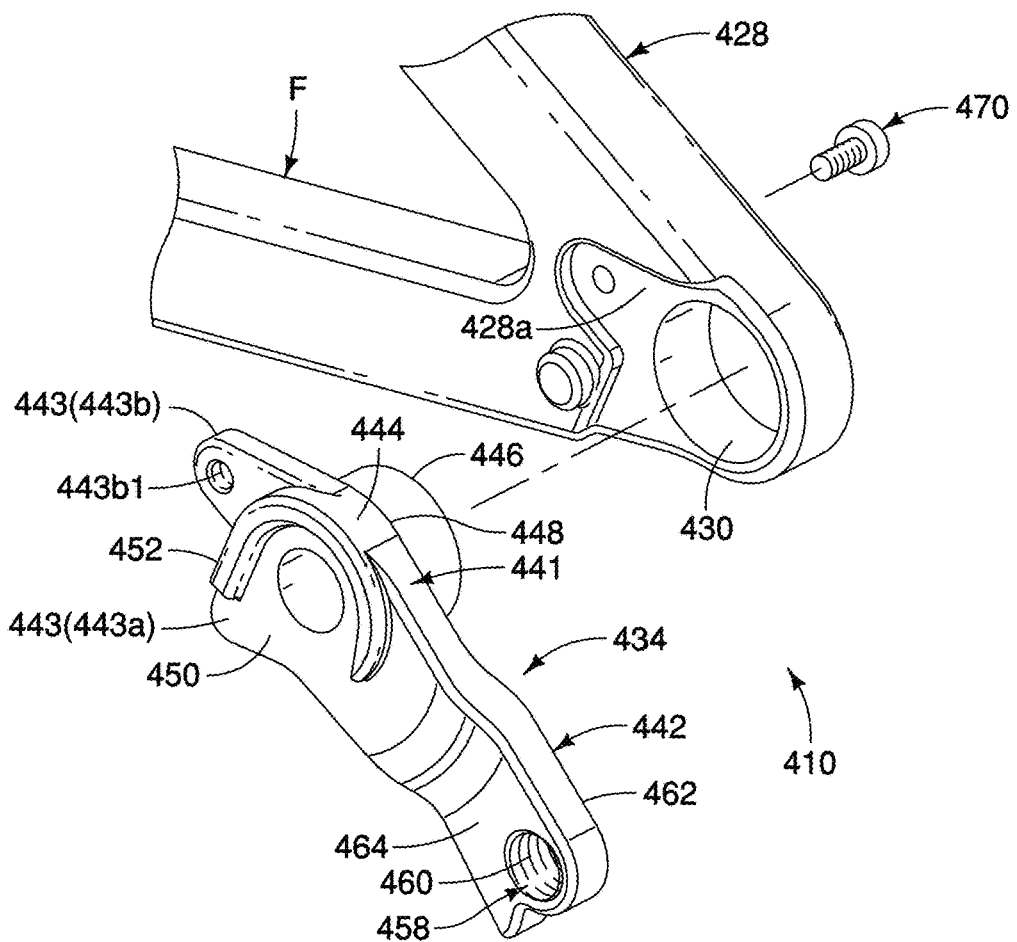
FIG. 32 is an exploded inside perspective view of the right rear frame portion and the derailleur hanger assembly illustrated in FIGS. 28 to 31.
Figure 33:
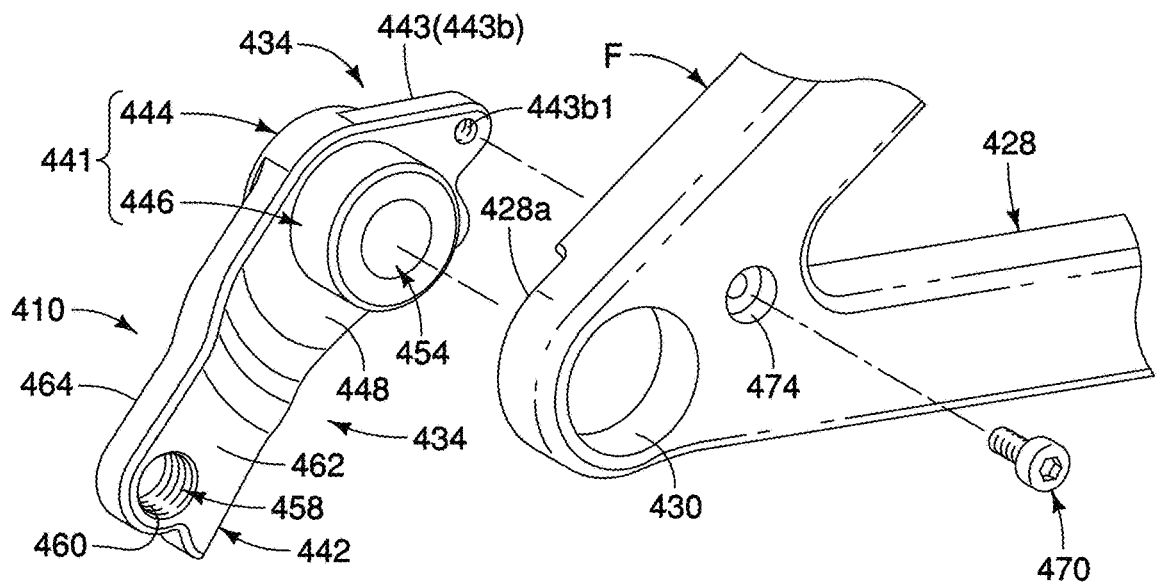
FIG. 33 is an exploded outside perspective view of the right rear frame portion and the derailleur hanger assembly illustrated in FIGS. 28 to 32.
Figure 34:
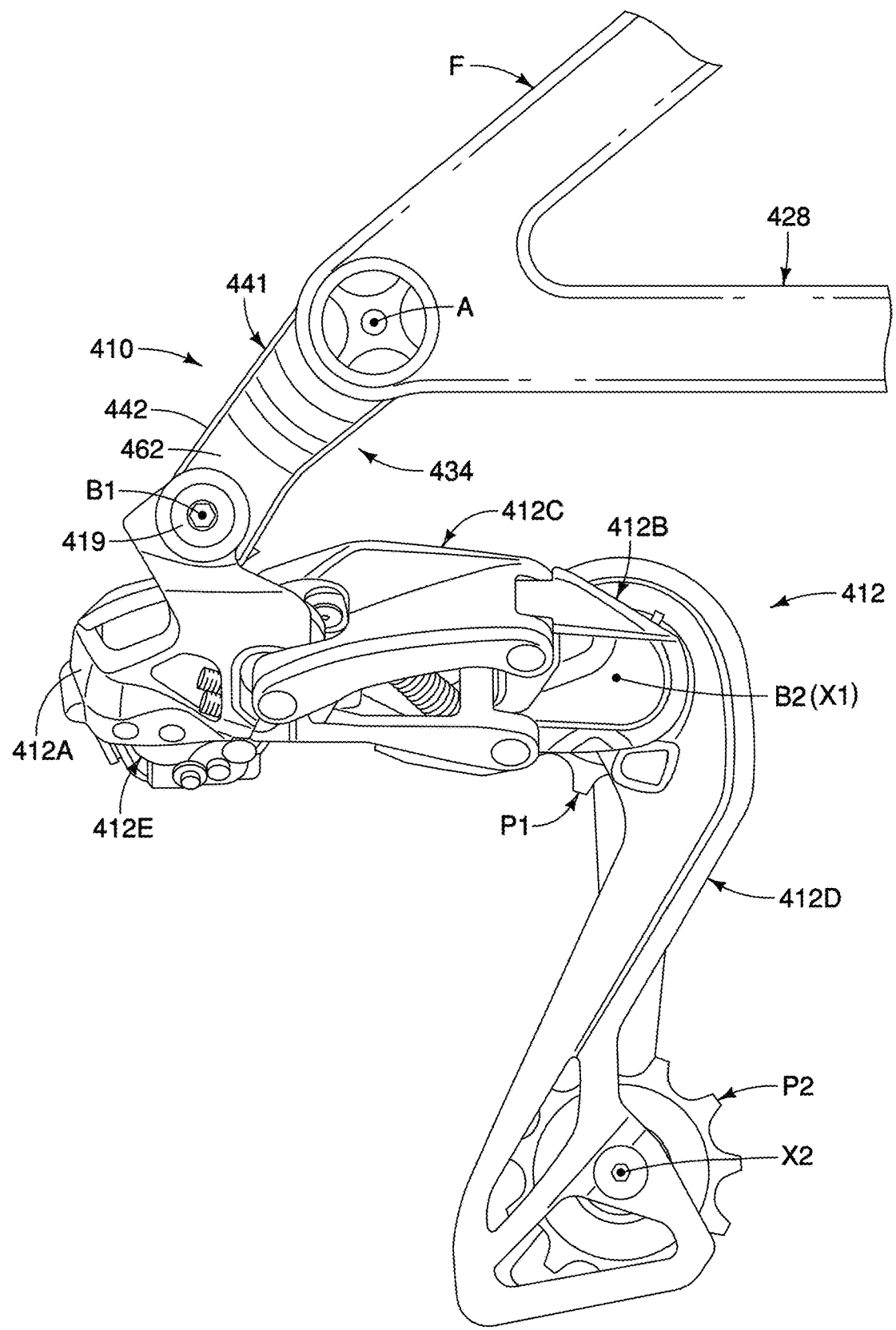
FIG. 34 is a right side elevational view, similar to FIG. 26, of the rear portion of the vehicle frame, the rear derailleur and the derailleur hanger assembly illustrated in FIGS. 28 to 32 but where the bracket has been removed and the rear derailleur is directly mounted to the derailleur hanger assembly.
Figure 35:
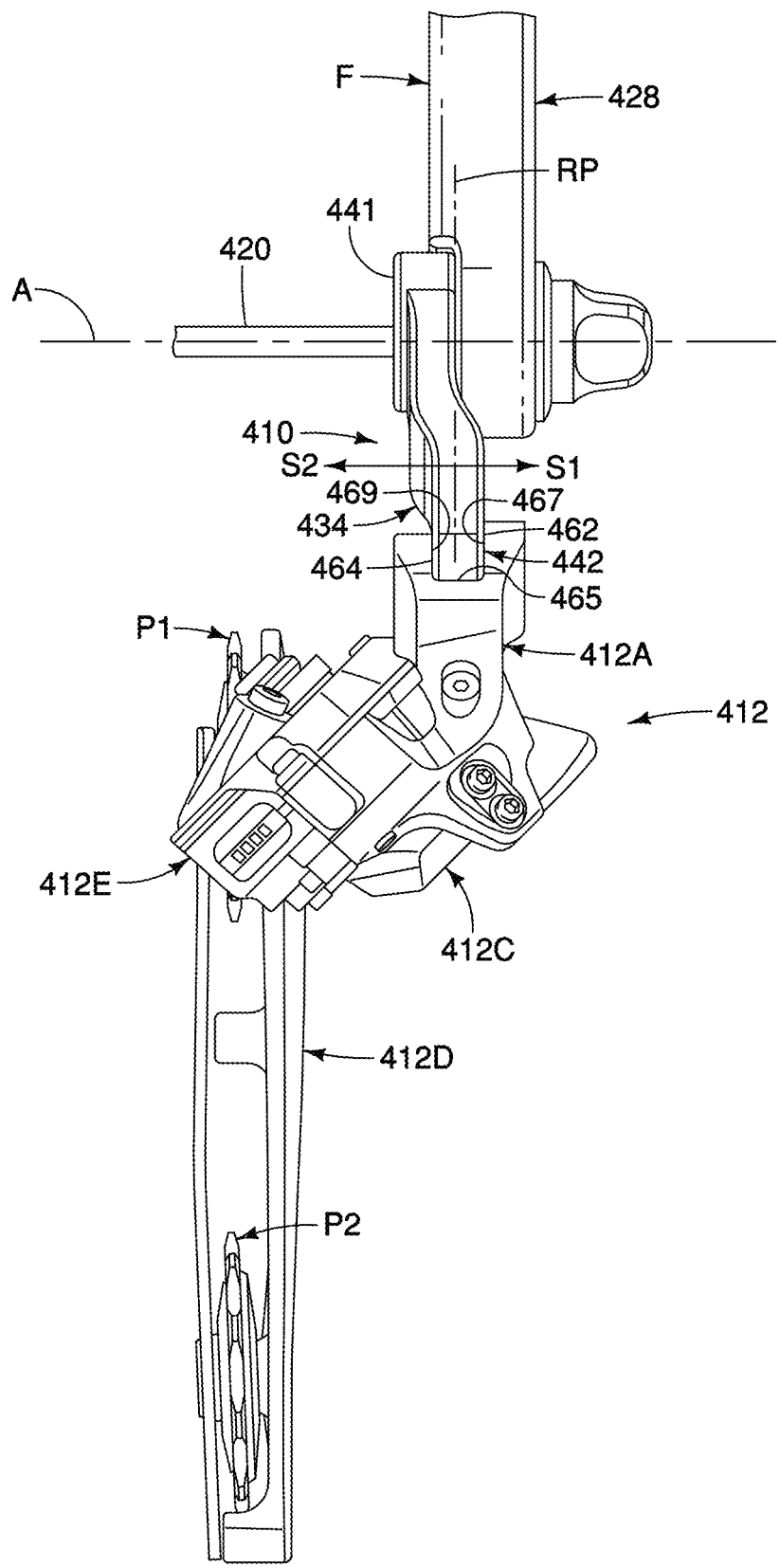
FIG. 35 is a rear elevational view of the rear portion of the vehicle frame, the rear derailleur and the derailleur hanger assembly illustrated in FIG. 30.

Here, as seen in FIGS. 28 and 29, the derailleur 412 can include a bracket 413 for attaching the derailleur 412 to the derailleur hanger assembly 410. In the case where the bracket 413 is used, one end of the bracket 413 is attached the derailleur hanger assembly 410 via a fixing bolt 418 and a second end of the bracket 413 is attached to the derailleur 412 by a second fixing bolt 419. Alternatively, as seen in FIGS. 34 and 35, the derailleur 412 can be directly attached to the derailleur hanger assembly 410 without using the bracket 413 as explained below.

In the fifth embodiment, as seen in FIGS. 30 to 33, the derailleur hanger assembly 410 basically includes a derailleur hanger 434 and a restricting member 470. Here, the derailleur hanger 434 is secured to a rear portion 428 of the vehicle frame F using the restricting member 470. The derailleur hanger 434 basically comprises a first portion 441, a second portion 442 and a third portion 443. The second portion 442 is coupled to the first portion 441. The third portion 443 is coupled to the first portion 441. The first portion 441, the second portion 442 and the third portion 443 are a one-piece member. The derailleur hanger 434 is identical to the derailleur hanger 34 in shape and function, except that the first portion 441 has been modified as explained below. In view of the similarity between the derailleur hanger 434 of the fifth embodiment and the derailleur hanger 34 of the first embodiment, the descriptions of the parts of the derailleur hanger 434 that are identical to the parts of the derailleur hanger 34 may be omitted for the sake of brevity.

Similar to the first embodiment, the first portion 441 includes a first part 444 and a second part 446. The first part 444 includes a frame contact surface 448, an axle contact surface 450 and a collar 452. The frame contact surface 448 contacts the inner facing surface 428a of the rear portion 428 of the vehicle frame F in the installed state. The frame contact surface 448 is disposed in the reference plane RP. The axle contact surface 450 contacts the end surface of the hub axle in the installed state. The frame contact surface 448 and the axle contact surface 450 are parallel and face in opposite directions. The collar 452 protrudes from the axle contact surface 450 in a direction parallel to the center axis A.

In the fifth embodiment, the third portion 443 includes a first extension part 443a and a second extension part 443b. The first extension part 443a and the second extension part 443b are coupled to the first portion 441. The first extension part 443a is the same as the third portion 43 of the first embodiment. In the case where, the second extension part 443b is provided, the extension part 443a can be omitted. The second extension part 443b includes a threaded hole 443b1 for threadedly receiving the restricting member 470 in the case where the restricting member 470 is a bolt. The rear portion 428 of the vehicle frame F includes a hole 474 for receiving the restricting member 470. Here, the hole 474 is a stepped through hole. When the restricting member 470 is inserted into the hole 474 and threaded into the threaded hole 443b1, the derailleur hanger 434 is rotationally fixed with respect to the rear portion 428 of the vehicle frame F. In this way, the derailleur hanger 434 is also secured to the rear portion 428 of the vehicle frame F using the restricting member 470.

The second part 446 is configured to be received in a mounting opening 430 of the rear portion 428 of the vehicle frame F in the installed state. The second part 446 is retained in the mounting opening 430 by the connection of the second extension part 443b to the vehicle frame F using the restricting member 470. Here, the second part 446 has been modified relative to the second part 46 of the first embodiment such that the second part 446 has an axle receiving bore 454 that is unthreaded and smaller in diameter than the axle receiving bore 54 of the first embodiment. In this way, the axle receiving bore 454 can receive the spindle of a quick release axle. Alternatively, the axle receiving bore 454 can be configured in the same manner as the axle receiving bore 54 of the first embodiment so that the derailleur hanger 434 can threadedly receive the hanger bolt 36.

The second portion 442 is configured to support the derailleur 412. In particular, the second portion 442 includes a fixing bolt receiving bore 458. Here, in the fifth embodiment, the fixing bolt receiving bore 458 includes an internal thread 460 that threadedly receives the fixing bolt 418 of the derailleur 412. Alternatively, the fixing bolt receiving bore 458 can be unthreaded and the derailleur 412 can be attached to the second portion 442 using a bolt and a nut.

Here, in the fifth embodiment, the second portion 442 includes a first surface 462 and a second surface 464. Similar to the first embodiment, the first surface 462 is disposed on the first side S1 of the reference plane RP, and the second surface 464 is disposed on the second side S2 of the reference plane RP. Similar to the first embodiment, the first surface 462 and the second surface 464 are also parallel. In the installed state, the first surface 462 and the second surface 464 are arranged with respect to the vehicle frame F in the same manner as the first surface 62 and the second surface 64 of the derailleur hanger 34. Thus, the description of the first surface 62 and the second surface 64 also applies to the first surface 462 and the second surface 464.

As seen in FIGS. 34 to 35, in the case where the derailleur 412 is directly attached to the derailleur hanger assembly 410 without using the bracket 413, the base member 412A of the derailleur 412 is directly attached the derailleur hanger assembly 410 via the fixing bolt 419. Here, the base member 412A has a slot 465 defined by a first opposed surface 467 and a second opposed surface 469. As seen in FIG. 35, the first opposed surface 467 contacts the first surface 462 and the second opposed surface 469 contacts the second surface 464 where the derailleur 412 is attached to the derailleur hanger assembly 410 in the installed state. Thus, in this configuration, both the first surface 462 and the second surface 464 contact the base member 412A of the derailleur 412 in the installed state.

Figure 36:
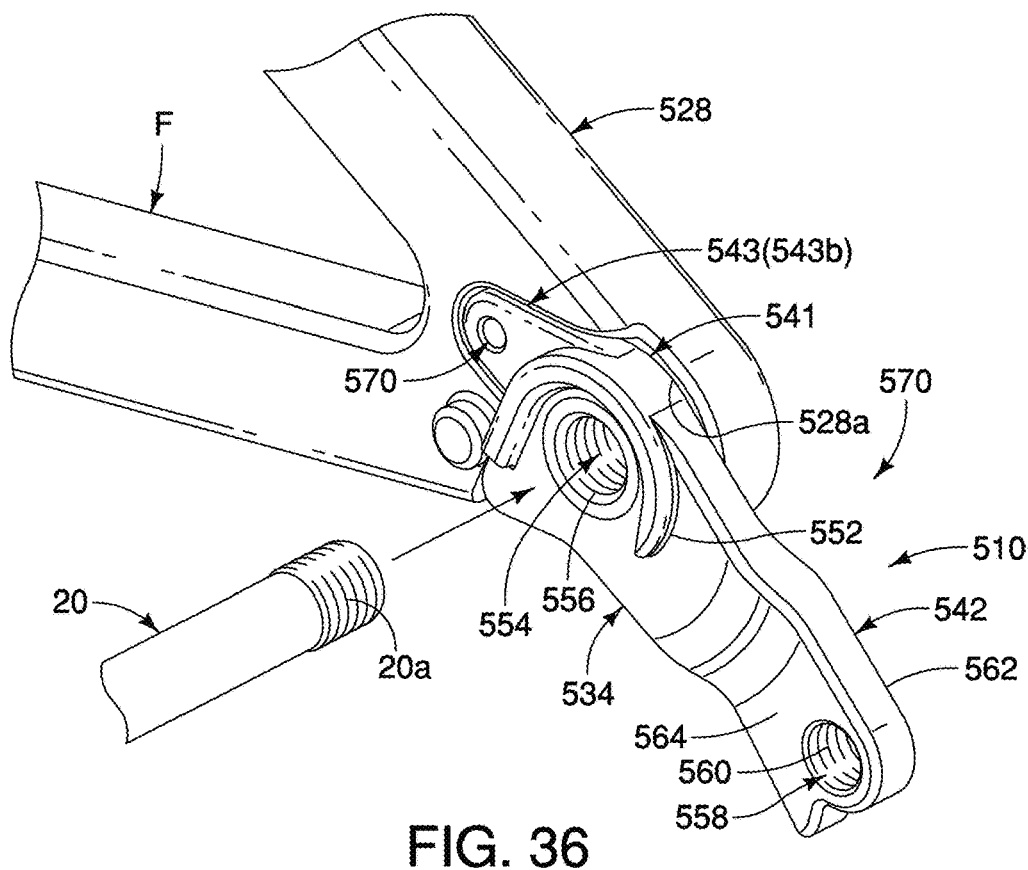
FIG. 36 is an inside (first side) perspective view of a right rear frame portion and a derailleur hanger assembly mounted to the right rear frame portion in accordance with a sixth embodiment.
Figure 37:
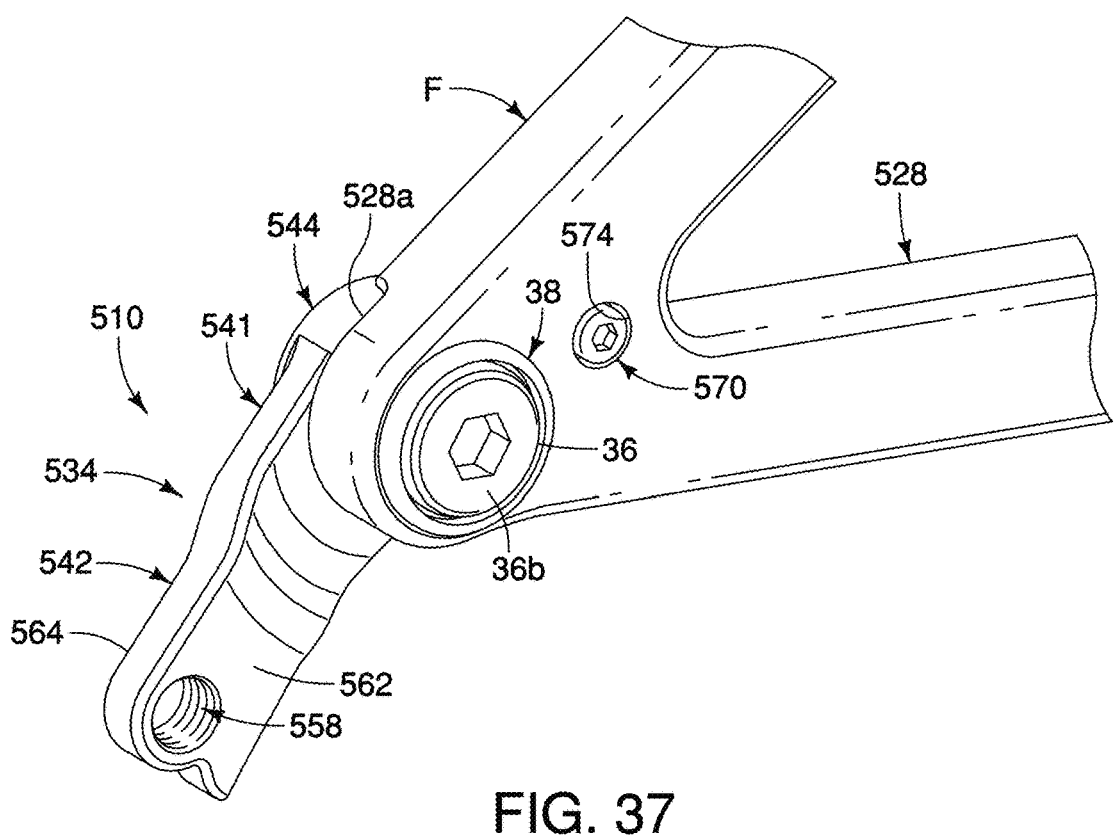
FIG. 37 is an outside (second side) perspective view of the right rear frame portion and the derailleur hanger assembly illustrated in FIG. 36.
Figure 38:
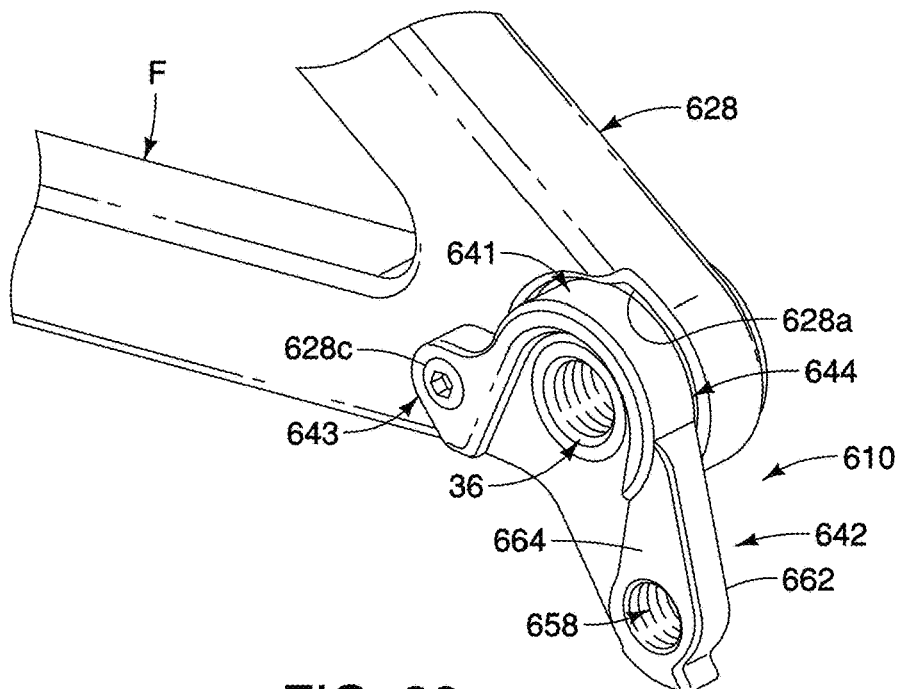
FIG. 38 is an inside (first side) perspective view of a right rear frame portion and a derailleur hanger assembly in accordance with a seventh embodiment.

Referring now to FIGS. 36 and 37, a derailleur hanger assembly 510 will now be explained in accordance with a sixth embodiment. The derailleur hanger assembly 510 is configured to mount the derailleur 12 to a rear portion 528 of the vehicle frame F. The derailleur hanger assembly 510 basically includes a derailleur hanger 534 and a restricting member 570. Here, the derailleur hanger 534 is secured to the rear portion 528 of the vehicle frame F using the restricting member 570. The derailleur hanger 534 basically comprises a first portion 541, a second portion 542 and a third portion 543. The second portion 542 is coupled to the first portion 541. The third portion 543 is coupled to the first portion 541. The first portion 541, the second portion 542 and the third portion 543 are a one-piece member. The derailleur hanger 534 is identical to the derailleur hanger 34 in shape and function, except that the third portion 543 has been modified as explained below. In view of the similarity between the derailleur hanger 534 of the sixth embodiment and the derailleur hanger 34 of the first embodiment, the descriptions of the parts of the derailleur hanger 534 that are identical to the parts of the derailleur hanger 34 may be omitted for the sake of brevity.

Similar to the first embodiment, the first portion 541 includes a first part 544 and a second part 546. The first part 544 includes a frame contact surface 548, an axle contact surface 550 and a collar 552. The frame contact surface 548 contacts the inner facing surface 528a of the rear portion 528 of the vehicle frame F in the installed state. The axle contact surface 550 contacts the end surface of the hub axle in the installed state. The frame contact surface 548 and the axle contact surface 550 are parallel and face in opposite directions. The collar 552 protrudes from the axle contact surface 550 in a direction parallel to the center axis A.

In the sixth embodiment, the third portion 543 includes a first extension part 543a and a second extension part 543b. The first extension part 4543a and the second extension part 543b coupled to the first portion 541. The first extension part 543a is the same as the third portion 43 of the first embodiment. In the case where, the second extension part 543b is provided, the extension part 543a can be omitted. The second extension part 543b includes a threaded hole 543b1 for threadedly receiving the restricting member 570 in the case where the restricting member 570 is a bolt. The rear portion 528 of the vehicle frame F includes a hole 574 for receiving the restricting member 570. Here, the hole 574 is a stepped through hole. When the restricting member 570 is inserted into the hole 574 and threaded into the threaded hole 543b1, the derailleur hanger 534 is rotationally fixed with respect to the rear portion 528 of the vehicle frame F. In this way, the derailleur hanger 534 is also secured to the rear portion 528 of the vehicle frame F using the restricting member 570.

The second part 546 is configured to be received in a mounting opening 530 of the rear portion 528 of the vehicle frame F in the installed state. The second part 546 is retained in the mounting opening 530 by the connection of the second extension part 543b to the vehicle frame F using the restricting member 570. The second part 546 has an axle receiving bore 554 with in internal thread. In this way, the axle receiving bore 554 can threadedly receive the hanger bolt 36. The hanger bolt 36 is threadedly coupled to the thru-axle 20 in the same manner as the first embodiment.

Here, in the sixth embodiment, the second portion 542 includes a first surface 562 and a second surface 564. In the installed state, the first surface 562 and the second surface 564 are arranged with respect to the vehicle frame F in the same manner as the first surface 62 and the second surface 64 of the derailleur hanger 34. Thus, the description of the first surface 62 and the second surface 64 also applies to the first surface 562 and the second surface 564.

Figure 39:
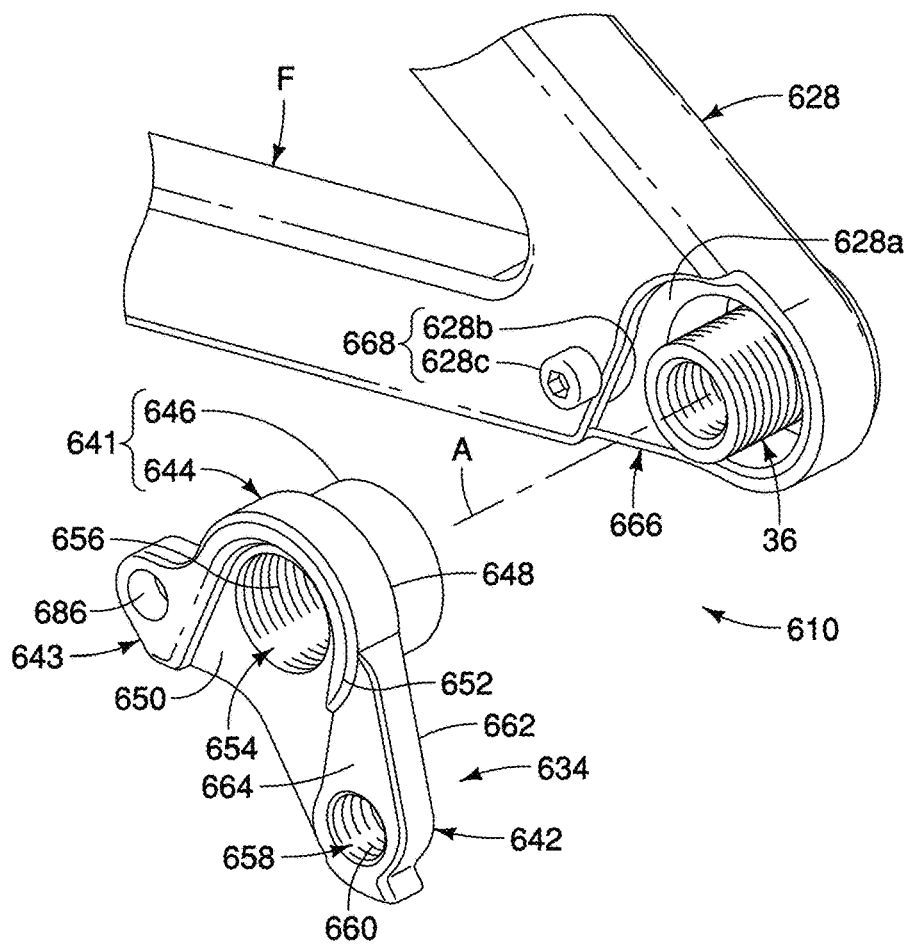
FIG. 39 is an exploded inside perspective view of the right rear frame portion and the derailleur hanger assembly illustrated in FIG. 38.
Figure 40:
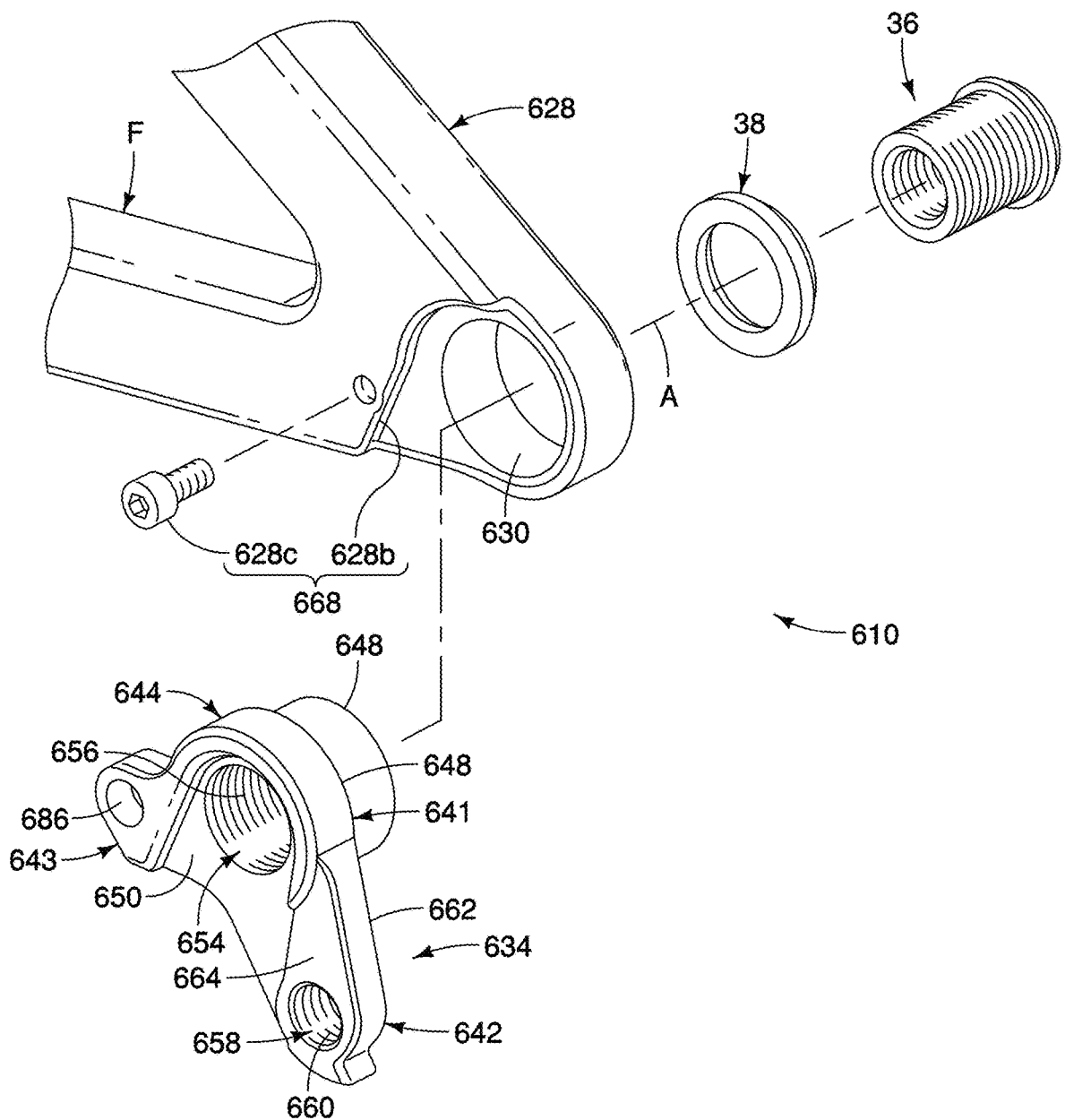
FIG. 40 is a further exploded inside perspective view of the right rear frame portion and the derailleur hanger assembly illustrated in FIGS. 38 and 39.
Figure 41:
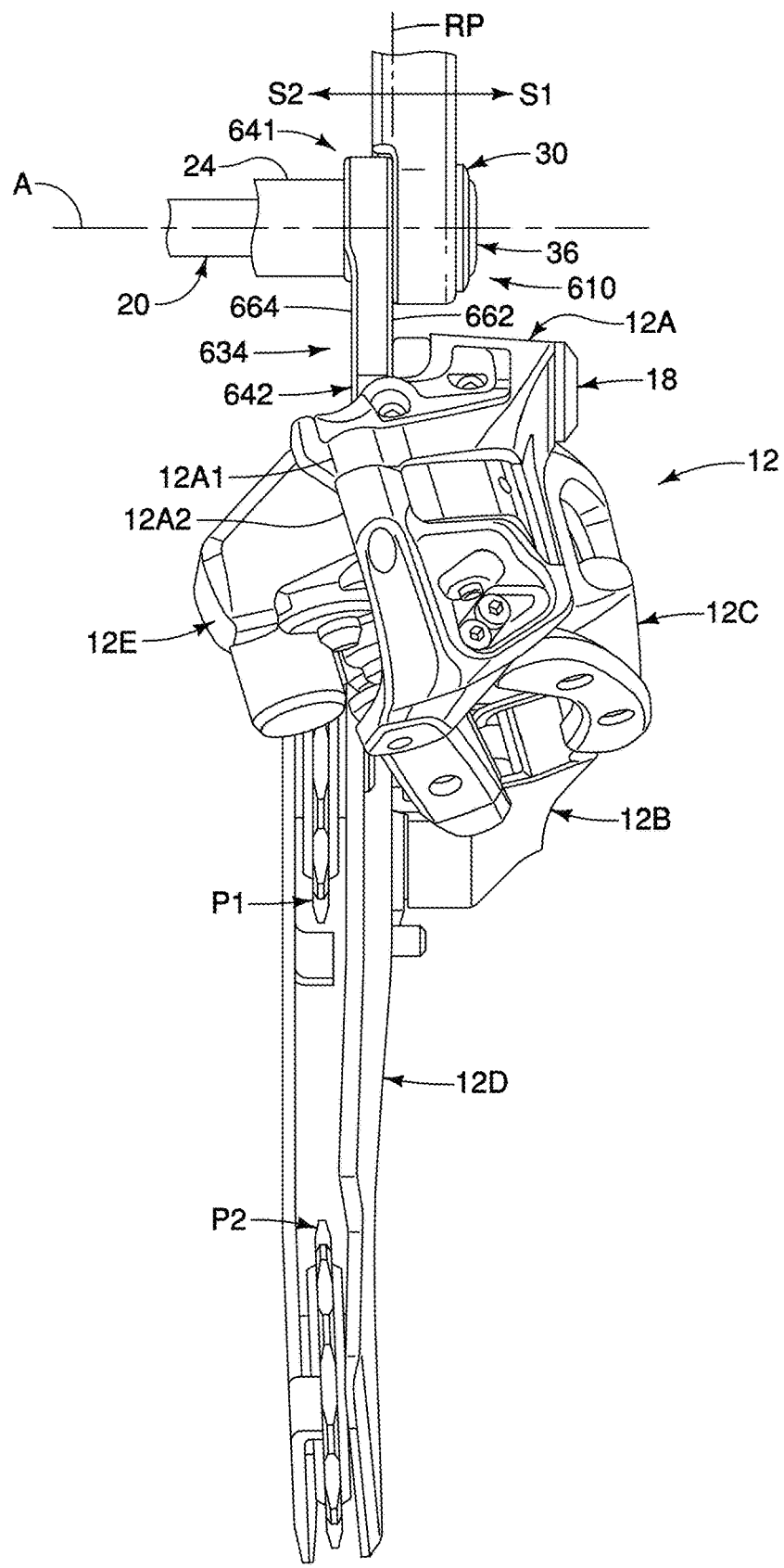
FIG. 41 is a rear elevational view of the right rear frame portion and the derailleur hanger assembly illustrated in FIGS. 38 to 40 in which a first derailleur is mounted to the right rear frame portion using the derailleur hanger assembly.

Referring now to FIGS. 38 to 43, a derailleur hanger assembly 610 will now be explained in accordance with a seventh embodiment. The derailleur hanger assembly 610 includes a derailleur hanger 634 and the hanger bolt 36 of the first embodiment. Here, the derailleur hanger assembly 610 further includes the hanger washer 38 of the first embodiment. The derailleur hanger 634 is configured to be secured to a rear portion 628 of the vehicle frame F using the hanger bolt 36 in the same manner as the first embodiment. However, in the seventh embodiment, the rear portion 628 of the vehicle frame F has been modified from the rear portion 28. Specifically, as seen in FIGS. 39 and 40, the rear portion 628 includes an inner facing surface 628a (i.e., an axially facing contact surface), a forward rotational stop surface 628b and a stop member 628c. Here, the stop member 628c is removable attached to the rear portion 628 of the vehicle frame F. For example, the stop member 628c is formed by a bolt that is screwed into a threaded hole in the rear portion 628 of the vehicle frame F.

The derailleur hanger 634 basically comprises a first portion 641, a second portion 642 and a third portion 643. The second portion 642 is coupled to the first portion 641. The third portion 643 is coupled to the first portion 641. The first portion 641, the second portion 642 and the third portion 643 are a one-piece member.

Similar to the first embodiment, the first portion 641 includes a first part 644 and a second part 646. The first part 644 includes a frame contact surface 648, an axle contact surface 650 and a collar 652. The frame contact surface 648 contacts the inner facing surface 628*a* of the rear portion 628 of the vehicle frame F in the installed state. The frame contact surface 648 is disposed in the reference plane RP. The axle contact surface 650 contacts the end surface 24*a* of the hub axle 24 in the installed state. The frame contact surface 648 and the axle contact surface 650 are parallel and face in opposite directions. The collar 652 protrudes from the axle contact surface 550 in a direction parallel to the center axis A.

The second part 646 is configured to be received in the mounting opening 30 of the rear portion 628 of the vehicle frame F in the installed state. The second part 646 is a tubular member that extends from the first part 644. In this way, the second part 646 of the first portion 641 includes an axle receiving bore 654. The axle receiving bore 654 includes an internal thread 656. The hanger bolt 36 is screwed into the internal thread 656 to secure the derailleur hanger 634 to the rear portion 628 of the vehicle frame F. Thus, the second part 646 can also be referred to as a receptacle in that the second part 646 is configured to receive the hanger bolt 36.

Figure 42:
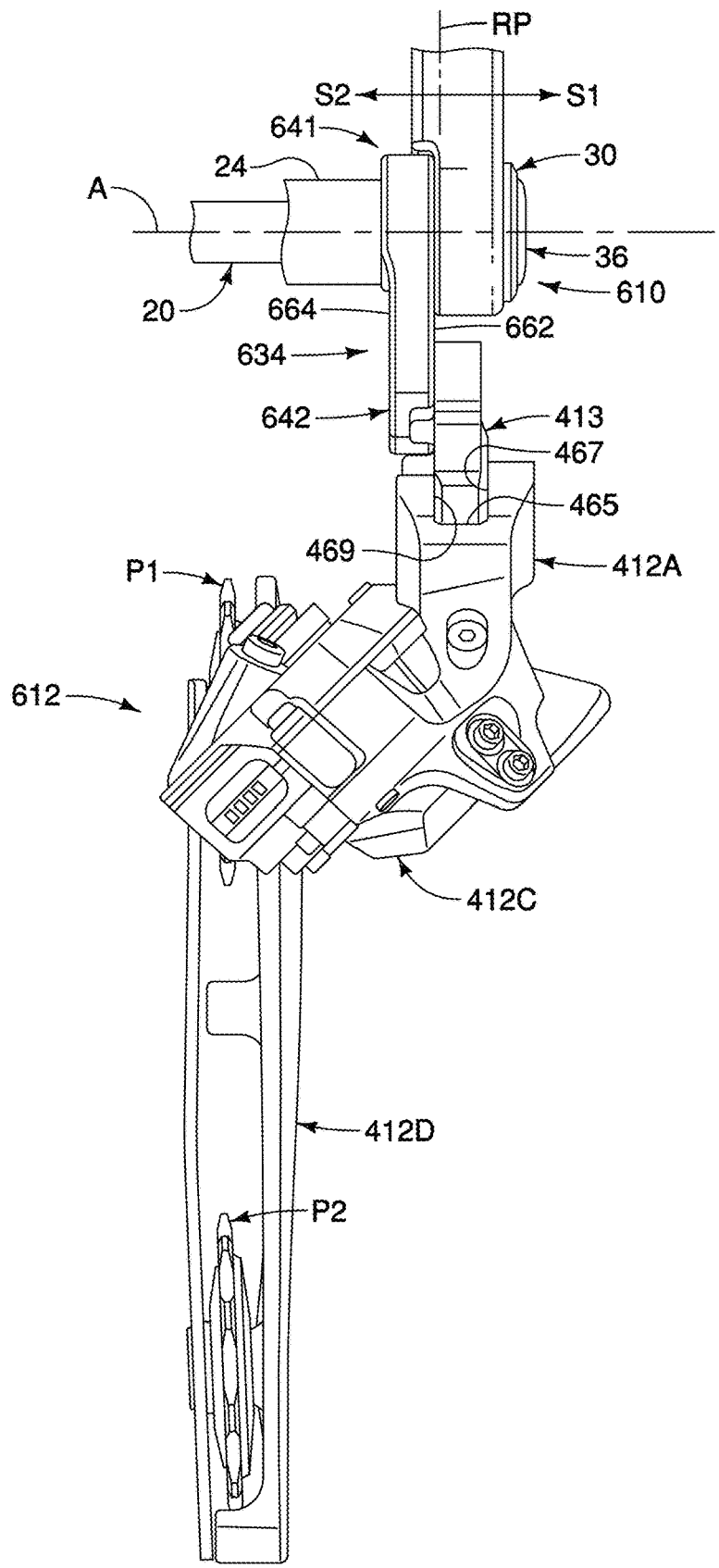
FIG. 42 is a rear elevational view of the right rear frame portion and the derailleur hanger assembly illustrated in FIGS. 38 to 41 in which a second derailleur is mounted to the right rear frame portion using the derailleur hanger assembly.

The second portion 642 is configured to support either the derailleur 12 (FIG. 41) or the derailleur 412 (FIG. 42). In particular, the second portion 642 includes a fixing bolt receiving bore 658. The fixing bolt receiving bore 658 includes an internal thread 660 that threadedly receives the fixing bolt 18. Alternatively, the fixing bolt receiving bore 658 can be unthreaded and the derailleur 12 (FIG. 41) or the derailleur 412 (FIG. 42) can be attached to the second portion 642 using a bolt and a nut.

The second portion 642 includes a first surface 662 and a second surface 664. Here, the first surface 662 is disposed in the reference plane RP. Thus, the frame contact surface 648 and the first surface 662 are completely contained in the reference plane RP. The second surface 664 is disposed on the second side S2 of the reference plane RP. The first surface 662 and the second surface 664 are parallel. The first surface 662 and the second surface 664 is also parallel to the axle contact surface 650. In the case where, the derailleur 12 (FIG. 41) is attached to the derailleur hanger 634, the first surface 662 contacts a surface of the base member 12A that faces towards the vehicle center plane. In the case where, the derailleur 412 (FIG. 42) is attached to the derailleur hanger 634 using the bracket 413, the first surface 662 contacts one of a surface of the bracket 413 that faces towards the vehicle center plane. In the case where, the derailleur 412 (FIG. 42) is attached to the derailleur hanger 634 without using the bracket 413, the first opposed surface 467 will contact the first surface 662 and the second opposed surface 469 will contact the second surface 664 in the same manner the first surface 462 and the second surface 464 contact the derailleur hanger 434 as seen in FIG. 35.

In the seventh embodiment, the third portion 643 is configured to restrict rotational movement of the derailleur hanger 634 relative the frame F about the center axis A in the installed state. In particular, the forward rotational stop surface 628*b* and the stop member 628*c* each form a restricting portion of the vehicle frame F. Thus, the forward rotational stop surface 628*b* can also be referred to as a restricting portion 628*b* and the stop member 628*c* can also be referred to as a restricting portion 528*c*. Here, the third portion 643 includes an opening 686 that receives the restricting portion 628*c* of the vehicle frame F in the installed state. In this way, the derailleur hanger 634 is prevented from rotating about the center axis A in the installed state. In other words, the third portion 643 is configured to contact the restricting portion 628*c* of the vehicle frame F to prevent rotation of the derailleur hanger 634 about the center axis A of the hub axle 24 in the installed state where the derailleur hanger 434 is mounted to the hub axle 24.

Figure 43:
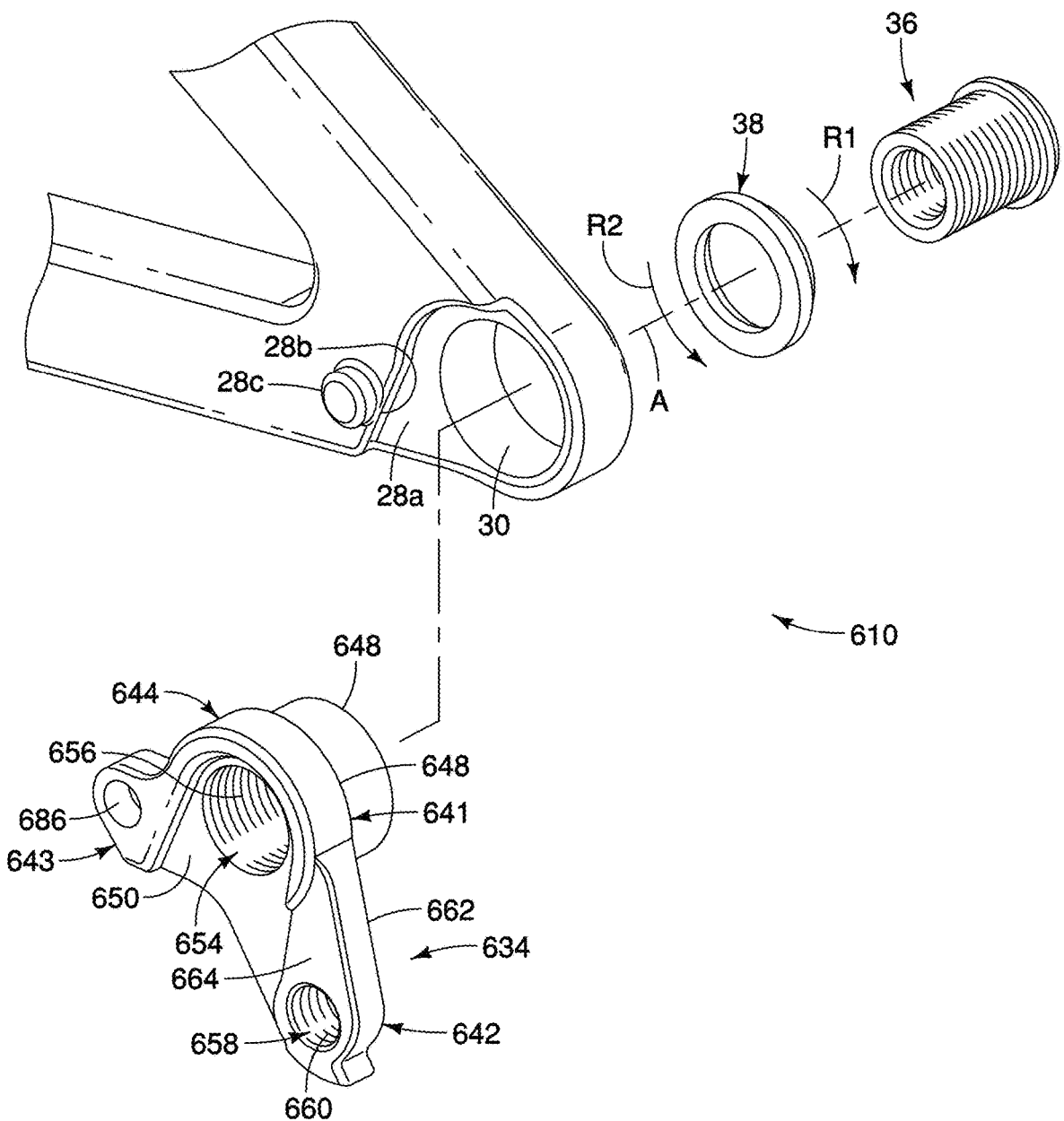
FIG. 43 is an exploded inside perspective view of a modified right rear frame portion and the derailleur hanger assembly illustrated in FIGS. 38 to 42.

Referring now to FIG. 43, the derailleur hanger 634 can also be used with the rear portion 28 of the vehicle frame F. In this case, the stop member 28*c* (the restricting portion) is not detachable from the rear portion 28 of the vehicle frame F.

In any case, depending on the configuration of the derailleur hanger, the restricting portion 28*c* or 628*c* may or may not be used. In the case where no rotational movement is desired, the third portion of the derailleur hanger should be configured to cooperate with the restricting portion 28*c* or 628*c* of the frame F. On the other hand, in the case where rotational movement of the derailleur hanger in a rearward direction is desired, then the third portion of the derailleur hanger should be configured to cooperate with the restricting portion 28*b* or 628*b* of the frame F and not with restricting portion 28*c* or 628*c*. In other words, for example, when the derailleur hanger 634 of the seventh embodiment is not used and "another derailleur hanger" such as the derailleur hanger 34 of the first embodiment is used with the rear portion 28 or 628, then the restricting portion 28*b* or 628*b* of the frame F only stops the rotation of the other derailleur hanger (e.g., the derailleur hanger 34 of the first embodiment). Thus, the restricting portion 28*b* or 628*b* of the vehicle frame F stops rotation of another derailleur hanger 34 in the first rotational direction R1 and permits rotation of the other derailleur hanger 34 in the second rotational direction R2 about the center axis A in a state where the other derailleur hanger 34 is mounted to the hub axle 24. On the other hand, the restricting portion 28*c* or 628*c* of the vehicle frame F stops rotation of the derailleur hanger 634 in both the first rotational direction R1 and the second rotational direction R2 about the center axis A in a state where the derailleur hanger 634 is mounted to the frame F.

Figure 44:
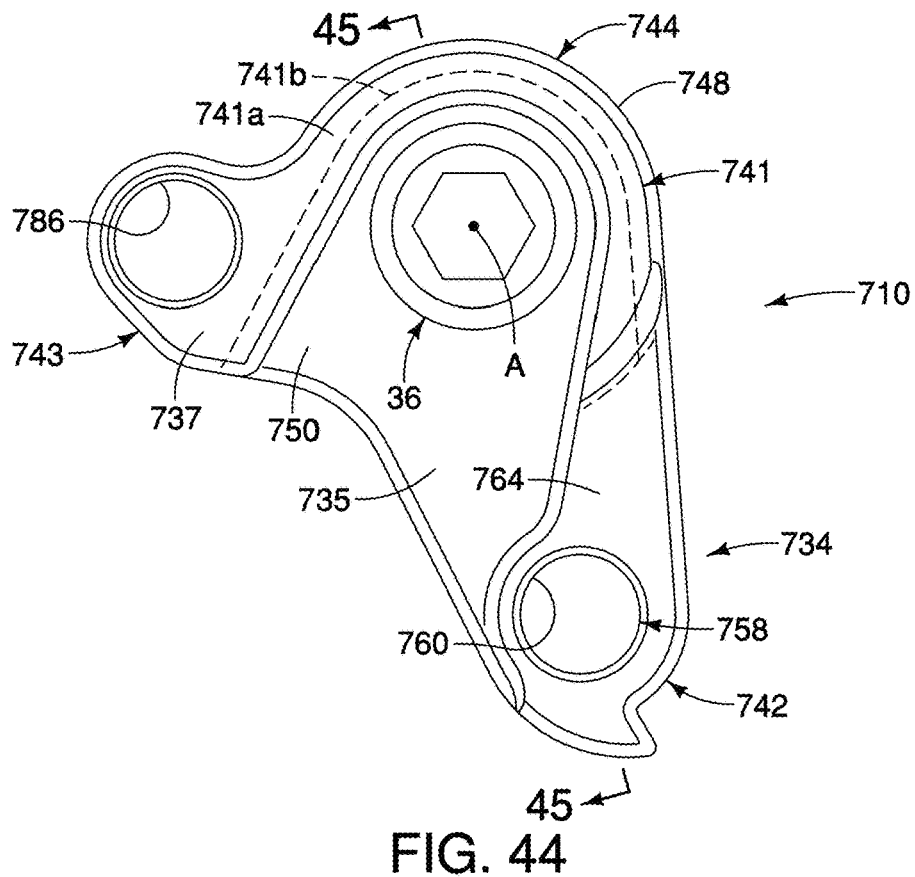
FIG. 44 is a side elevational view of a derailleur hanger assembly in accordance with an eighth embodiment.
Figure 45:
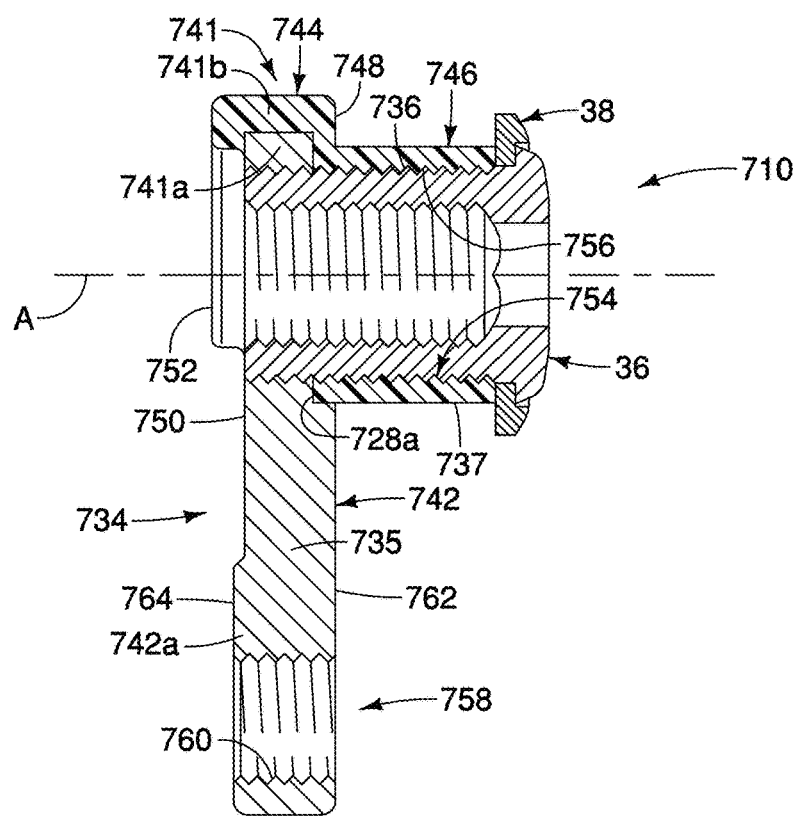
FIG. 45 is a cross sectional view of the derailleur hanger assembly illustrated in FIG. 44 as seen along section line 45-45 of FIG. 44.

Referring now to FIGS. 44 and 45, a derailleur hanger assembly 710 will now be explained in accordance with an eighth embodiment. The derailleur hanger assembly 710 includes a derailleur hanger 734 and the hanger bolt 36 of the first embodiment. Here, the derailleur hanger assembly 710 further includes the hanger washer 38 of the first embodiment. The derailleur hanger 734 is configured to be secured to a rear portion of a vehicle frame using the hanger bolt 36 in the same manner as the first embodiment.

The derailleur hanger 734 basically comprises a first portion 741 and a second portion 742. The second portion 742 is coupled to the first portion 741. In the second embodiment, the derailleur hanger 734 further comprises a third portion 743. The third portion 743 is coupled to the first portion 741. The derailleur hanger 734 is identical to the derailleur hanger 634 in shape and function. The only difference between the derailleur hanger 734 and the derailleur hanger 634 is that the derailleur hanger 634 is made of a single material while the derailleur hanger 734 is made of two different materials.

In the eighth embodiment, the derailleur hanger 734 is constructed of a metallic portion and a non-metallic portion. Specifically, the derailleur hanger 734 includes a base member 735 and an outer member 737. The base member 735 is made of a metallic material. The base member 735 can be cast, stamped, forged or machined. The outer member 737 is made of a non-metallic material. The non-metallic material is injection molded around the metallic material of the base member 735 to form the outer member 737 on the base member 735.

In the eighth embodiment, the first portion 741 is partially formed by the base member 735 and the outer member 737. Thus, the first portion 741 includes a metallic portion 741a. Also, the first portion 741 includes a non-metallic portion 741b. On the other hand, in the eighth embodiment, the second portion 742 is completely formed by the base member 735. The second portion 742 includes a metallic portion 742a. The metallic portion 741a of the first portion 741 and the metallic portion 742a of the second portion 742 are formed of a one-piece member of a suitable metallic material such as aluminum. The non-metallic portion 741b is formed of a suitable non-metallic material such as plastic or a fiber reinforced plastic (e.g., plastic reinforced with carbon fibers or glass fibers).

Here, in the eighth embodiment, the third portion 743 includes a non-metallic portion 743a that is formed by the non-metallic material of the outer member 737. In other words, the non-metallic portion 741b of the first portion 741 and the non-metallic portion 743a of the third portion 743 are integrally formed as a one-piece member of the outer member 737. Similar to the first embodiment, the third portion 743 is configured to restrict rotational movement of the derailleur hanger 734 relative the frame F about the center axis A of the hub axle in the installed state.

The first portion 741 includes a first part 744 and a second part 746. The first part 144 includes a frame contact surface 748 that is configured to contact an inner facing surface of a rear portion of a vehicle frame in the installed state. The first part 744 further includes an axle contact surface 750 that is configured to contact an end surface of the hub axle in the installed state. The first part 744 further includes a collar 752. The collar 752 protrudes from the axle contact surface 750. The non-metallic portion 741b of the first portion 741 includes the collar 752. Thus, the collar 752 is formed of a non-metallic material.

Similar to the first embodiment, the second part 746 is a tubular member having an axle receiving bore 754 that extends from the first part 744. The second part 746 is received in the mounting opening of the rear portion of the vehicle frame in the installed state. The axle receiving bore 754 includes an internal thread 756 for threadedly receiving the hanger bolt 36. The non-metallic portion 741b of the first portion 741 includes the second part 746. Thus, the second part 746 is formed of a non-metallic material. The second part 746 can also be referred to as a receptacle.

The second portion 742 is configured to support the derailleur 12 or derailleur 412. In particular, the second portion 742 includes a fixing bolt receiving bore 758 having an internal thread 760 that threadedly receives either the fixing bolt 18 of the derailleur 12, or the fixing bolt 418 of the derailleur 412. The second portion 742 includes a first surface 762 and a second surface 764. The first surface 762 and the second surface 764 are disposed on opposite sides of the second portion 742. In the installed state, the first surface 762 and the second surface 764 are arranged with respect to the vehicle frame F in the same manner as the first surface 662 and the second surface 664 of the derailleur hanger 634.

Thus, the description of the first surface 662 and the second surface 664 also applies to the first surface 762 and the second surface 764.

In the eight embodiment, the third portion 743 is configured to restrict rotational movement of the derailleur hanger 734 in the same manner as the third portion 643 of the seventh embodiment. Here, the third portion 743 includes an opening 786 that receives a restricting portion of a vehicle frame in the installed state in the same manner as the seventh embodiment.

Figure 46:
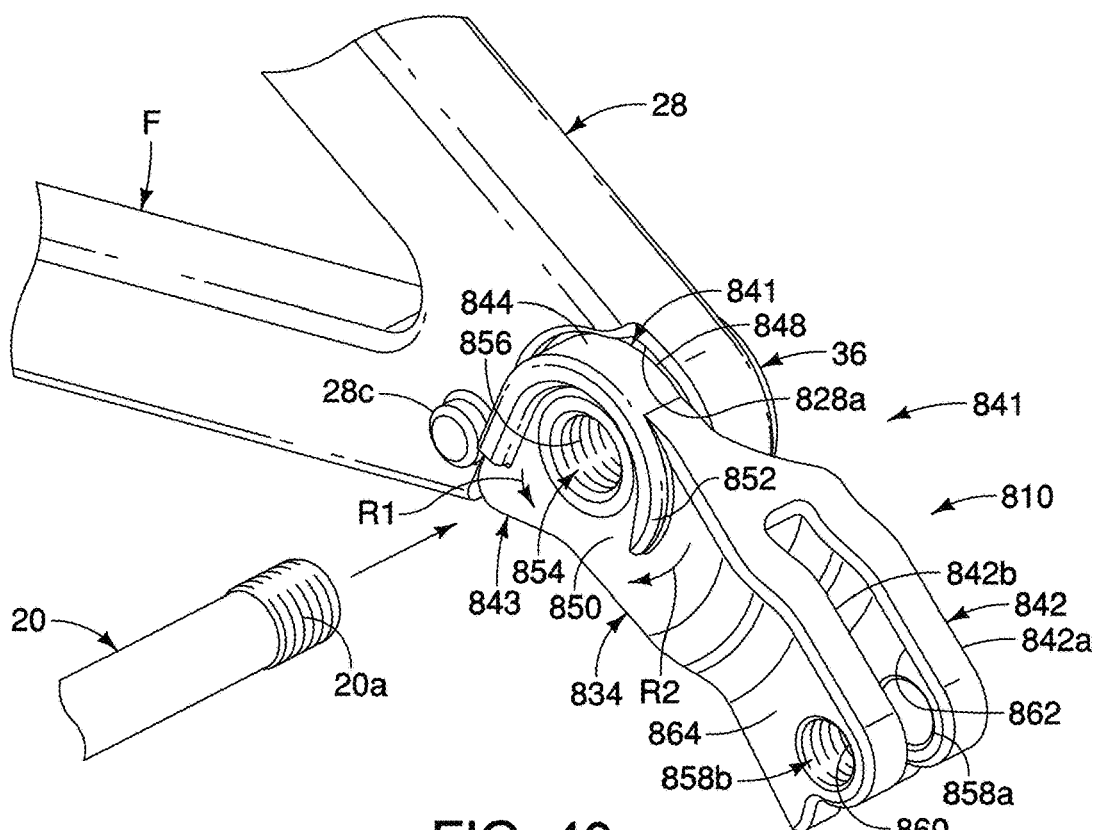
FIG. 46 is an inside (first side) perspective view of a right rear frame portion and a derailleur hanger assembly mounted to the right rear frame portion in accordance with a ninth embodiment.
Figure 47:
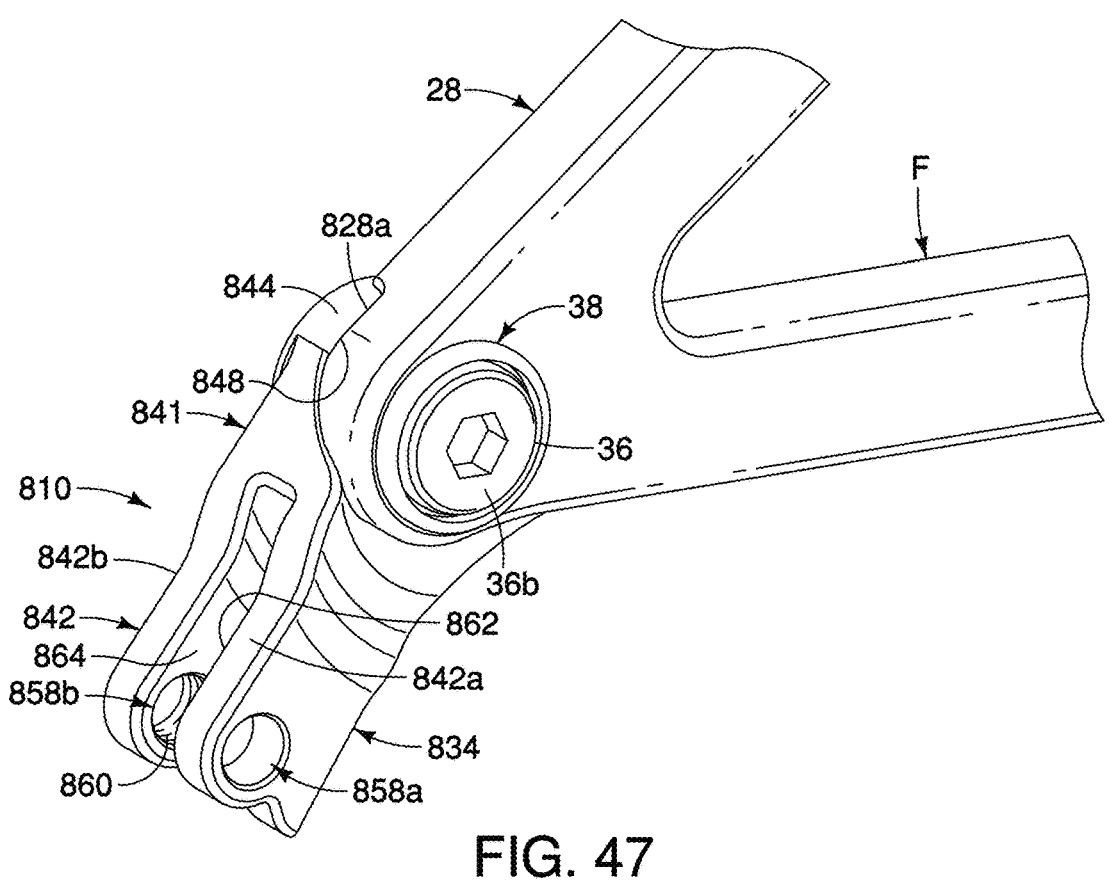
FIG. 47 is an outside (second side) perspective view of the right rear frame portion and the derailleur hanger assembly illustrated in FIG. 46.
Figure 48:
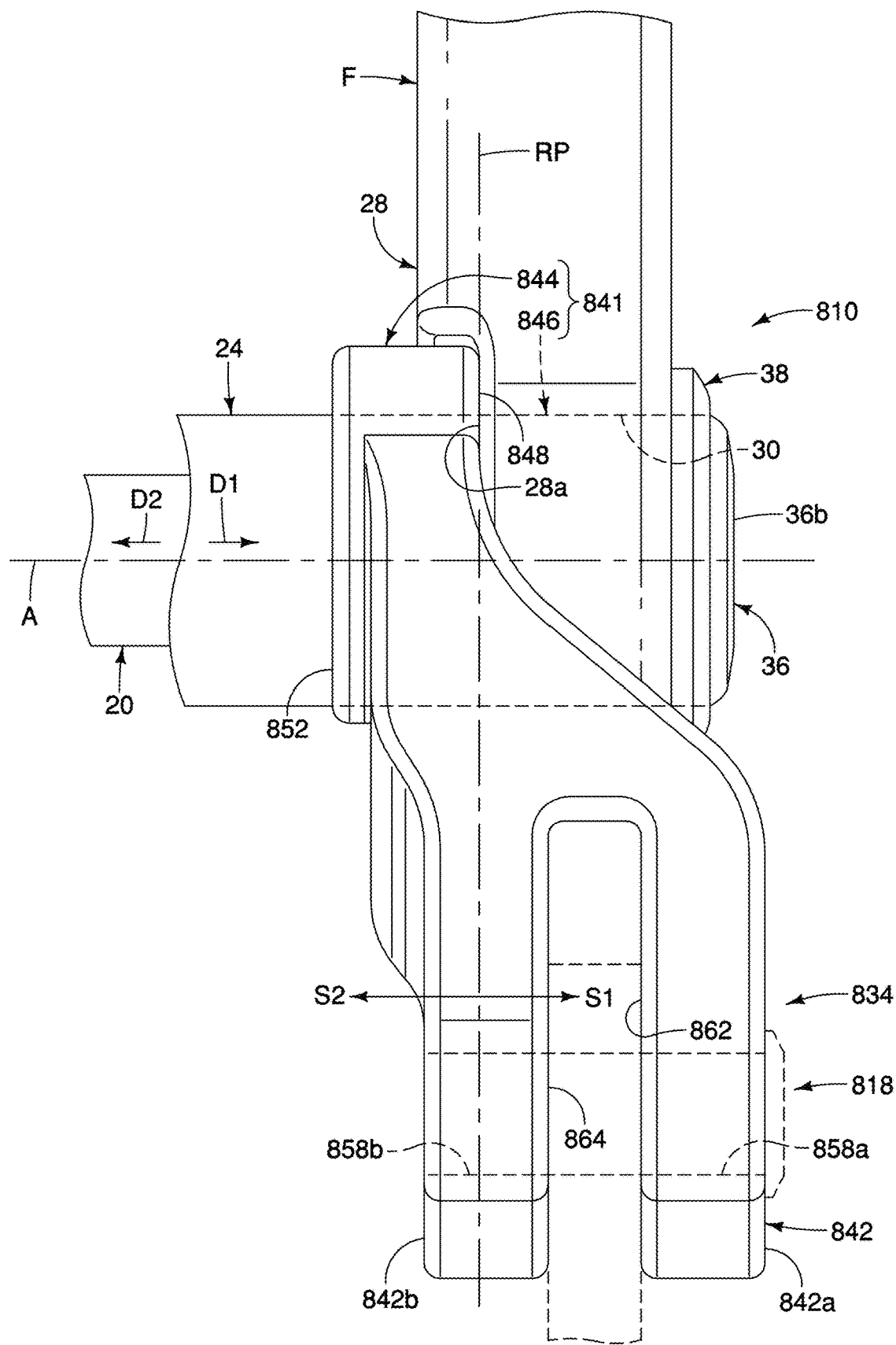
FIG. 48 is a rear elevational view of the right rear portion of the vehicle frame and the derailleur hanger assembly illustrated in FIGS. 46 and 47.

Referring now to FIGS. 46 to 48, a derailleur hanger assembly 810 will now be explained in accordance with a ninth embodiment. The derailleur hanger assembly 810 includes a derailleur hanger 834 and the hanger bolt 36 of the first embodiment. Here, the derailleur hanger assembly 810 further includes the hanger washer 38 of the first embodiment. The derailleur hanger 834 is configured to be secured to the rear portion 28 of the vehicle frame F using the hanger bolt 36 in the same manner as the first embodiment.

The derailleur hanger 834 basically comprises a first portion 841, a second portion 842 and a third portion 843. The second portion 842 and the third portion 843 are coupled to the first portion 841 as a one-piece member. The derailleur hanger 834 is identical to the derailleur hanger 34 in shape and function, except that the second portion 842 has been modified as explained below.

The first portion 841 is configured to be mounted to the rear portion 28 of the vehicle frame F by the hanger bolt 36, which is attached to the thru-axle 20. The first portion 841 includes a first part 844 and a second part 846. The second part 846 extends from the first part 844. The first part 844 is sandwiched between an end surface of the hub axle and an inner facing surface 28a of the rear portion 28 of the vehicle frame F in the installed state. In other words, the first part 844 is configured to contact the inner facing surface 28a of the rear portion 28 of the vehicle frame F in the installed state. In particular, the first part 844 includes a frame contact surface 848. The frame contact surface 848 contacts the inner facing surface 28a of the rear portion 28 of the vehicle frame F in the installed state. The frame contact surface 848 is disposed in a reference plane RP extending perpendicular to the center axis A of the hub axle 24 in the installed state. In other words, the frame contact surface 848 is completely contained within the reference plane RP. The first part 844 of the first portion 841 further includes an axle contact surface 850. The axle contact surface 850 contacts the end surface 24a of the hub axle 24 in the installed state.

The frame contact surface 848 and the axle contact surface 850 are parallel and face in opposite directions.

The first part 844 further includes a collar 852. The collar 852 protrudes from the axle contact surface 850 in a direction parallel to the center axis A toward the vehicle center plane. The collar 852 has a U-shape as viewed in a direction parallel to the center axis A. The collar 852 is dimensioned to partially surround the hub axle 24 in the installed state.

The second part 846 is configured to be received in the mounting opening 30 of the rear portion 28 of the vehicle frame F in the installed state. Here, the second part 846 is a tubular member that extends from the first part 844. The second part 846 including an axle receiving bore 854 configured to receive the hub axle 24. The axle receiving bore 854 includes an internal thread 856. The hanger bolt 36 is screwed into the internal thread 856 to secure the derailleur hanger 34 to the rear portion 28 of the vehicle frame F.

The second portion 842 is configured to support the derailleur 12. In particular, the second portion 842 includes a first mounting part 842a and a second mounting part 842b. The first mounting part 842a has a first fixing bolt receiving bore 858a. The second mounting part 842b has a second fixing bolt receiving bore 858b. Here, the first fixing bolt receiving bore 858a is an unthreaded bore. The second fixing bolt receiving bore 858b includes an internal thread 860 that threadedly receives a fixing bolt 818 for attaching the derailleur 12 to the derailleur hanger 834. The first mounting part 842a of the second portion 842 includes a first surface 862. The first surface 862 is disposed on a first side S1 of the reference plane RP. The first surface 862 contacts a base member 12A of the rear derailleur 12 in the installed state as seen in FIG. 48. The second mounting part 842b of the second portion 842 includes a second surface 864. The second surface 864 is also disposed on the second side S2 of the reference plane RP. The first surface 862 and the second surface 864 are parallel. The first surface 862 and the second surface 864 are also parallel to the frame contact surface 848 and the axle contact surface 850. The second surface 864 is positioned closer to the vehicle center plane than the first surface 862 in the installed state. In the ninth embodiment, the first surface 862 faces in the inward direction D2 with respect to the vehicle center plane in the installed state. On the other hand, the second surface 864 faces in the outward direction D1 with respect to the vehicle center plane in the installed state.

As seen in FIG. 46, similar to the first embodiment, the third portion 843 is configured to restrict rotational movement of the derailleur hanger 834 relative the frame F about the center axis A in the installed state. The third portion 843 restrict only rotation of the derailleur hanger 834 in the first rotational direction R1 about the center axis A in the installed state. The third portion 843 permits rotation of the derailleur hanger 834 in the second rotational direction R2 about the center axis A in the installed state.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright, riding position and equipped with the derailleur hanger. Accordingly, these directional terms, as utilized to describe the derailleur hanger should be interpreted relative to a human-powered vehicle (e.g., bicycle) in an upright riding position on a horizontal surface and that is equipped with the derailleur hanger. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of". For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A derailleur hanger comprising:
a first portion configured to be mounted to a hub axle, the first portion including a first part and a second part, the second part extending from the first part, the second part including an axle receiving bore configured to receive the hub axle; and
a second portion coupled to the first portion, and configured to support a derailleur,
the first part including a frame contact surface disposed in a reference plane extending perpendicular to a center axis of the hub axle in an installed state where the derailleur hanger is mounted to the hub axle,
the second portion including a first surface disposed on a first side of the reference plane, the first side being opposite to a second side with respect to the reference plane, a vehicle center plane being positioned at the second side in the installed state,
the second part being disposed on the first side in the installed state, the second part being disposed at least partially farther from the reference plane than the first surface.

2. The derailleur hanger according to claim 1, wherein the second portion includes a second surface disposed on the second side.

3. The derailleur hanger according to claim 2, wherein the second surface faces in an inward direction with respect to the vehicle center plane in the installed state.

4. The derailleur hanger according to claim 2, wherein the first surface and the second surface are parallel.

5. The derailleur hanger according to claim 1, wherein the first surface faces in an outward direction with respect to the vehicle center plane in the installed state.

6. The derailleur hanger according to claim 1, wherein the derailleur hanger is configured to be secured in a frictionally locking manner on a frame.

7. The derailleur hanger according to claim 1, wherein the first portion and the second portion are a one-piece member.

8. The derailleur hanger according to claim 1, wherein the first portion includes a non-metallic portion, and the second portion includes a metallic portion.

9. The derailleur hanger according to claim 1, wherein the second portion includes a restricting surface at least partially disposed at the first side,
the restricting surface is configured to contact with a frame to restrict rotation of the derailleur hanger about a center axis of the hub axle in the installed state.

10. The derailleur hanger according to claim 1, further comprising
a third portion coupled to the first portion, the third portion being configured to have a restricting member attached to the third portion, and the restricting member being configured to restrict rotation of the derailleur hanger about a center axis of the hub axle in the installed state.

11. The derailleur hanger according to claim 10, wherein the restricting member is detachably provided to the third portion.

12. The derailleur hanger according to claim 10, further comprising:
the restricting member.

13. The derailleur hanger according to claim 10, wherein the third portion includes a first hole, and
the restricting member includes a bolt having a head portion and a shaft portion, the shaft portion is disposed in the first hole of the third portion and a second hole of a frame, and the head portion is configured to contact one of the third portion and the frame.

14. The derailleur hanger according to claim 13, wherein the shaft portion includes an external thread that engages an internal thread of the first hole of the third portion.

15. The derailleur hanger according to claim 13, wherein the shaft portion includes an external thread that engages an internal thread of the second hole of the frame.

16. The derailleur hanger according to claim 10, wherein the third portion includes a first hole, and
the restricting member includes a pin having a first shaft section and a second shaft section, the first shaft section is disposed in the first hole of the third portion, and the second shaft section is disposed in a second hole of a frame.

17. The derailleur hanger according to claim 16, wherein the pin is fixed in the first hole of the third portion.

18. The derailleur hanger according to claim 16, wherein the pin is fixed in the second hole of the frame.

19. The derailleur hanger according to claim 1, wherein the second portion includes a fixing bolt receiving bore.

20. A derailleur hanger comprising:
a first portion configured to be mounted to a hub axle, the first portion including a first part and a second part, the second part extending from the first part, the second part including an axle receiving bore configured to receive the hub axle; and
a second portion coupled to the first portion, and configured to support a derailleur,
the first part including a frame contact surface disposed in a reference plane extending perpendicular to a center axis of the hub axle in an installed state where the derailleur hanger is mounted to the hub axle,
the second portion including a first surface disposed on a first side of the reference plane and a second surface disposed on a second side of the reference plane, the first side being opposite to the second side with respect to the reference plane,
the second part being disposed on the first side in the installed state, the second part being disposed at least partially farther from the reference plane than the first surface.

* * * * *